United States Patent [19]
Stinson et al.

[11] Patent Number: 6,045,039
[45] Date of Patent: Apr. 4, 2000

[54] CARDLESS AUTOMATED TELLER TRANSACTIONS

[75] Inventors: Michael C. Stinson; John W. Templer, Jr.; Dyron Clower, all of Fort Worth, Tex.

[73] Assignee: Mr. Payroll Corporation, Fort Worth, Tex.

[21] Appl. No.: 08/951,540

[22] Filed: Oct. 16, 1997

Related U.S. Application Data

[63] Continuation-in-part of application No. 08/854,321, May 12, 1997.
[60] Provisional application No. 60/036,923, Feb. 6, 1997.
[51] Int. Cl.$^7$ .................................................. G06K 5/00
[52] U.S. Cl. ................................. 235/379; 235/380
[58] Field of Search ........................... 235/379, 380, 235/492, 381

[56] References Cited

U.S. PATENT DOCUMENTS

| | | | |
|---|---|---|---|
| 3,588,449 | 6/1971 | Paterson | 235/61.7 B |
| 3,675,816 | 7/1972 | Bourke, II et al. | 221/13 |
| 3,705,384 | 12/1972 | Wahlberg | 340/149 |
| 3,718,908 | 2/1973 | Bloomstein | 340/149 A |
| 3,798,603 | 3/1974 | Wahlberg | 340/149 A |
| 3,876,864 | 4/1975 | Clark et al. | 235/61.7 B |
| 3,896,266 | 7/1975 | Waterbury | 179/1 SB |
| 3,914,579 | 10/1975 | Shigemori et al. | 235/61.7 B |
| 3,943,335 | 3/1976 | Kinker et al. | 235/61.7 B |
| 4,100,370 | 7/1978 | Suzuki et al. | 179/1 SB |
| 4,109,238 | 8/1978 | Creekmore | 340/149 A |
| 4,187,498 | 2/1980 | Creekmore | 340/149 A |
| 4,205,780 | 6/1980 | Burns et al. | 235/454 |
| 4,249,163 | 2/1981 | Maurer et al. | 340/149 A |
| 4,317,957 | 3/1982 | Sendrow | 178/22.08 |
| 4,321,672 | 3/1982 | Braun et al. | 364/408 |
| 4,357,597 | 11/1982 | Butler | 340/146.3 E |
| 4,461,028 | 7/1984 | Okubo | 382/15 |
| 4,580,040 | 4/1986 | Granzow et al. | 235/379 |
| 4,617,457 | 10/1986 | Granzow et al. | 235/379 |

(List continued on next page.)

OTHER PUBLICATIONS

"AT&T Document Processing ATM (DP–ATM)," AT&T Global Information Solutions Company (1994).

*Primary Examiner*—Thien Minh Le
*Attorney, Agent, or Firm*—Wilson, Sonsini, Goodrich & Rosati

[57] ABSTRACT

A cardless automated financial transaction apparatus includes an input device configured to generate an input signal corresponding to a customer identifier in response to actuation of the input device by a customer, a biometric device configured to receive biometric information about the customer, a storage device including a database of customer information, the customer information including stored biometric information, a connection to a banking network provider, and an electronic processor. The processor is configured to receive the input signals from the input device, receive biometric information from the biometric device, and access the database of customer information in response to the input signals to obtain data about the customer identified by the customer identifier, the data including stored biometric information for the customer. The processor then compares the received biometric information to the stored biometric information, and provides a message to the banking network provider confirming the customer's identity when the received biometric information matches the stored biometric information.

41 Claims, 81 Drawing Sheets

6,045,039
Page 2

U.S. PATENT DOCUMENTS

| | | | |
|---|---|---|---|
| 4,624,808 | 11/1986 | Owens et al. | 235/379 |
| 4,669,487 | 6/1987 | Frieling | 128/774 |
| 4,672,377 | 6/1987 | Murphy et al. | 340/825.34 |
| 4,727,243 | 2/1988 | Savar | 235/379 |
| 4,729,128 | 3/1988 | Grimes et al. | 382/58 |
| 4,752,676 | 6/1988 | Leonard et al. | 235/379 |
| 4,845,636 | 7/1989 | Walker | 364/479 |
| 4,916,435 | 4/1990 | Fuller | 340/573 |
| 4,926,480 | 5/1990 | Chaum | 235/379 |
| 4,961,142 | 10/1990 | Elliott et al. | |
| 4,975,969 | 12/1990 | Tal | 382/2 |
| 4,975,978 | 12/1990 | Ando et al. | 382/50 |
| 4,993,068 | 2/1991 | Piosenka et al. | 380/23 |
| 5,023,782 | 6/1991 | Lutz et al. | 364/405 |
| 5,053,607 | 10/1991 | Carlson et al. | 235/379 |
| 5,056,147 | 10/1991 | Truner et al. | |
| 5,095,194 | 3/1992 | Barbanell | 235/379 |
| 5,144,680 | 9/1992 | Kobayashi et al. | 382/4 |
| 5,163,094 | 11/1992 | Prokoski et al. | 382/2 |
| 5,220,501 | 6/1993 | Lawlor et al. | 364/408 |
| 5,224,173 | 6/1993 | Kuhns et al. | 382/2 |
| 5,229,764 | 7/1993 | Matchett et al. | 340/825.34 |
| 5,265,008 | 11/1993 | Benton et al. | 364/408 |
| 5,291,560 | 3/1994 | Daugman | 382/2 |
| 5,305,196 | 4/1994 | Deaton et al. | 364/401 |
| 5,341,428 | 8/1994 | Schatz | 235/379 |
| 5,347,580 | 9/1994 | Molva et al. | 380/25 |
| 5,351,303 | 9/1994 | Willmore | 382/2 |
| 5,386,104 | 1/1995 | Sime | 235/379 |
| 5,408,536 | 4/1995 | Lemelson | 382/2 |
| 5,448,471 | 9/1995 | Deaton et al. | 364/401 |
| 5,469,506 | 11/1995 | Berson et al. | 380/23 |
| 5,502,774 | 3/1996 | Bellegarda et al. | 382/159 |
| 5,506,691 | 4/1996 | Bednar et al. | 358/402 |
| 5,513,272 | 4/1996 | Bogosian, Jr. | 382/116 |
| 5,534,682 | 7/1996 | Graef et al. | 235/379 |
| 5,546,471 | 8/1996 | Merjanian | 382/124 |
| 5,557,686 | 9/1996 | Brown et al. | 382/115 |
| 5,559,504 | 9/1996 | Itsumi et al. | 340/825.3 |
| 5,570,465 | 10/1996 | Tsakanikas | 395/114 |
| 5,581,630 | 12/1996 | Bonneau, Jr. | 382/116 |
| 5,592,377 | 1/1997 | Lipkin | 395/242 |
| 5,594,226 | 1/1997 | Steger | 235/379 |
| 5,594,806 | 1/1997 | Colbert | 382/115 |
| 5,600,114 | 2/1997 | Dunlap et al. | 235/379 |
| 5,602,933 | 2/1997 | Blackwell et al. | 382/116 |
| 5,604,802 | 2/1997 | Holloway | 380/24 |
| 5,613,012 | 3/1997 | Hoffman et al. | 382/115 |
| 5,663,546 | 9/1997 | Cucinotta et al. | 235/379 |
| 5,897,625 | 4/1999 | Gustin et al. | 705/43 |

| CRITERIA | VALUE |
|---|---|
| AMOUNT OF CHECK | IF ONE OF THE FIRST 4 CHECKS CASHED FOR THE PAYEE CAN'T BE MORE THAN 15% OF ANY OF THE PREVIOUS CHECKS |
| AMOUNT OF CHECK | IF AFTER THE 4 CHECK FOR THE PAYEE CAN'T BE MORE THAN 25% OF ANY OF THE PREVIOUS CHECKS |
| AMOUNT OF CHECK | IF CHECK EXCEEDS SET LIMITS |
| CHECK ENDORSEMENT | IF CHECK ENDORSEMENT IS NOT FOUND |
| CAV COMPARISON | IF AMOUNT READ BY OCR MODULE DIFFERS FROM AMOUNT ENTERED BY CUSTOMER, SEND TO CSC |
| PAYOR | IF NEW PAYOR |
| PAYOR | STATUS OF VERIFY |
| PAYOR LAST TRANSACTION DATE | IF OVER 33 DAYS SINCE LAST TRANSACTION |
| PAYOR | IF FILE IS TAGGED TO ALWAYS GO TO CENTRAL |
| PAYEE | IF NEW PAYEE |
| PAYEE | STATUS OF VERIFY |
| PAYEE'S LAST TRANSACTION DATE | IF ONE OF THE FIRST 4 CHECKS FOR THE PAYEE CASHED CAN'T BE LESS THAN 6 OR GREATER THAN 18 DAYS |
| PAYEE | FIRST 2 TRANSACTIONS ON PAYOR PROBATIONARY PERIOD |
| PAYEE'S LAST TRANSACTION DATE | IF AFTER THE 4 CHECKS FOR THE PAYEE CAN'T BE LESS THAN 6 OR GREATER THAN 63 DAYS |
| PAYEE'S BIOMETRIC IMAGE | DOES NOT MATCH |
| MICR | MICR DOES NOT READ PROPERLY |
| ATM | CASH MACHINE HAS INSUFFICIENT FUNDS FOR CURRENT TRANSACTION |
| CHECK NUMBER | DUPLICATE CHECK NUMBER |
| POS LAST COMMUNICATION DATE | POS LAST COMMUNICATION DATE WITH CSC IS GREATER THAN 7 DAYS |

| PAYEE MAINTENANCE |

SS#: [ ]  STATUS: [ ▼]  [ADD ANOTHER PAYEE] [CLOSE]
LASTNAME: [ ]
FIRSTNAME [ ]
MIDDLENAME: [ ]
PHONE: [ ]
ADDR1: [ ]
ADDR2: [ ]
CITY: [ ]  ST: [ ]  ZIP: [ ]
DOB: [ ]
SEX: [ ]
NOTES: [ ]

STARTDATE: [ ]
LAST UPDATE DATE: [ ]
LAST UPDATE TIME: [ ]

FIG. 11C

```
┌─────────────────────────────────────────────────────────┐
│ PAYOR MAINTENANCE                                        │
│                                                          │
│  RT#: [____] [_____]  ACCT#: [_____]      [CLOSE]  │
│  FEDERAL ID#: [_____]  STATUS: [___▼]         │
│  NAME:    [_____]                                   │
│  ADDR1:   [_____]             │
│  ADDR2:   [_____]             │
│  CITY:    [_____]  ST: [___]   ZIP: [_____]       │
│  PHONE:   [_____]                                    │
│  CHECKTYPE: [___]                                        │
│  STARTDATE: [_____]                                    │
│  NOTES:   [                                          ]   │
│           [                                          ]   │
│           [                                          ]   │
│                                                          │
│  LAST UPDATE DATE: [_____]                             │
│  LAST UPDATE TIME: [_____]                             │
│                                                          │
└─────────────────────────────────────────────────────────┘
```

FIG. 11D

```
┌─────────────────────────────────────┐
│ SUPERVISOR APPROVAL                  │
│                                      │
│   PLEASE ENTER SUPERVISOR CODE:      │
│                                      │
│            [_____]                │
│                                      │
│          [ OK ]  [ CANCEL ]          │
└─────────────────────────────────────┘
```

FIG. 11E

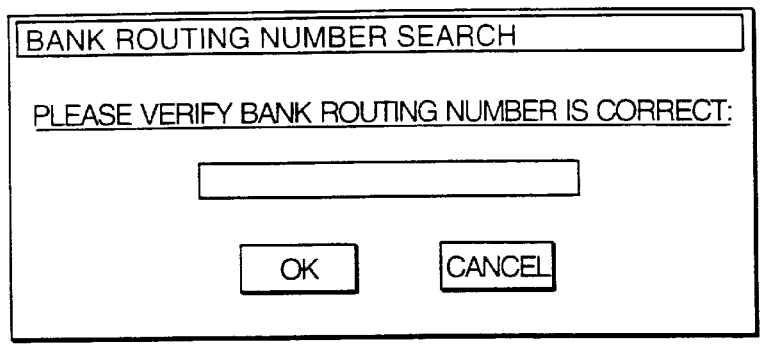
FIG. 11I
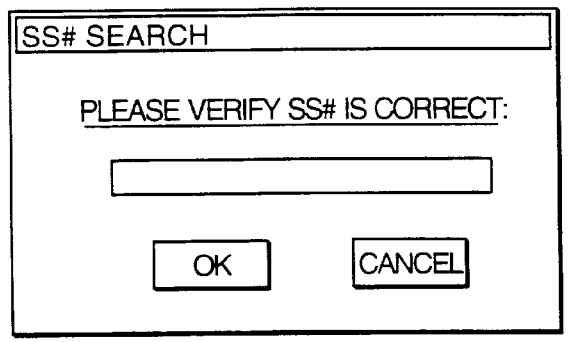
FIG. 11J
FIG. 11K

TRANSACTION MAINTENANCE

- STORE_ID:
- RT#:
- ACCT#:
- CHECK#:
- AMOUNT:
- SS#:
- FEE%:
- FEE:
- PAYBACK:

FIG. 11L

ACTION MAINTENANCE

- ACTION NUMBER: 01
- DESCRIPTION: PAYOR MAINTENANCE

FIG. 11M

| □ SS# SEARCH RESULTS | _ □ × |
|---|---|

SOCIAL SECURITY SEARCH RESULTS    NEW SEARCH

NAME: [    ]  DOB: [    ]    CLOSE
STREET ADDR: [    ]    DATE ADDR UPDATED: [    ]
CITY: [    ] ST: [ ] ZIP: [    ] PHONE NUMBER: [    ]

SECOND STREET ADDR: [    ]    DATE ADDR UPDATED: [    ]
SECOND CITY: [    ] SECOND ST: [ ] SECOND ZIP: [    ]

THIRD STREET ADDR: [    ]    DATE ADDR UPDATED: [    ]
THIRD CITY: [    ] THIRD ST: [ ] THIRD ZIP: [    ]

REFERRAL MAINTENANCE

SAVE    CLOSE

REFERRAL MAINTENANCE

REFERRAL NUMBER: [01]

DESCRIPTION:

NEW PAYOR

ACTION NUMBER: [01]

STATUS: [M]

FIG. 11N

| | REFERRALS | |
|---|---|---|
| REFERRAL 01 | NEW PAYOR | ACTIONS REQUIRED 01.04.07 |
| REFERRAL 02 | NEW PAYEE | ACTIONS REQUIRED 02.03.07.97 |
| REFERRAL 03 | PAYOR STATUS:VERIFY | ACTIONS REQUIRED 01.09 |
| REFERRAL 04 | PAYEE STATUS:VERIFY | ACTIONS REQUIRED 02.09 |
| REFERRAL 05 | PAYOR LAST TRANSACTION IS MORE THAN 33 DAYS | ACTIONS REQUIRED 04.07 |
| REFERRAL 06 | PAYOR FILE TAGGED TO ALWAYS GO TO CENTRAL | ACTIONS REQUIRED 04.07.09 |
| REFERRAL 07 | PAYEE'S LAST CHECK IS LESS THAN 6 OR MORE THAN 18 DAYS FROM CURRENT TRANSACTION FOR GIVEN PAYOR (FIRST 5 CHECKS) | ACTION REQUIRED 07 |
| REFERRAL 08 | PAYEE'S LAST CHECK IS LESS THAN 6 OR MORE THAN 63 DAYS FROM CURRENT TRANSACTION FOR GIVEN PAYOR | ACTION REQUIRED 07 |
| REFERRAL 09 | BIOMETRICS IMAGE DOES NOT MATCH FOR EXISTING CUSTOMER | ACTION REQUIRED 10 |
| REFERRAL 10 | FIRST 2 TRANSACTIONS ON PAYOR PROBATIONARY PERIOD | ACTION REQUIRED 04 |
| REFERRAL 11 | LARGE CHECK AMOUNT IN EXCESS OF 15% | ACTIONS REQUIRED 04.07 |
| REFERRAL 12 | LARGE CHECK AMOUNT IN EXCESS OF 25% | ACTIONS REQUIRED 04.07 |
| REFERRAL 13 | CHECK EXCEEDS SET LIMITS | ACTIONS REQUIRED 04.07.09 |
| REFERRAL 14 | OCR AMOUNT READ DIFFERS FROM CUSTOMER INPUT | ACTION REQUIRED 11 |
| REFERRAL 15 | MICR LINE DID NOT READ PROPERLY | ACTION REQUIRED 09 |
| REFERRAL 16 | CHECK ENDORSEMENT NOT FOUND | ACTION REQUIRED 12 |
| REFERRAL 17 | CASH MACHINE HAS INSUFFICIENT FUNDS FOR CURRENT TRANSACTION | ACTIONS REQUIRED 97.99 |
| REFERRAL 18 | DUPLICATE CHECK NUMBER | ACTIONS REQUIRED 04.07 |
| REFERRAL 19 | POS LAST COMMUNICATION DATE WITH CSC IS GREATER THAN 7 DAYS | ACTION REQUIRED 09 |

FIG. 12A

REFERRAL 05 - PAYOR LAST TRANSACTION DATE IS MORE THAN 33 DAYS

REFERRAL 06 - PAYOR FILE TAGGED TO ALWAYS GO TO CENTRAL

REFERRAL 07 - PAYEE'S LAST CHECK IS LESS THAN 6 OR MORE THAN 18 DAYS FROM CURRENT TRANSACTION FOR GIVEN PAYOR (1ST 5 CHECKS ONLY)

REFERRAL 08 - PAYEE'S LAST CHECK IS LESS THAN 6 OR MORE THAN 63 DAYS FROM CURRENT TRANSACTION FOR GIVEN PAYOR

REFERRAL 09 - PAYEE'S BIOMETRICS IMAGE DOES NOT MATCH FOR EXISTING CUSTOMER

REFERRAL 11 - LARGE CHECK AMOUNT IN EXCESS 15%

REFERRAL 12 - LARGE CHECK AMOUNT IN EXCESS OF 25%

REFERRAL 13 - CHECK EXCEEDS SET LIMITS

REFERRAL 14 - OCR AMOUNT READ DIFFERS FROM CUSTOMER INPUT

REFERRAL 15 - MICR LINE DID NOT READ PROPERLY

REFERRAL 16 - CHECK ENDORSEMENT NOT FOUND

REFERRAL 17 - CASH MACHINE HAS INSUFFICIENT FUNDS

REFERRAL 18 - DUPLICATE CHECK NUMBER

REFERRAL 19 - POS LAST COMMUNICATION DATE WITH CSC IS GREATER THAN 7 DAYS

ACTION 02 - PAYEE MAINTENANCE

ACTION 04 - VERIFY FUNDS

ACTION 06 - PAYEE HISTORY

ACTION 11 - VERIFY CHECK

ACTION 12 - VERIFY ENDORSEMENT

ACTION 97 - CALL CUSTOMER

SHARED TABLES

| TABLE | FIELD | TYPE | LEN | KEY | SECONDARY INDEXES |
|---|---|---|---|---|---|
| CHTYPE | CHECKTYPE | ALPHA | 1 | * | |
| | FEE% | NUMERIC 4.2 | | | |
| | DESC | ALPHA | 30 | | |
| | LIMIT | NUMERIC 9.2 | | | |
| MINFEE | MAX | NUMERIC 7.2 | | | |
| | FEE | NUMERIC 7.2 | | * | |
| PAYEE | SS# | ALPHA | 9 | * | FULLNAME(LASTNAME+FIRSTNAME) |
| | STATUS | ALPHA | 1 | | |
| | LASTNAME | ALPHA | 15 | | LASTNAME(FIRSTNAME) |
| | FIRSTNAME | ALPHA | 15 | | LNAMEDOB(LASTNAME+DOB) |
| | MIDDLENAME | ALPHA | 15 | | LFMNAMEDOB(LASTNAME+FIRSTNAME) |
| | PHONE | ALPHA | 20 | | |
| | ADDR1 | ALPHA | 30 | | |
| | ADDR2 | ALPHA | 30 | | |
| | CITY | ALPHA | 15 | | |
| | ST | ALPHA | 2 | | |
| | ZIP | ALPHA | 10 | | |
| | DOB | DATE | | | |
| | SEX | ALPHA | 1 | | |
| | LASTUPDATEDATE | DATE | | | |
| | LASTUPDATETIME | TIME | | | |
| | STARTDATE | DATE | | | |
| PAYEEID | SS# | ALPHA | 9 | * | |
| | ID# | ALPHA | 15 | * | ID# (ID#) |
| | IDTYPE | ALPHA | 3 | * | |
| | IDST | ALPHA | 2 | | |

FIG. 15A

| | | | | |
|---|---|---|---|---|
| PAYOR | RT# | ALPHA | 9 | |
| | ACCT# | ALPHA | 20 | |
| | STATUS | ALPHA | 3 | |
| | FEDID# | ALPHA | 20 | |
| | NAME | ALPHA | 30 | * NAME (NAME) |
| | ADDR1 | ALPHA | 30 | * RT_ACCT (RT# +ACCT#) |
| | ADDR2 | ALPHA | 30 | |
| | CITY | ALPHA | 20 | CITY (CITY) |
| | ST | ALPHA | 2 | ACCT# (ACCT#) |
| | ZIP | ALPHA | 10 | RT# (RT#) |
| | PHONE | ALPHA | 12 | |
| | LASTUPDATEDATE | DATE | | |
| | LASTUPDATETIME | TIME | | |
| | STARTDATE | DATE | | |
| | CHECKTYPE | ALPHA | 1 | |
| OPERATOR | OPERATORID | ALPHA | 10 | * NAME (NAME) |
| | PASSWORD | ALPHA | 10 | |
| | NAME | ALPHA | 25 | |
| | SECLEV | NUMERIC | 2 | |
| | LANGUAGE | ALPHA | 1 | |

FIG. 15B

NON SHARED TABLES

| TABLE | FIELD | TYPE | LEN | KEY | SECONDARY INDEXES |
|---|---|---|---|---|---|
| CHECKAUD | STORE_ID | ALPHA | 10 | * | |
| | TRANS# | NUMERIC | 10 | * | SSN |
| | SSN | ALPHA | 9 | * | RAC(RT# +ACCT#) |
| | RT# | ALPHA | 9 | | PCRECDATE(DESCENDING) |
| | ACCT# | ALPHA | 20 | | |
| | CHECK# | ALPHA | 30 | | |
| | CHECKSCAN | ALPHA | 80 | | |
| | AMOUNT | NUMERIC | 10.2 | | |
| | FEE | NUMERIC | 10.2 | | |
| | LANGUAGE | NUMERIC | 1 | | |
| | OPERATORID | ALPHA | 10 | | |
| | RETURNED | ALPHA | 1 | | |
| | MRPR DISP | NUMERIC | 2 | | |
| | CUSTOMER DISP | NUMERIC | 2 | | |
| | HARDWARE DISP | NUMERIC | 2 | | |
| | PCRECDATE | DATE | | | |
| | PCRECTIME | TIME | | | |
| | CSCORERECDATE | DATE | | | |
| | CSCORERECTIME | TIME | | | |
| | OPERRECDATE | DATE | | | |
| | OPERRECTIME | TIME | | | |
| | OPERCMPDATE | DATE | | | |
| | OPERCMPTIME | TIME | | | |
| | ATMCOMPDATE | DATE | | | |
| | ATMCOMPTIME | TIME | | | |

FIG. 15C

| CHECK | | | |
|---|---|---|---|
| SUPERVISOR | ALPHA | 10 | |
| STOREID | ALPHA | 10 | |
| TRANS# | NUMERIC | 8 | * |
| SSN | ALPHA | 9 | * |
| RT# | ALPHA | 9 | * |
| ACCT# | ALPHA | 20 | RAC (RT# + ACCT#) |
| CHECK# | ALPHA | 30 | PCRECDATE(DESCENDING) SSN |
| CHECKSCAN | ALPHA | 80 | OPERATORID |
| AMOUNT | NUMERIC | 10.2 | |
| FEE | NUMERIC | 10.2 | |
| LANGUAGE | NUMERIC | 1 | |
| OPERATORID | ALPHA | 10 | |
| RETURNED | ALPHA | 1 | |
| MRPR DISP | NUMERIC | 2 | |
| CUSTOMER DISP | NUMERIC | 2 | |
| HARDWARE DISP | NUMERIC | 2 | |
| PCRECDATE | DATE | | |
| PCRECTIME | TIME | | |
| CSCCORERECDATE | DATE | | |
| CSCCORERECTIME | TIME | | |
| OPERRECDATE | DATE | | |
| OPERRECTIME | TIME | | |
| OPERCMPDATE | DATE | | |
| OPERCMPTIME | TIME | | |

FIG. 15D

|  |  |  |  |  |
|---|---|---|---|---|
| | ATMCOMPDATE | DATE | | |
| | ATMCOMPTIME | TIME | | |
| | SUPERVISOR | ALPHA | 10 | |
| POSINFO | STORE_ID | ALPHA | 10 | * |
| | BDEN1 | NUMERIC | 4 | |
| | BDEN2 | NUMERIC | 4 | |
| | BDEN3 | NUMERIC | 4 | |
| | BDEN4 | NUMERIC | 4 | |
| | CDEN1 | NUMERIC | 3.2 | |
| | CDEN2 | NUMERIC | 3.2 | |
| | CDEN3 | NUMERIC | 3.2 | |
| | CDEN4 | NUMERIC | 3.2 | |
| | LASTCOMMPOSDATE | DATE | | |
| | LASTCOMMPOSTIME | TIME | | |
| | POSDATAPHONE | ALPHA | 10 | |
| | POSVOICEPHONE | ALPHA | 10 | |
| | FIRSTNSFGRACE | NUMERIC | 2 | |
| CHKREJRSN | STORE_ID | ALPHA | 10 | * |
| | TRANS# | NUMERIC | 10 | * |
| | RSNCODE | ALPHA | 2 | |
| REJRSN | RSNCODE | ALPHA | 2 | * |
| | RSNDESC | ALPHA | 130 | |
| CHKREFRL | STOREID | ALPHA | 10 | * |
| | TRANS# | NUMERIC | 10 | * |
| | REFNUM | ALPHA | 2 | |

FIG. 15E

| | | | | |
|---|---|---|---|---|
| PRYNOTES | RT# | ALPHA | 9 | * |
| | ACCT# | ALPHA | 20 | * |
| | NOTES | ALPHA | 600 | |
| PYENOTES | SSN | ALPHA | 9 | * |
| | NOTES | ALPHA | 600 | |
| CHKRTN | STOREID | ALPHA | 10 | * |
| | TRANS# | NUMERIC | 10 | * |
| | SSN | ALPHA | 9 | * |
| | RTNDATE | DATE | | |
| | RTNREASON | ALPHA | 130 | |
| POSSITES | STOREID | ALPHA | 10 | * |
| | ADDR1 | ALPHA | 30 | |
| | ADDR2 | ALPHA | 30 | |
| | CITY | ALPHA | 20 | |
| | STATE | ALPHA | 2 | |
| SSRSLTS | SSNUM | ALPHA | 9 | * |
| | SEQ# | NUMERIC | 2 | * |
| | FIRSTNAME | ALPHA | 20 | |
| | MIDDLENAME | ALPHA | 20 | |
| | LASTNAME | ALPHA | 20 | |
| | HOUSENUM | ALPHA | 10 | |
| | STREETNAME | ALPHA | 20 | |
| | STREETTYPE | ALPHA | 10 | |
| | APARTNUM | ALPHA | 10 | |

FIG. 15F

| | | |
|---|---|---|
| CITY | ALPHA | 20 |
| STATE | ALPHA | 2 |
| ZIP | ALPHA | 9 |
| PHONENUM | ALPHA | 10 |
| DOB | ALPHA | 8 |
| DATEADDR | DATE | |
| SECHOUSENUM | ALPHA | 6 |
| SECSTNAME | ALPHA | 19 |
| SECSTTYPE | ALPHA | 2 |
| SECAPARTNUM | A | 5 |
| SECCITY | A | 16 |
| SECSTATE | A | 2 |
| SECZIP | A | 9 |
| DATEADDR2 | DATE | |
| THRDHOUSENUM | A | 6 |
| THRDSTNAME | A | 19 |
| THRDSTTYPE | A | 2 |
| THRDAPARTNUM | A | 5 |
| THRDCITY | A | 16 |
| THRDSTATE | A | 2 |
| THRDZIP | A | 9 |
| DATEADDR3 | DATE | |

FIG. 15G

| | | | |
|---|---|---|---|
| INPUTQUERY | IDENTIFIER | ALPHA | 2 |
| | TYPE | ALPHA | 3 |
| | LASTNAME | ALPHA | 20 |
| | MIDDLENAME | ALPHA | 10 |
| | FIRSTNAME | ALPHA | 10 |
| | FIRSTNAMETYPE | ALPHA | 1 |
| | STREETNUM | ALPHA | 7 |
| | PREDIR | ALPHA | 2 |
| | NAME | ALPHA | 19 |
| | TYPE | ALPHA | 2 |
| | APARTNUM | ALPHA | 5 |
| | UNUSED | ALPHA | 4 |
| | CITY | ALPHA | 15 |
| | STATE | ALPHA | 2 |
| | ZIP | ALPHA | 9 |
| | PHONE | ALPHA | 10 |
| | TIESFLAG | ALPHA | 1 |
| | SCROLLKEY | ALPHA | 6 |
| | CUSTACCT | ALPHA | 18 |
| | NAMEPARSEFLG | ALPHA | 1 |
| | SSNUM | ALPHA | 9 |
| | DRIVERSNUM | ALPHA | 27 |
| | DRIVERSTATE | ALPHA | 2 |

FIG. 15H

|  |  |  |  |  |  |
|---|---|---|---|---|---|
| | STREETPARSEFLG | ALPHA | 1 | | |
| | DOB | ALPHA | 8 | | |
| | EMPSEGCOUNT | ALPHA | 1 | | |
| | PROPSEGCOUNT | ALPHA | 1 | | |
| | MISCSEGCOUNT | ALPHA | 1 | | |
| | RESERVED | ALPHA | 52 | | |
| BANKINFO | ITUPDATE | ALPHA | 6 | | |
| | INSTTYPE | ALPHA | 2 | | |
| | RTMICR | ALPHA | 9 | * | RTMICR |
| | INSTNAME | ALPHA | 50 | | |
| | STADDR | ALPHA | 40 | | |
| | CITY | ALPHA | 30 | | |
| | STABBR | ALPHA | 2 | | |
| | ZIPCODE | ALPHA | 5 | | |
| | ZIP4 | ALPHA | 4 | | |
| | AREACODE | ALPHA | 3 | | |
| | PHONENUM | ALPHA | 7 | | |
| | PHONEEXT | ALPHA | 5 | | |
| | Fedresrv | ALPHA | 6 | | |
| ACTIONS | ACTIONNUM | ALPHA | 2 | * | |
| | DESCRIPTION | ALPHA | 130 | | |
| | HELPTEXT | ALPHA | 130 | | |

FIG. 15I

| | | | | | |
|---|---|---|---|---|---|
| REFERRALS | REFNUM | ALPHA | 2 | * | |
| | DESCRIPTION | ALPHA | 120 | | |
| | ACTIONNUM | ALPHA | 2 | * | |
| | STATUS | ALPHA | 1 | | |
| PYETMPL | SSN | ALPHA | 9 | * | TMPL |
| | TMPL | BLOB | | | SSN |
| PYETRANSPIC | TRANS# | NUMERIC | 10 | * | |
| | BMPFILENAME | | | | |
| PYEPIC | SSN | ALPHA | 9 | * | |
| | BMPFILENAME | | | | |
| ATMINVBILLS | STOREID | ALPHA | 10 | * | |
| | DATE | DATE | | * | |
| | TIME | TIME | | * | |
| | CNT_BILLS_1 | NUMERIC | 4.0 | | |
| | CNT_BILLS_2 | NUMERIC | 4.0 | | |
| | CNT_BILLS_3 | NUMERIC | 4.0 | | |
| | CNT_BILLS_4 | NUMERIC | 4.0 | | |
| | CNT_BILLS_1_REJ | NUMERIC | 4.0 | | |
| | CNT_BILLS_2_REJ | NUMERIC | 4.0 | | |
| | CNT_BILLS_3_REJ | NUMERIC | 4.0 | | |
| | CNT_BILLS_4_REJ | NUMERIC | 4.0 | | |

FIG. 15J

|  |  |  |  |  |
|---|---|---|---|---|
|  | CNT_BILLS_1_STS | ALPHA | 1.0 |  |
|  | CNT_BILLS_2_STS | ALPHA | 1.0 |  |
|  | CNT_BILLS_3_STS | ALPHA | 1.0 |  |
|  | CNT_BILLS_4_STS | ALPHA | 1.0 |  |
| ATMINVCOINS | STOREID | ALPHA | 10 | * |
|  | DATE | DATE |  | * |
|  | TIME | TIME |  | * |
|  | CNT_COINS_1 | NUMERIC | 4.0 |  |
|  | CNT_COINS_2 | NUMERIC | 4.0 |  |
|  | CNT_COINS_3 | NUMERIC | 4.0 |  |
|  | CNT_COINS_4 | NUMERIC | 4.0 |  |
|  | CNT_COINS_1_STS | ALPHA | 1.0 |  |
|  | CNT_COINS_2_STS | ALPHA | 1.0 |  |
|  | CNT_COINS_3_STS | ALPHA | 1.0 |  |
|  | CNT_COINS_4_STS | ALPHA | 1.0 |  |
| ATMERRORLOG | STOREID | ALPHA | 10 | * |
| (UNSOLICITED) | DATE | DATE |  | * |
|  | TIME | TIME |  | * |
|  | MSGTYPE | ALPHA | 6 |  |
|  | MESSAGE | ALPHA | 100 |  |
| PRNTCHK | TRANS# | NUMERIC | 10 | * |
|  | BMPFILENAME |  |  |  |

FIG. 15K

|  |  |  |  |  |
|---|---|---|---|---|
| BAKCHK | TRANS# | NUMERIC | 10 | * |
|  | BMPFILENAME |  |  |  |

FIG. 15L

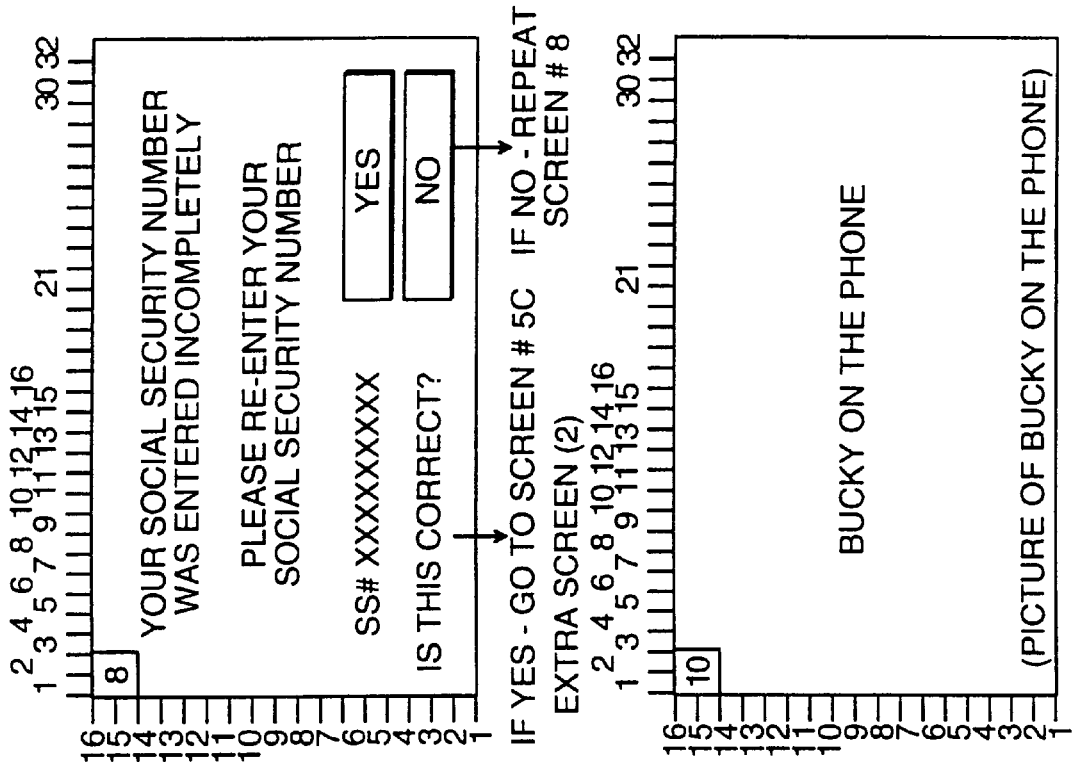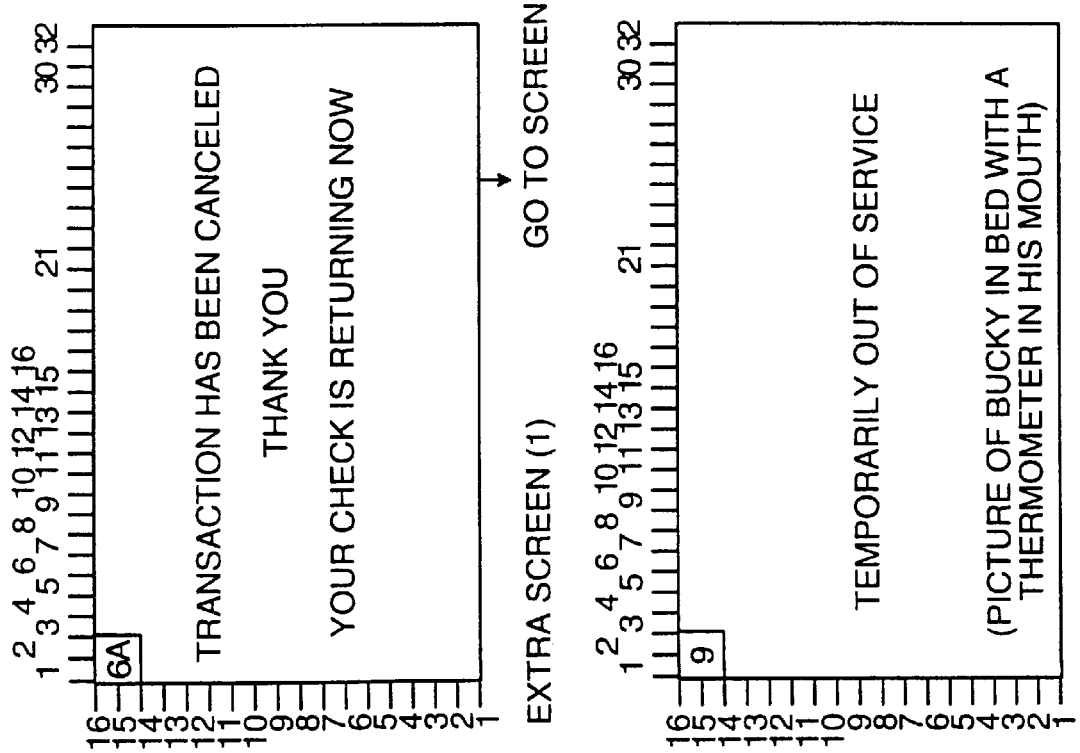
FIG. 16E

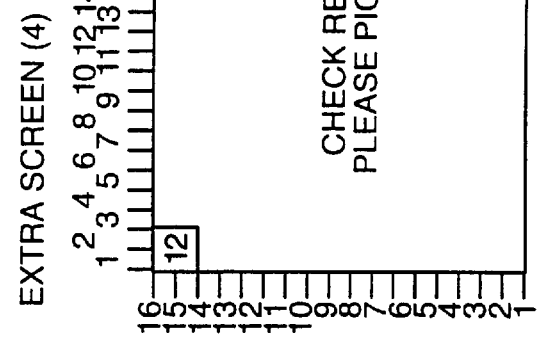
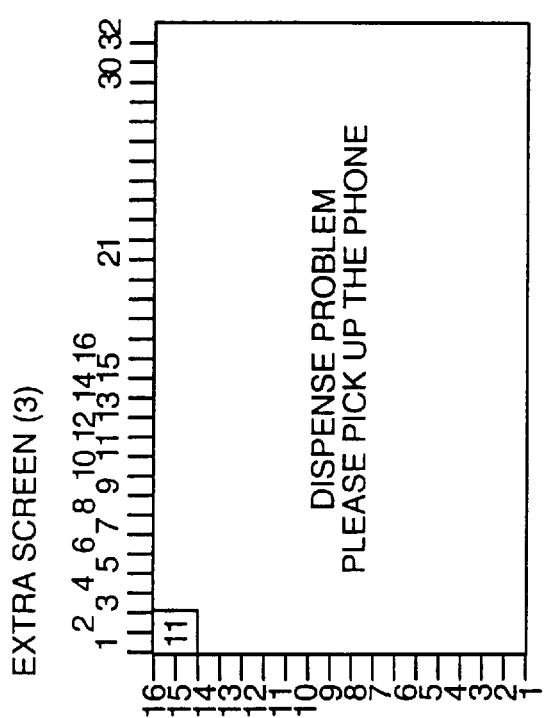
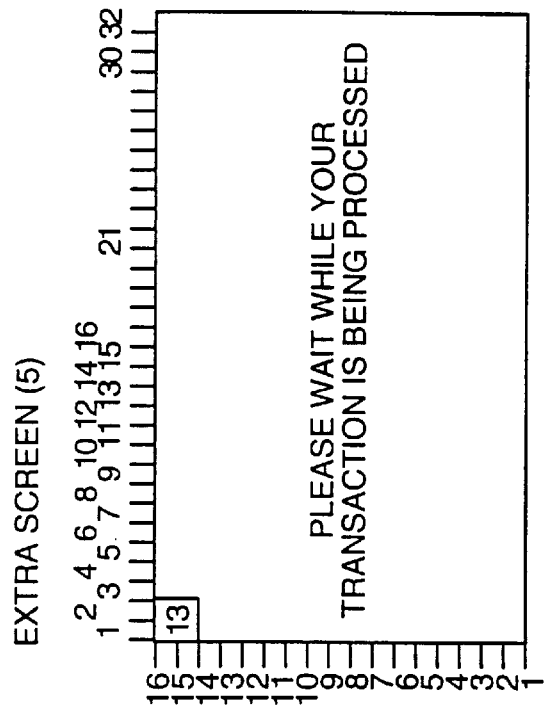
FIG. 16F

CARDLESS AUTOMATED TELLER TRANSACTIONS

CROSS REFERENCE TO RELATED APPLICATIONS

This application claims priority from U.S. provisional application Ser. No. 60/036,923, entitled "CHECK CASHING" and filed Feb. 6, 1997, and is a CIP U.S. application Ser. No. 08/854,321, entitled "CHECK CASHING" and filed May 12, 1997, both of which are incorporated by reference.

BACKGROUND

The invention relates to automated teller machines for use in performing financial transactions.

In general, a customer uses an automated teller machine ("ATM") to access the customer's bank account. For example, the customer may use the ATM to make deposits or withdrawals from a checking or savings account, or to determine the balance of such an account.

Traditional ATMs identify a customer based on an identification card provided by the customer's bank and a personal identification number ("PIN") that is recorded in a database and, presumably, known only to the customer. When using a traditional ATM, the customer inserts the identification card into a slot of the ATM. The card includes a magnetic strip on which is encoded information about the customer's bank accounts (e.g., the account number of the customer's checking account). The ATM responds to insertion of the card by prompting the customer to enter the customer's PIN. The ATM then compares the PIN entered by the customer to the PIN stored in the database. If the two PINs match, the ATM determines that the customer is authorized to access the account associated with the inserted card.

SUMMARY

The invention provides cardless automated financial transactions through unmanned ATMs. The ATMs use biometric information to confirm a customer's identity prior to contacting a banking network provider. For example, the ATM may produce an image of the customer's face as the customer types in an identification number, and then may compare the image with an image stored in association with the identification number to verify the customer's identity. Use of biometric information promises to vastly improve the identification process and to reduce or eliminate the occurrence of fraudulent ATM transactions. In addition, elimination of the need for identification cards when performing ATM transactions promises to increase the convenience of such transactions.

In one aspect, generally, an apparatus for providing cardless-automated financial transactions includes an input device configured to generate an input signal corresponding to a customer identifier in response to actuation of the input device by a customer, a biometric device configured to receive biometric information about the customer, a storage device including a database of customer information that includes stored biometric information, and a connection to a banking network provider. An electronic processor of the apparatus is configured to receive the input signals from the input device, receive biometric information from the biometric device, and access the database of customer information in response to the input signals to obtain data about the customer identified by the customer identifier, the data including stored biometric information for the customer. The processor then compares the received biometric information to the stored biometric information, and provides a message to the banking network provider confirming the customer's identity when the received biometric information matches the stored biometric information.

Embodiments of the apparatus may include one or more of the following features. The apparatus may further include a cash dispenser, with the electronic processor being configured to receive messages from the banking network provider through the connection and to signal the cash dispenser to dispense cash to the customer in response to a message from the banking network provider.

The biometric device may be a camera, such as a digital video camera, configured to obtain an image of the customer's face, and the biometric information may be the image of the customer's face. The camera may be configured to obtain the image of the customer's face in response to actuation of the input device by the customer. The stored biometric information may include stored images of customers' faces, and comparing the received biometric information to the stored biometric information may include comparing an image of the customer's face from the database of customer information to the image of the customer's face produced by the camera to confirm the identity of the customer. The apparatus also may include a second camera configured to obtain a second image of the customer's face, and the processor may be configured to compare the first and second images when confirming the identity of the customer. The apparatus also may include lights positioned to illuminate the customer's face to improve an image obtained by the camera.

The biometric information also may include the customer's fingerprint.

The customer identifier may be an identification number, and may include multiple symbols. The input device may be configured to produce an input signal corresponding to one symbol in response to each actuation of the input device by the customer.

The apparatus may include an output device for providing information to the customer. For example, the input device and the output device may be provided by a touch screen display. The output device may be a speaker, and the apparatus may include a voice synthesizer connected to the speaker and configured to provide spoken information to the customer through the speaker. The input device may be a numeric keypad.

The apparatus may be configured to perform card-based automated financial transactions in addition to cardless transactions. To perform card-based-automated financial transactions, the apparatus may contact the connection to the banking network provider in response to insertion of a card into the card reader and entry of a personal identification number using the input device.

The apparatus may be configured to perform check-cashing transactions in addition to cardless automated financial transactions. To this end, the apparatus may include a check reader configured to receive and read a check to be processed, and a cash dispenser. The electronic processor may be configured to perform check-cashing transactions by receiving the input signals from the input device, receiving information about the check to be processed from the check reader, accessing the database of customer information to obtain data about the customer, determining automatically whether to accept or reject the check based on the input signals, the received information about the check, and the data about the customer, and upon accepting the check, signalling the cash dispenser to dispense cash to the customer.

The apparatus may be configured to determine automatically whether to accept or reject the check by applying a set of business rules. The business rules may be defined generally to permit the processor to accept the check if the customer has used the apparatus previously to cash a previous check for a similar amount from a payor associated with the check to be processed.

The apparatus also may be configured to accept the check when the database of customer information includes a record for the customer and other criteria are met. For example, the processor may be configured to accept the check when criteria stored in the record for the customer are met. The processor may be configured to reject the check when a criterion stored in the record for the customer is not met.

The storage device also may include a database of payor information, and the processor may be configured to accept the check when the database of customer information includes a record for the customer, criteria stored in the record for the customer are met, the database of payor information includes a record for a payor of the check, and criteria stored in the record for the payor are met. The processor may be configured to reject the check when a criterion stored in the record for the payor is not met.

A system for providing cardless automated financial transactions may include one or more instances of the apparatus along with a remotely located service center. Each apparatus may include a first communications device connected to the processor, and the service center may include a second communications device configured to communicate with the first communications device. For example, the second communications device may be configured to communicate with the first communications device using a public telephone network.

The processor may be configured to confirm the identity of the customer when the database of customer information includes a record for the customer and the received biometric information matches the stored biometric information, and to contact the remotely-located service center for assistance when the database of customer information does not include a record for the customer. The processor also may be configured to contact the remotely-located service center for assistance when the received biometric information does not match the stored biometric information.

The service center may include a storage device including a central database of customer information, the customer information including stored biometric information, and an electronic processor connected to the second communications device and the storage device. The processor of the service center may be configured to receive information about a customer from the second communications device, the information including received biometric information for the customer, and to access the central database of customer information to obtain data about the customer identified by the customer identifier, the data including biometric information stored in the central database for the customer. The processor then may compare the received biometric information to the biometric information stored in the central database for the customer, and control the second communications device to transmit to the first communications device an indication of whether the received biometric information matches the biometric information stored in the central database for the customer.

The processor of the service center may be configured to contact a human operator at the service center for assistance when the received biometric information does not match the biometric information stored in the central database for the customer. The database of customer information stored on the storage device of the apparatus may include only a partial subset of the customer information of the central database of customer information.

The service center also may include a display device for use by a human operator. The processor of the service center may be configured to display information about a transaction on the display device when the received biometric information does not match the biometric information stored in the central database for the customer, to permit the human operator to confirm the customer's identity. For example, the operator may ask the customer to remove a hat or sunglasses and to look directly into the camera. The operator also may verify the customer's identity by referencing a database that includes information about the customer's current and previous addresses, telephone numbers, and neighbors. Access to a database suitable for this purpose is available, for example, from Integrated Database Software, Inc. of Villa Park, Ill.

The first communications device may be configured to initiate communications with the second communications device and to reject communications initiated by the second communications device.

In another general aspect, the invention features an apparatus for providing cardless automated payroll distribution. The apparatus includes an input device configured to generate an input signal corresponding to a customer identifier in response to actuation of the input device by a customer, a biometric device configured to receive biometric information about the customer, a storage device including a database of customer information that includes stored biometric information and a stored payroll amount for the customer, a cash dispenser, and an electronic processor. The processor is configured to receive the input signals from the input device, receive biometric information from the biometric device, and to access the database of customer information in response to the input signals to obtain data about the customer identified by the customer identifier, the data including stored biometric information for the customer. The processor compares the received biometric information to the stored biometric information, and controls the cash dispenser to dispense an amount of cash that equals or is less than the payroll amount when the received biometric information matches the stored biometric information.

Embodiments may include one or more of the following features. Since automated payroll processing does not require the use of checks, the apparatus may not include a check processing module. The biometric device may be a camera configured to obtain an image of the customer's face, and the biometric information may be the image of the customer's face.

A system including the apparatus may include a remotely-located service center. The apparatus may include a first communications device connected to the processor, and the service center may include a second communications device configured to communicate with the first communications device. The service center also includes a storage device including a central database of customer information, the customer information including stored biometric information and a stored payroll amount for the customer, and an electronic processor connected to the second communications device and the storage device. The processor is configured to receive information about a customer from the second communications device, the information including received biometric information for the customer, to access the central database of customer information to obtain data about the customer identified by the customer identifier, the data including biometric information stored in the central database for the customer, to compare the received biometric information to the biometric information stored in the central database for the customer, and to control the second communications device to transmit to the first communications device an indication of whether the received biometric information matches the biometric information stored in the central database for the customer. The electronic processor of the service center is further configured to enter the payroll amount into the central database of customer information and to transmit the payroll amount to the database of customer information at the apparatus using the second communications device.

An apparatus for providing cardless automated financial transactions and/or cardless automated payroll distribution may be implemented using a retrofit module connected to an automated teller machine having an input device, a card reader, and a cash dispenser. The retrofit module is configured to be connected to the automated teller machine and includes an input/output port configured to receive an input signal from the input device of the automated teller machine. The input signal corresponds to a customer identifier and is generated in response to actuation of the input device by the customer. The retrofit module also includes a biometric device, a storage device and an electronic processor. The biometric device (e.g., a camera) is configured to receive biometric information about the customer (e.g., an image of the customer's face). The storage device includes a database of customer information, including stored biometric information for the customer. The electronic processor is connected to the input/output port, the biometric device, and the storage device, and is configured to receive the input signal from the input/output port and the biometric information from the biometric device. The processor then accesses the database of customer information in response to the input signal to obtain data about the customer identified by the customer identifier, including stored biometric information for the customer. The processor compares the received biometric information to the stored biometric information, and transmits a notification message to the input/output port. The notification message indicates that the customer's identity has been established when the received biometric information matches the stored biometric information.

Other features and advantages of the invention will be apparent from the following description, including the drawings, and from the claims.

BRIEF DESCRIPTION OF THE DRAWING

FIG. 9 is a table of business rules.

FIG. 10 is a screen display of the centralized services center of the check-cashing system of FIG. 5.

FIGS. 12A and 12B are tables of referrals and actions to be taken by the central services center of the check-cashing system of FIG. 5 in response to the referrals.

FIGS. 15A–15L are data structures employed by the check-cashing system of FIG. 5.

FIGS. 16A–16F are screen displays of a point-of-sale unit.

DESCRIPTION

Cardless automated teller transactions may be performed in conjunction with a check cashing system such as is described below. The transactions also may be performed using a system that also performs traditional ATM transactions, or using a dedicated system.

Figure 1:
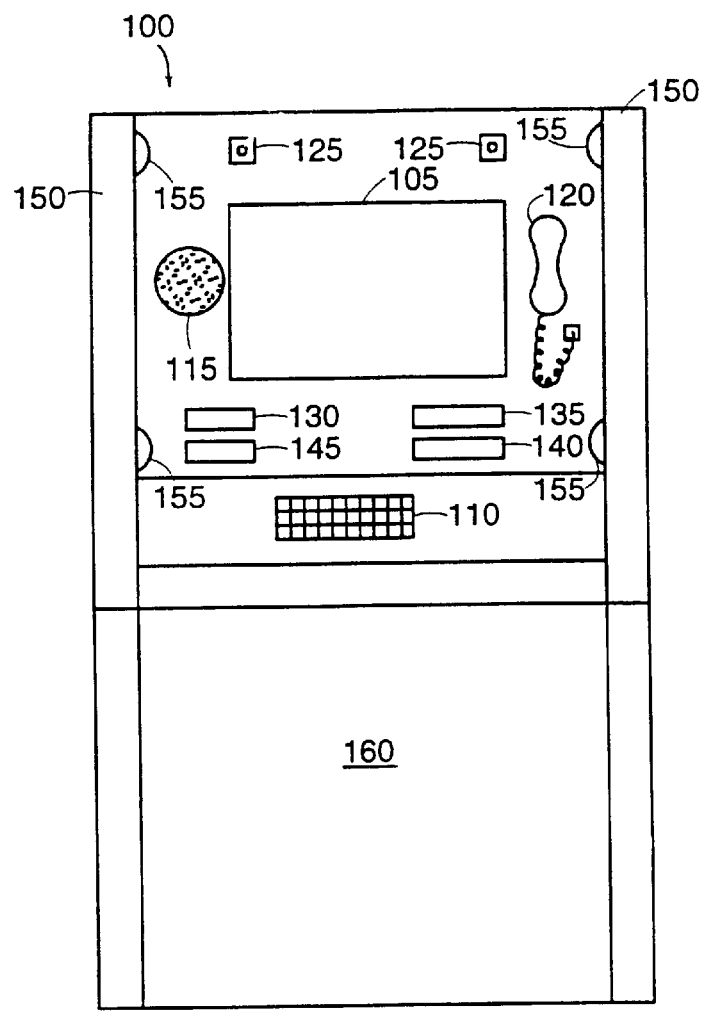
FIGS. 1 and 2 are front and side views of an automated check-cashing unit.
Figure 2:
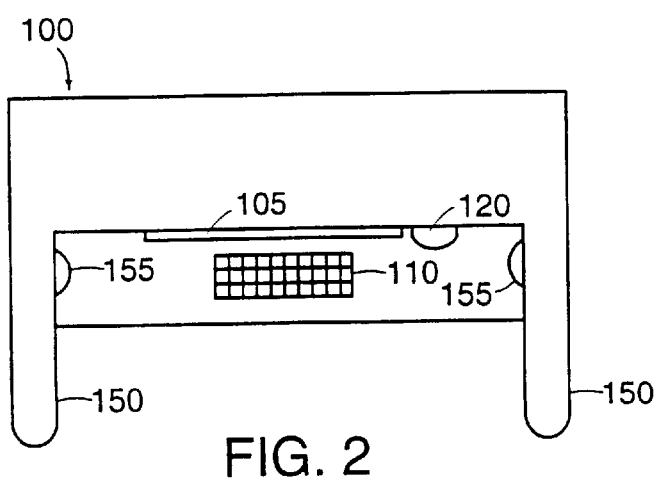

An automated check-cashing unit 100, also referred to as a point-of-sale ("POS") unit, is illustrated in FIGS. 1 and 2. The check-cashing unit 100 includes a touch-screen display 105, a numeric keypad 110, and a speaker 115 that permit the unit to communicate with a customer. A telephone handset 120 permits communication between the customer and a remote operator. A pair of digital video cameras 125 produce images of the customer that are used to verify the customer's identity.

The check-cashing unit 100 also includes a check reader 130 into which the customer's check is inserted for processing. When the unit 100 decides to cash the customer's check, a cash dispenser 135 provides cash to the customer and a printer 140 provides the customer with a receipt. In general, the cash dispenser 135 may include four cash drawers, with the drawers containing, respectively, $1, $5, $20 and $100 denominations. If desired, the cash dispenser 135 also may include a change dispenser. An optional card reader 145, though not needed for the check-cashing function of the unit 100, permits the unit 100 to provide banking functions (e.g., withdrawals from a checking or savings account) so that the unit 100 also may serve as a traditional automated teller machine ("ATM").

The check-cashing unit 100 also includes privacy screens 150 that provide the customer with a degree of privacy while using the checking unit. Lights 155 are positioned so as to illuminate the customer's face in a way that permits the video cameras 125 to produce high quality images.

An optional base 160 permits the check-cashing unit 100 to be configured as a stand-alone unit (as shown in FIGS. 1 and 2). The base 160 may be removed to configure the check-cashing unit 100 as a counter-top unit (not shown). The check-cashing unit also may be mounted within a wall, configured as a drive-through unit, or configured in other ways.

Figure 3:
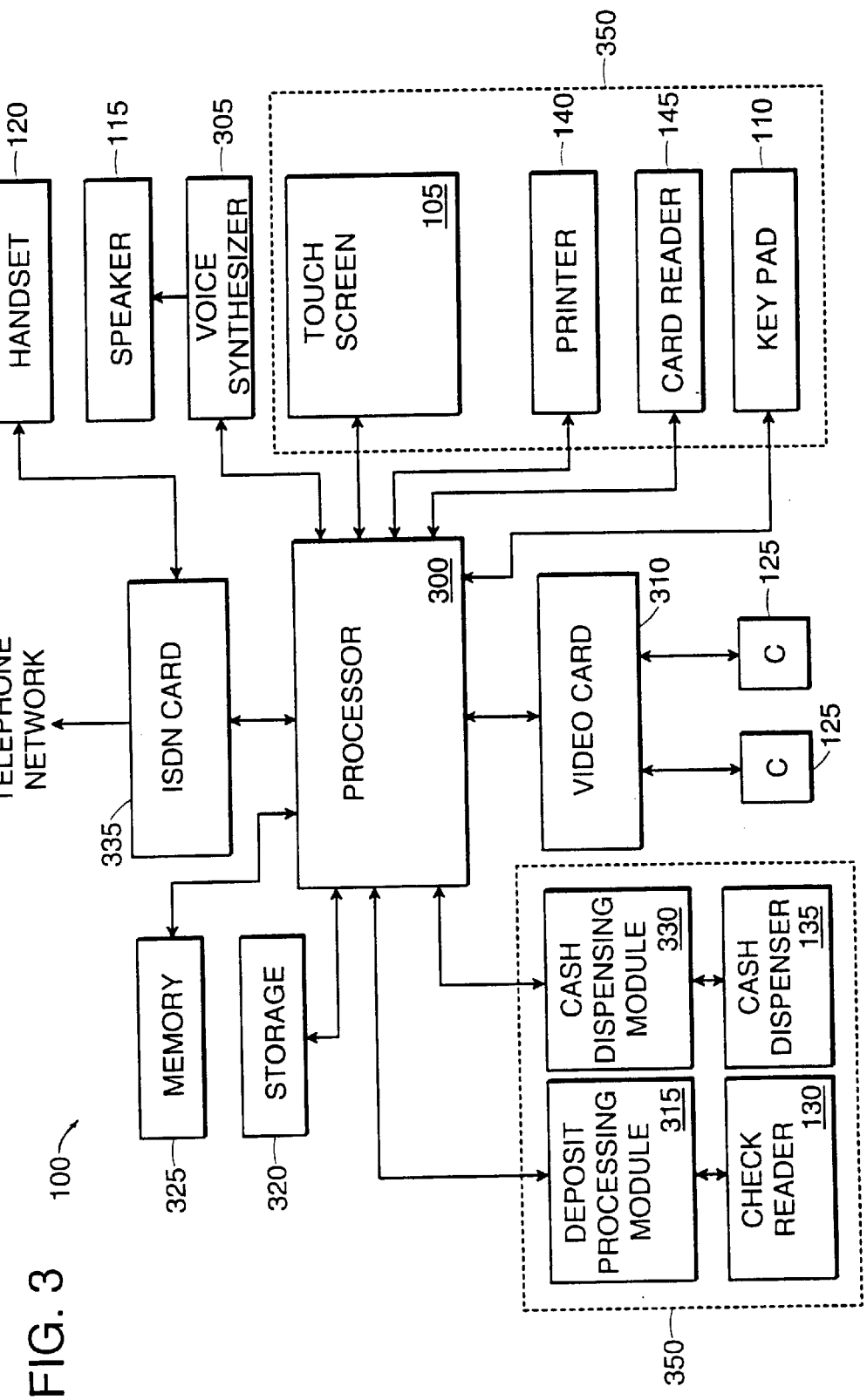
FIGS. 3 and 3A are block diagrams of the check-cashing unit of FIG. 1.

Referring to FIG. 3, the check-cashing unit 100 is controlled by a processor 300. The processor 300 receives input from the customer through the input portion of the touch screen 105 and through the keypad 110. The processor provides information to the customer through the display portion of the touch screen 110. The processor also may use a voice synthesizer 305 to speak to the customer through the speaker 115.

A video card 310 permits the processor 300 to receive images from the cameras 125. The processor 300 uses these images to identify the customer. In some instances, the processor may receive information about the customer's identity from the card reader 145.

Figure 3A:
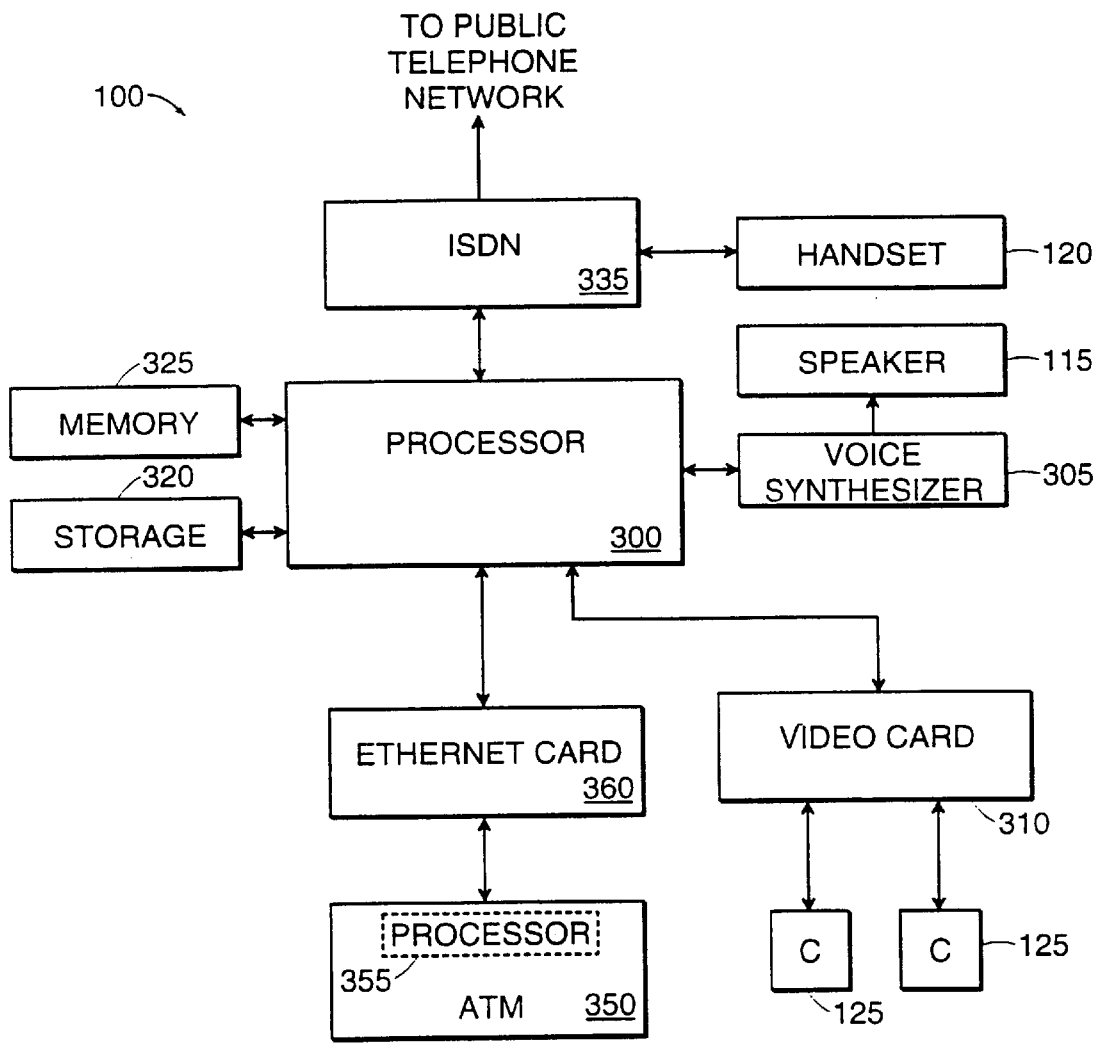

A deposit processing module 315 connected to the check reader 130 provides the processor with information about the customer's check. Using a database loaded from a storage device 320 into memory 325, the processor verifies the customer's identity and determines whether the processor is authorized to cash the customer's check. If the processor concludes that it is authorized to cash the customer's check, the processor instructs a cash dispensing module 330 to dispense an appropriate amount of cash to the customer through the cash dispenser 135. The processor 300 provides the customer with a receipt through the printer 140. As indicated by the dashed lines in FIG. 3 and illustrated in FIG. 3A, the touch screen the key the keypad 110, deposit processing module 315, the check reader 130, the cash dispensing module 330, the cash dispenser 135, the printer 140, and the card reader 145 may be implemented using a commercially-available automated teller machine ("ATM") 350, such as the DPATM Model Number 5675 available from the NCR Corporation. The processor 300 may communicate with a processor 355 (FIG. 3A) of the ATM through, for example, an ethernet connection provided by an Ethernet card 360 (FIG. 3A), and may communicate according to the TCP/IP protocol.

Figure 4:
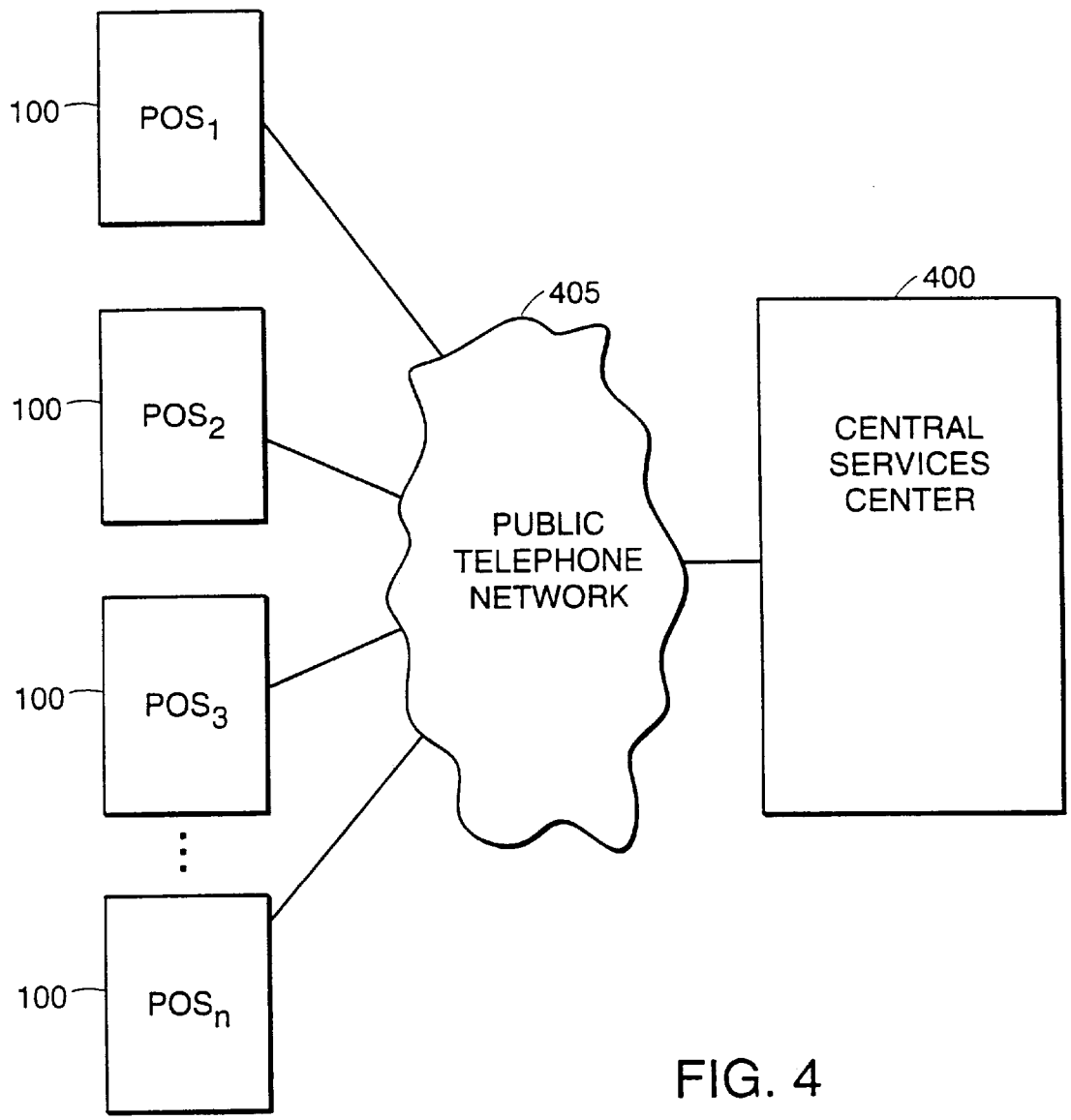
FIGS. 4, 5, 5A and 5B are block diagrams of check-cashing systems using the check-cashing unit of FIG. 1.

When the processor 300 is unable to verify the customer's identity, or is unauthorized to cash the customer's check automatically, the processor may transmit information about the customer and the customer's check to a remotely-located centralized services center ("CSC") through the public telephone network (see FIG. 4). Personnel at the CSC, or a computer at the CSC, then attempt to verify the customer's identity and authorize cashing of the customer's check.

An ISDN card 335 allows communication between the processor 300 and the CSC. The ISDN card 335 also is connected to the handset 120 to permit the customer to speak with personnel at the CSC, if necessary. In some circumstances, the ISDN card 335 may be replaced with a cellular modem or similar device.

As noted above, the optional card reader 145 may be included to permit the unit 100 to provide traditional ATM transactions, such as deposits, withdrawals, and balance inquiries. In addition, the unit 100 may be configured to provide cardless ATM transactions. When the unit 100 is configured in this way, the unit 100 stores account information for customers. The unit 100 then identifies the customer using biometric information as described above. When necessary, the ARM invokes the CSC or personnel at the CSC to confirm the customer's identity. After identifying the customer, the unit 100 contacts a gateway of a service network to determine whether the customer may perform a desired transaction (e.g., to determine whether the customer's account includes sufficient funds). When a unit 100 is used in this way, the security/identification aspect of the transaction processing network is isolated from the approval/processing aspect of the network.

Referring to FIG. 4, a large number of check-cashing, or point-of-sale ("POS"), units 100 may communicate with a centralized services center ("CSC") 400 through the public telephone network 405. The POS units 100 automatically cash checks that meet certain criteria, while deferring to the CSC 400 for authorization to cash checks that do not meet the designated criteria. For security, the POS units 100 initiate all calls to the CSC and do not accept incoming calls. Similarly, the CSC accepts calls only from known POS units 100.

Figure 5:
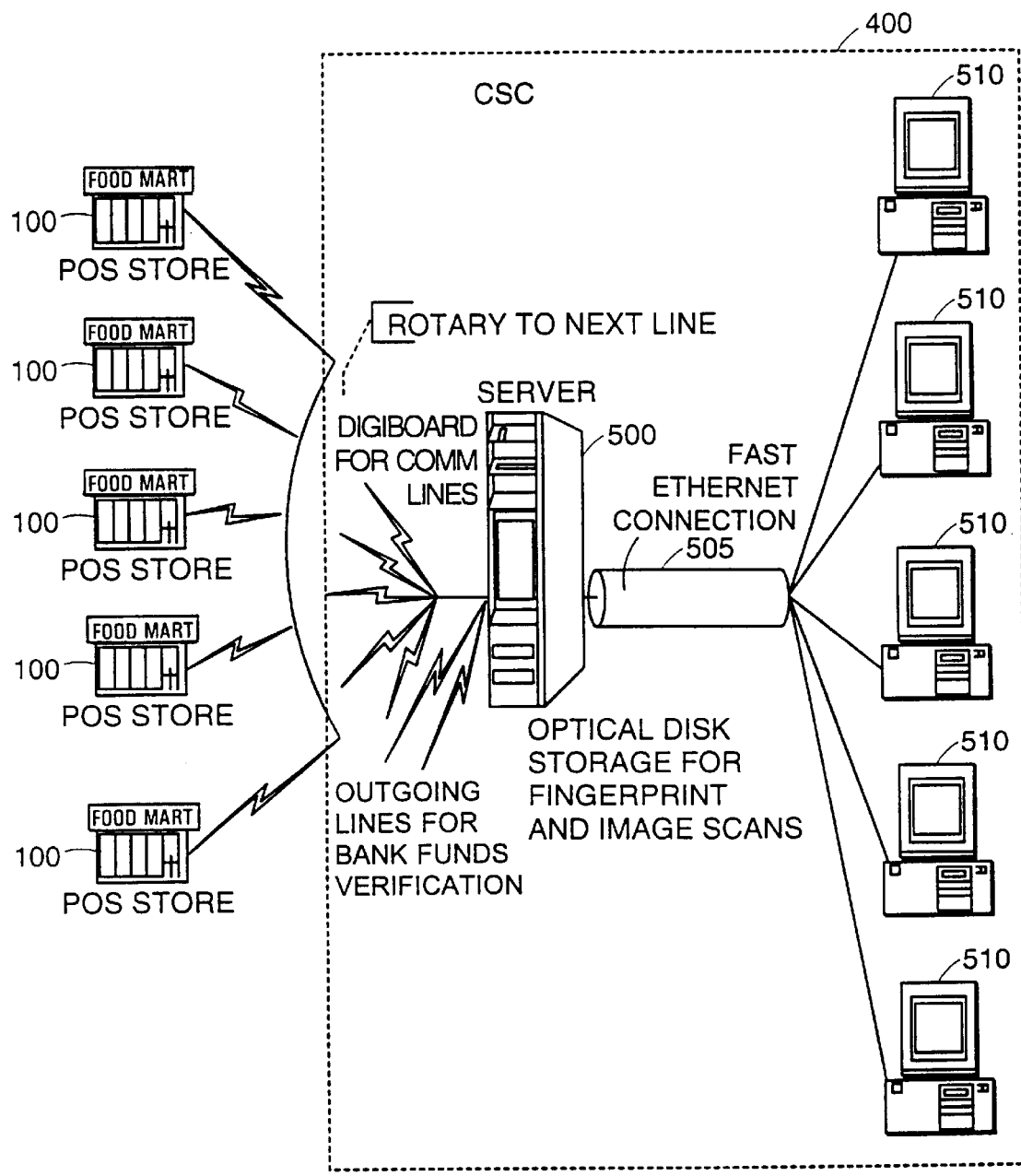

As shown in FIG. 5, a server 500 at the CSC 400 receives and processes calls from the POS units 100. The server, which generally has more available information than does a particular POS unit 100, may determine that the check should be cashed and may provide an indication to that effect to the calling POS unit 100.

When the server 500 is unable to automatically cash a check, and determines that a call needs the attention of CSC personnel, the server identifies an available operator and directs information about the call through an Ethernet connection 505 to the operator's workstation 510. The operator then decides whether to cash the check and sends an appropriate signal to the calling POS unit 100. The server may direct calls based solely on operator availability, but also may consider other criteria. For example, the server may direct a call to an operator fluent in a language identified by the customer when accessing the POS unit 100.

Figure 5A:
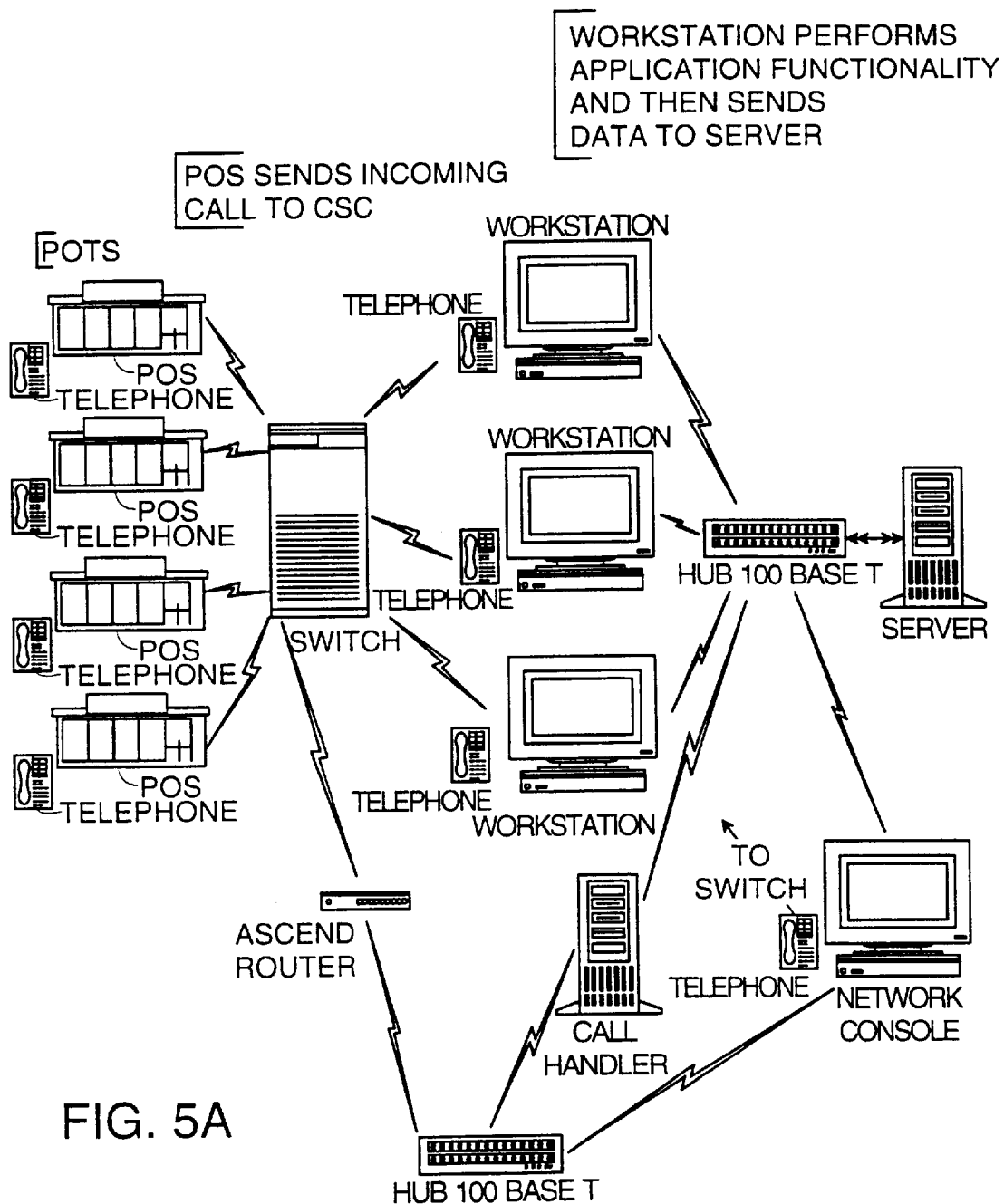

As shown in FIG. 5A, in one implementation, hardware of each POS unit 100 is implemented using an NCR 5675 ATM, two digital cameras, an Intel Pentium processor operating at 166 MHz, 32 megabytes of memory, a 2.5 gigabyte hard drive, an Ethernet card providing a coaxial cable connection between the ATM and the processor, an ISDN card, a Matrox video capture card, speakers, a telephone handset, and BRI ISDN telephone service. In the same implementation, hardware of the CSC is implemented using twenty three lines of PRI ISDN telephone service; a Lucent Definity telephone switch; an Ascend router; two fast Ethernet 100BaseT hubs; an IBM 704 PC Server configured as a call handler (2×200 MHz, 256 MB memory, 2.14 GB Hard drive, redundant power supply, fast Ethernet card); an IBM 704 PC Server configured as a file server (4×200 MHz, 256 MB memory, 27.06 GB RAID-1 Disk, 24/48 GB internal tape auto loader, redundant power supply, fast Ethernet card); an IBM Server Rack 24 inch (14" color display, 101 keyboard); a Best uninterruptable power supply ("UPS") 5.3 kVA with the capability to run 5 hours without power for the telephone switch, router, fast Ethernet hubs, server rack, file server, and call handler; and forty workstations. Each workstation may be implemented using an Intel Pentium processor operating at 200 MHz, 32 MB memory, a 2.5 GB hard drive, a 101 Keyboard, a mouse, a fast Ethernet card, a 17" touch screen monitor, a phone handset, and a UPS.

Figure 5B:
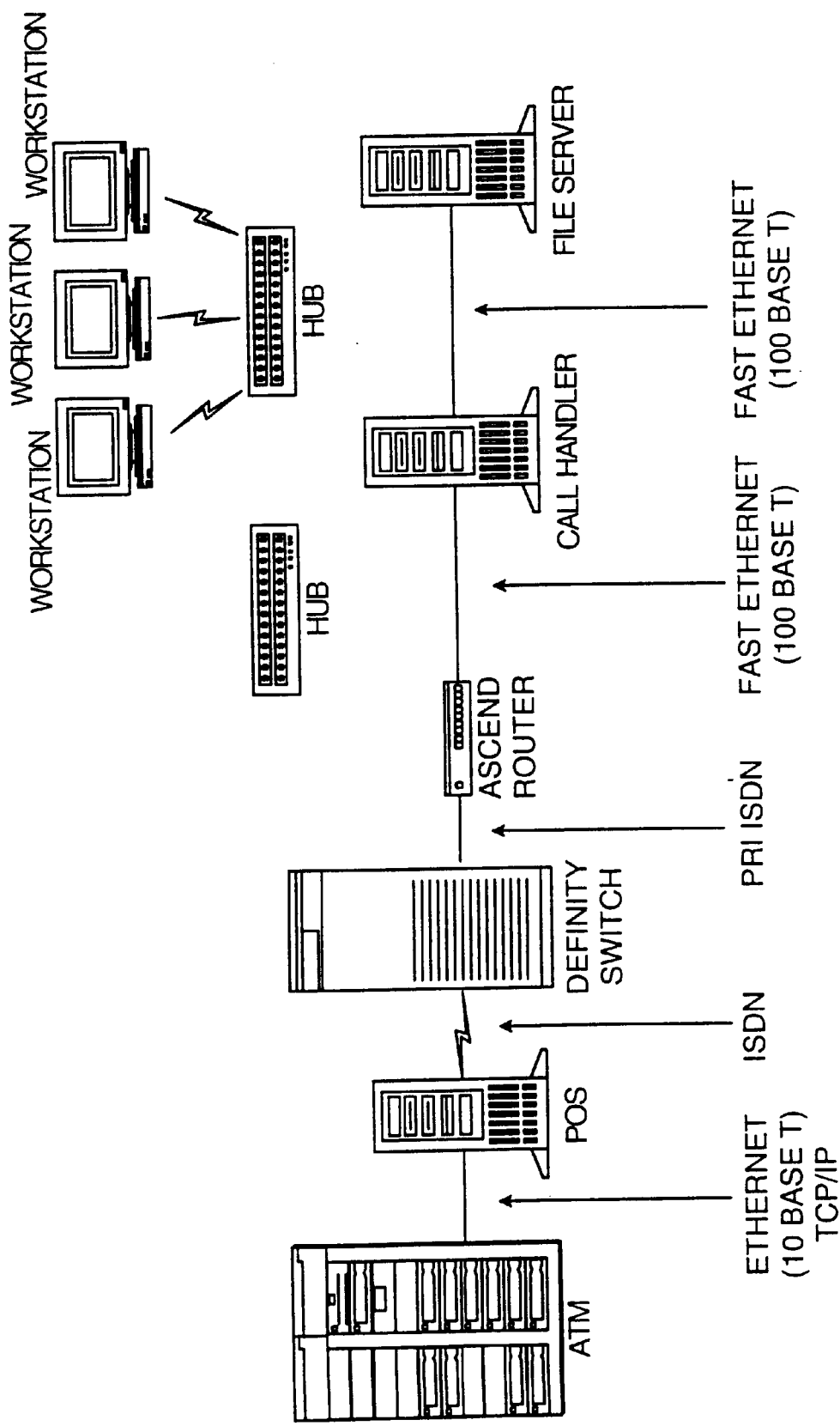

Connectivity in the implementation of FIG. 5A may be provided as shown in FIG. 5B. The ATM is connected to the POS processor through an Ethernet coaxial cable. The POS unit dials into the CSC using a BRI ISDN line. The CSC receives calls on a PRI ISDN going into the Definity switch. The Definity switch connects to the Ascend router using PRI ISDN. The Ascend router connects to the CSC call handler using a fast Ethernet Hub 100BaseT. Finally, the call handler, file server, and workstations are connected by a separate fast Ethernet 100BaseT hub.

Referring to FIGS. 6A, 6B, 7, 8A and 8B, when performing check-cashing transactions, the ATM 350, the processor 300, and the CSC 400 operate according to interacting procedures, with the ATM 350 operating according to a procedure 600, the processor 300 operating according to a procedure 700, and the CSC operating according to a procedure 800. As described below, these procedures may be modified when the system is configured to perform cardless ATM transactions or traditional ATM transactions. Initially, the ATM 350 displays a screen that permits the customer to select an appropriate language (e.g., English or Spanish) and waits for the selection from the customer (step 605). When the customer selects the language (step 610), the ATM 350 prompts the customer to enter the customer's social security number or other identification number. After the customer enters the social security number (step 615), the ATM 350 prompts the customer for the amount of the check and the customer enters the amount (step 620).

Next, the ATM 350 prompts the customer to endorse the check and to insert the check into the check reader 130 (step 622), and the customer inserts the check (step 625). The check processing module 315 of the ATM 350 scans the check to produce images of the front and back of the check, validates the MICR ("magnetic ink character recognition") code on the check, and reads designated zones of the check (step 630). If the customer has failed to endorse the check, as indicated by the image of the back of the check, or has inserted the check incorrectly (step 632), then the ATM returns the check to the customer and prompts the customer to endorse the check (if necessary) and to reinsert the check (step 634). If the check has been endorsed and properly inserted, the ATM 350 then displays an image of the front of the check to the customer (step 635) and validates the contents of the check using optical character recognition ("OCR") (step 640). Using the recognized amount of the check, the ATM then calculates the difference, if any, between the recognized amount of the check and the amount entered by the customer (step 645).

Next, the ATM 350 sends information to the processor 300 (step 650). The information sent includes the customer's social security number or other identification number, the images of the front and back of the check, MICR information, information as to whether the contents of the check passed the validation step, the check amount read by OCR, the check amount entered by the customer, and the difference, if any, between the two amounts. The ATM then prompts the customer to remove any hat, sunglasses, or other items that would obscure the customer's face (step 652) and waits for a response from the processor 300. The message may be accompanied by an animated character that removes its hat and sunglasses.

Figure 7:
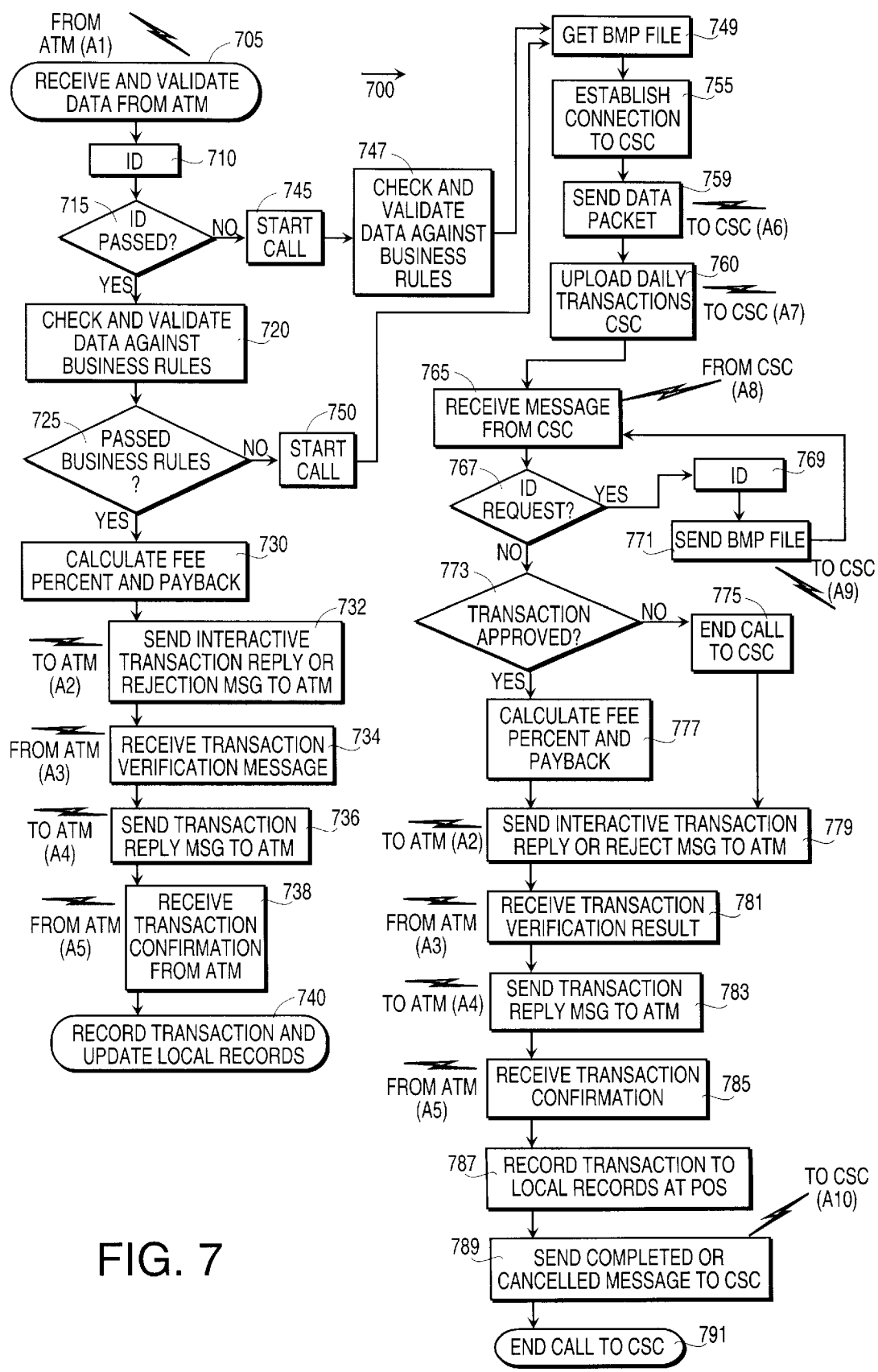
FIG. 7 is a flow chart of a procedure implemented by a processor of the check-cashing unit of FIG. 1.

Referring to FIG. 7, upon receiving and validating the information from the ATM 350 (step 705), the processor 300 attempts to identify the customer (step 710). To this end, the processor uses identification software that identifies a person based on an image of the person's face. An example of software that is suited for this purpose is the TrueFace CyberWatch software available from Miros, Inc., of 572 Washington St. #18, Wellesley, Mass. 02181. This software is described by Miros, Inc., in the Programmer's Manual For TrueFace Version 2, which is incorporated by reference.

The identification software compares an image of the customer produced by a camera 125 with an image stored in conjunction with the customer's identification number in a database stored on the storage device 320. The image is produced when the customer enters the first digit of the customer's social security number or other identification number to ensure that the customer is looking at the camera. The image from the second camera 125, though not used for comparison with the stored image, is used to verify that the image from the first camera is an image of the customer rather than an image of a picture held in front of the camera.

The ATM displays the "remove hat and sunglasses" message because the presence of a hat or sunglasses can reduce the ability of the identification software to identify the customer. The identification software also may compare the image of the customer's face with a database of images associated with "bad" customers (i.e., customers who have previously submitted bad checks or who have a record of doing so).

Other types of biometric identification software could be used. For example, the identification software could identify the customer using a fingerprint or palmprint, DNA analysis, a retinal scan, or an analysis of the customer's voice.

If the identification software approves the customer (i.e., if the customer's image matches the image stored with the customer's identification number) (step 715), the processor determines whether data associated with the customer and the customer's check satisfy a set of business rules stored on the storage device 320 (step 720).

The business rules 900 used by the processor in one implementation are illustrated in FIG. 9. These business rules, which are intended to be illustrative only, include a set of criteria 905 and a set of values 910. In general, when checking the business rules, the processor references a payor database and a payee database to obtain information about the customer (the payee) and the customer's employer (the payor). If the transaction violates any one of the business rules, then the processor 300 is not authorized to automatically cash the customer's check, and must seek authorization from the CSC 400.

If the check satisfies the business rules (step 725), the processor 300 determines the fee to charge the customer and the payback amount (i.e., the amount of cash that the customer will receive) (step 730). The processor 300 then sends this information to the ATM 350 and waits for a reply (step 732).

Figure 6A:
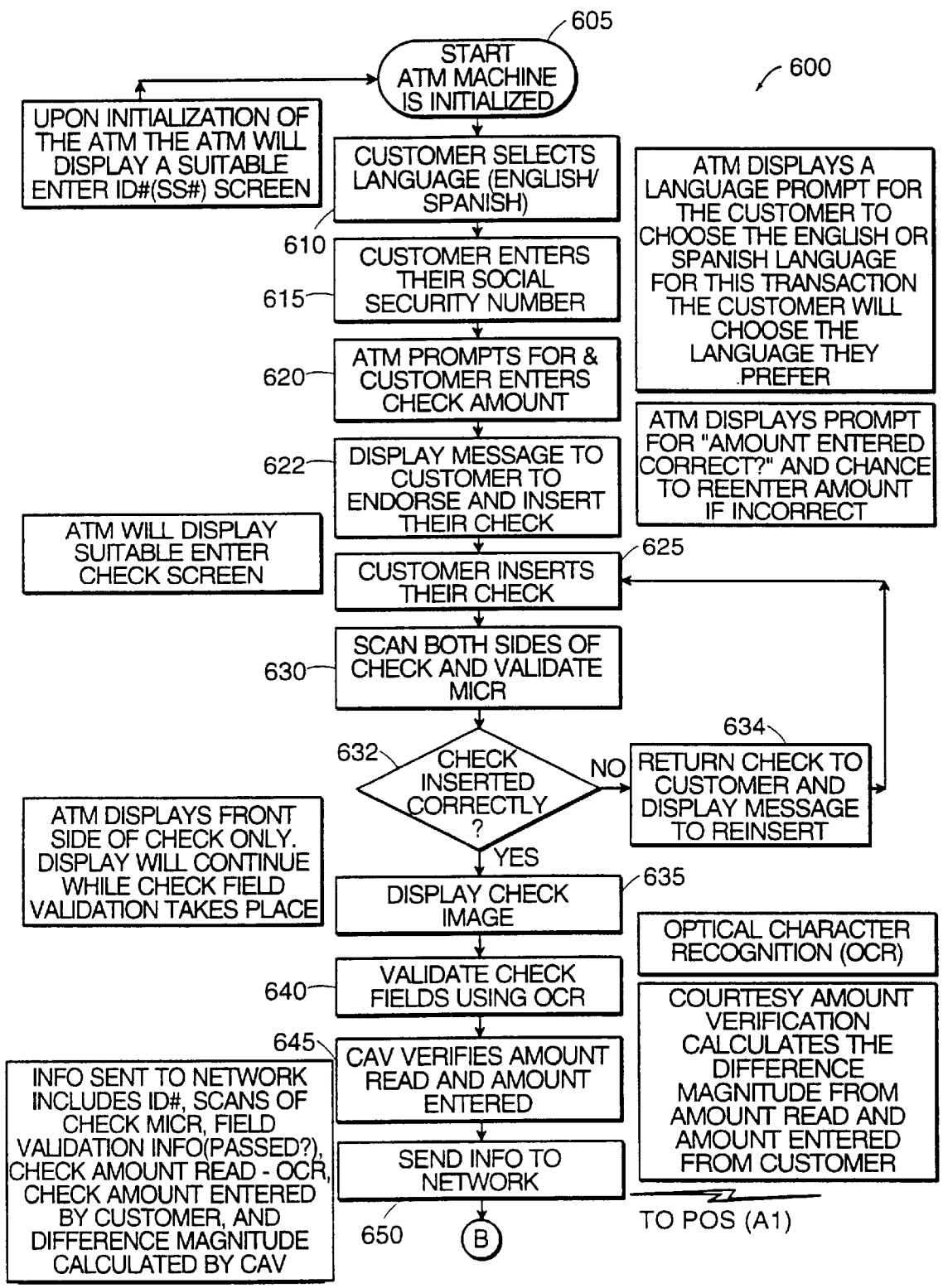
FIGS. 6A and 6B are flow charts of a procedure implemented by an ATM of the check-cashing unit of FIG. 1.
Figure 6B:
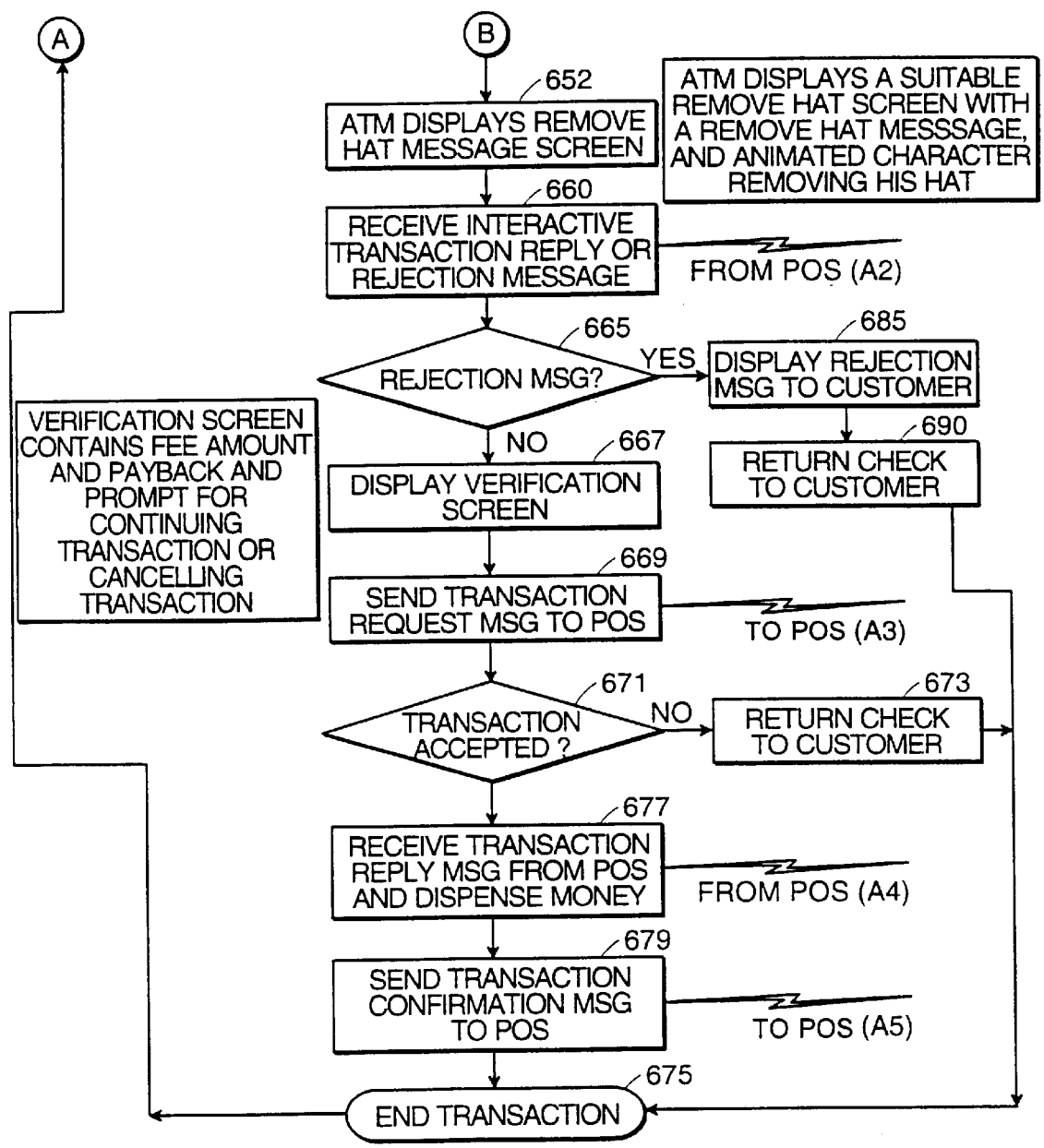

Referring to FIG. 6B, upon receiving the fee and payback amount (step 660), since the check has not been rejected (step 665), the ATM 350 displays the fee and payback amount for verification by the customer (step 667). The ATM 350 then sends a transaction request message to the processor 300 (step 669). Based on the customer's response, the transaction request message indicates to the processor that the transaction should either be continued or cancelled. If the customer has not accepted the transaction (step 671), the ATM 350 returns the customer's check (step 673). The ATM 350 then ends the transaction (step 675) and waits for another customer (step 605). If the customer has accepted the transaction (step 671), the ATM 350 waits for a transaction reply message from the processor 300.

Upon receiving a transaction reply (step 677), the ATM 350 dispenses the appropriate amount of money. The ATM 350 then sends a confirmation to the processor 300 (step 679) and ends the transaction (step 675).

If, as discussed below, the processor 300 sends a rejection message in response to the first request (step 665), the ATM 350 displays a rejection message to the customer (step 685), returns the check to the customer (step 690) and ends the transaction as noted above. In some instances, the ATM 350 may retain the rejected check. For example, an operator at the CSC 400 may signal the ATM 350 to retain the rejected check if the operator determines that the check has been stolen.

Referring again to FIG. 7, upon receiving a response from the ATM 350 (step 734), the processor 300 sends a reply to the ATM 350 (step 736) and waits for a confirmation. Upon receiving the confirmation (step 738), the processor 300 records the transaction and updates the database located on the storage device 320 (step 740). The processor then waits to receive a new set of data from the ATM (step 705).

If the identification software does not approve the customer (i.e., if the customer's image does not match the stored image, or if there is no stored image for the customer's identification number) (step 715), the processor 300 initiates a call to the CSC 400 (step 745) and determines whether data associated with the customer and the customer's check satisfy the business rules (step 747). The processor 300 then gets a bitmap ("BMP") file of the customer's image (step 749) for transmission to the CSC 400. The processor also initiates a call to the CSC (step 750) and gets the BMP file for the customer (step 749) if the identification software approves the customer (step 715), but the check does not satisfy the business rules (step 725).

After initiating a call, the processor 300 establishes a connection to the CSC 400 using an ISDN line (step 755). The processor uses one channel of the line to transmit a data packet about the customer and the customer's check to the CSC 400 (step 759). The data packet includes the information sent from the ATM 350 to the processor 300 (i.e, the customer's social security number or other identification number, the images of the front and back of the check, MICR information, information as to whether the contents of the check passed the validation step, the check amount read by OCR, the check amount entered by the customer, and the difference, if any, between the two amounts), the BMP file including an image of the customer, the results of the identification procedure, and the reason that the transaction is being sent to the CSC.

The processor uses the other channel of the line to establish a video conferencing connection between the POS unit 100 and the CSC 400. In one implementation, this connection includes bidirectional audio and unidirectional video, with still images being transferred periodically from the POS unit 100 to the CSC 400. Other implementations may include unidirectional or bidirectional real-time video.

Next, the processor 300 waits for a response from the CSC with respect to the current customer (step 760). While waiting for the response, the processor 300 uses any available bandwidth of the connection between the POS unit 100 and the CSC 400 to provide the CSC 400 with information about any transactions that the processor has independently processed (see, e.g., step 738) since the last call from the processor to the CSC.

Figure 8A:
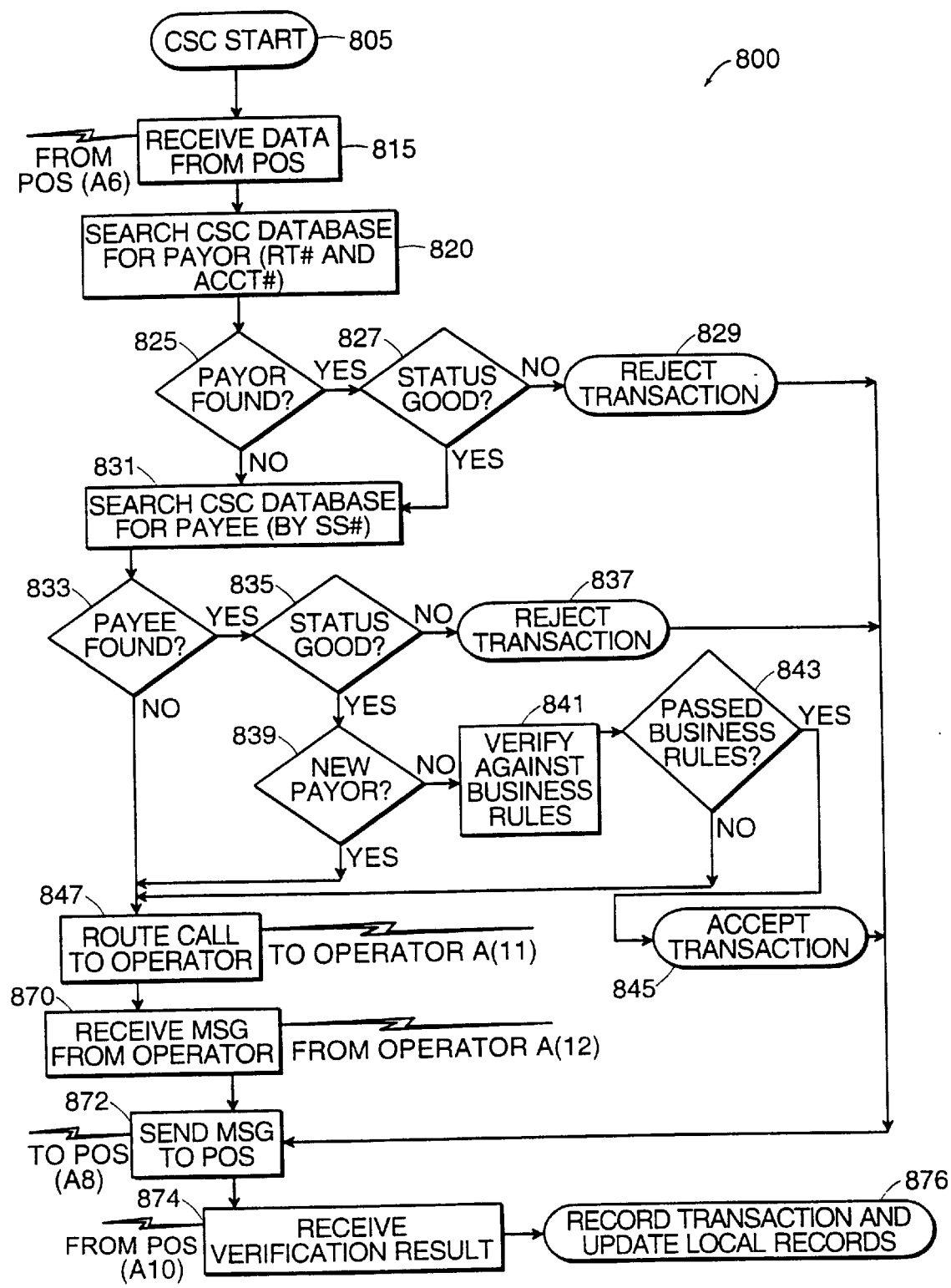
FIGS. 8A and 8B are flow charts of a procedure implemented by a centralized services center of the check-cashing system of FIG. 5.

Referring to FIG. 8A, the CSC 400 processes each call from a POS unit 100 according to the procedure 800. Upon receiving a call (step 805), the server 500 of the CSC 400 validates a security code associated with the call. Each POS unit 100 is encoded with a unique serial number which that is maintained at the CSC. This encrypted serial number serves as an authorization key to obtain CSC approvals and is transmitted with every transaction originating from the POS unit 100. At preset intervals, a new serial number is transmitted to the POS unit 100 for further security. If the security code is invalid, the server 500 notifies the POS 100 and terminates the call.

After validating the security code, the server 500 receives the data packet for the transaction from the POS unit 100 (step 815). The server 500 searches a payor database for the payor of the check (e.g., the customer's employer) (step 820). The server searches the payor database according to the routing number and the account number printed on the check and provided by the check processing module of the ATM.

If the server 500 finds the payor in the payor database (step 825), the server 500 determines whether the payor has a good payment status (step 827). If the payor does not have a good payment status, the server 500 indicates that the transaction should be rejected (step 829).

If the payor has a good payment status, or if the server does not find the payor in the payor database, the server 500 searches a payee database for the customer (step 831). The server 500 searches the payee database according to the customer's identification number. If the server 500 finds the customer in the payee database (step 833), the server 500 determines whether the payee has a good status (i.e., whether the customer has a history of depositing good checks) (step 835). If the customer does not have a good payment status, the server 500 indicates that the transaction should be rejected (step 837).

If the customer has a good status (step 835), and the payor is an established payor with a good status (step 839), the server verifies the transaction against a set of business rules (step 841). The business rules may be identical in content to the business rules 900 used by the processor 300 (see FIG. 9). However, as discussed below, each business rule includes an identifier, known as "a referral reason", to be displayed to a CSC operator when the rule is violated, and a list of actions that the operator is to take in response to the referral reason. By comparison, the processor 300 of the POS unit can be seen as taking the action of contacting the CSC in response to each referral reason.

If the transaction passes the business rules (step 843), the server 500 indicates that the transaction should be accepted (step 845). Thus, the server 500 may automatically accept transactions that the POS unit 100 is unauthorized to accept. For example, if a customer who typically uses a POS unit in a first location switches to a POS unit in a second location, the POS unit in the second location may not have information about the customer in the POS unit's database. For this reason, the POS unit will be unable to identify the customer and, accordingly, will be unauthorized to cash the customer's check. By contrast, the server 500 will maintain a much larger database with information about customers who use any POS unit. For this reason, the server 500 will be able to identify the customer and authorize the transaction.

If the server 500 is unable to find the customer in the payee database (step 833), is unable to find the payor in the payor database (step 839), or if the transaction does not satisfy the business rules (step 843), the server sends the transaction to the workstation 510 of the next available operator (step 847) and waits to receive a message from the operator.

Figure 8B:
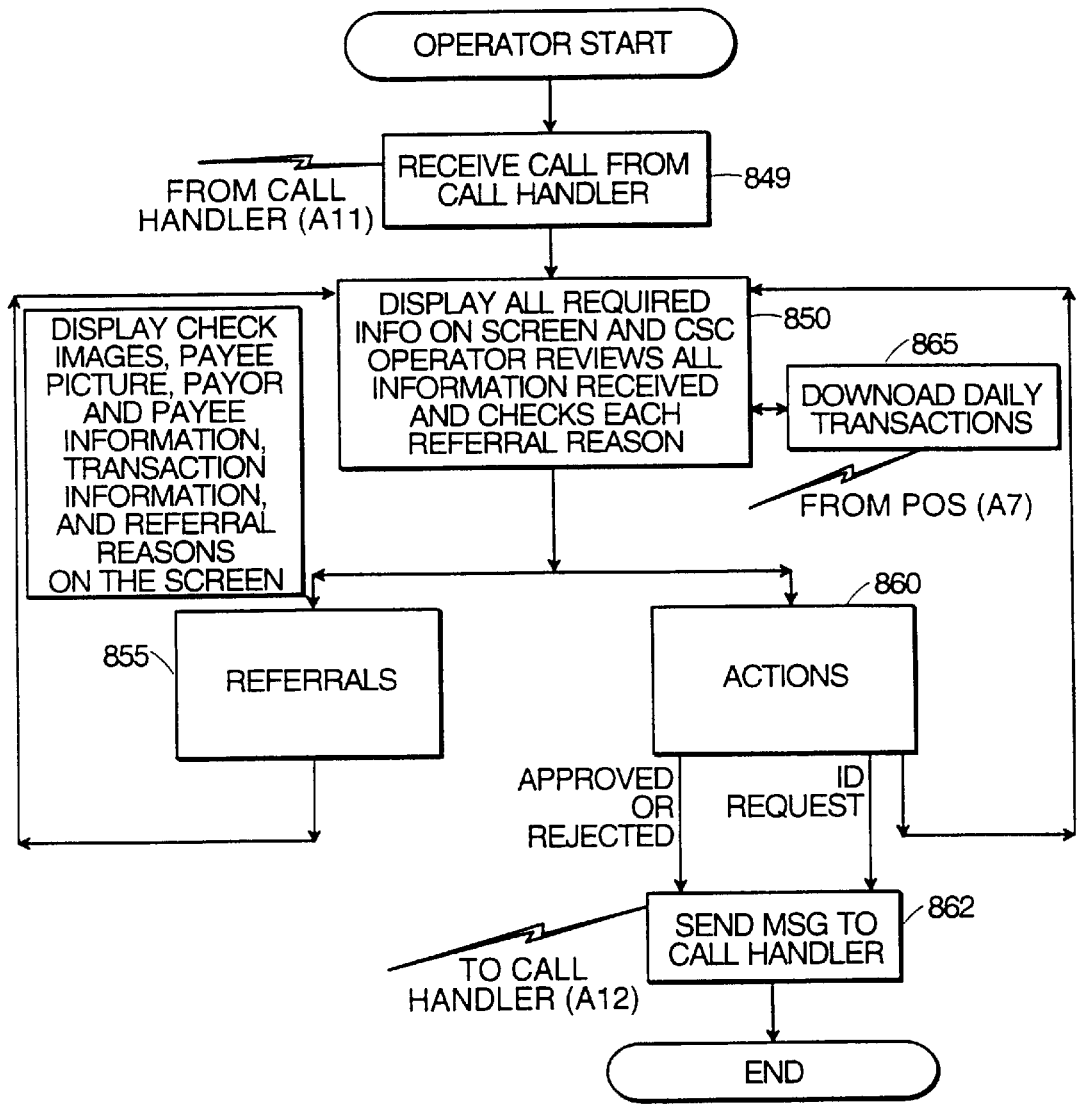
Figure 10:
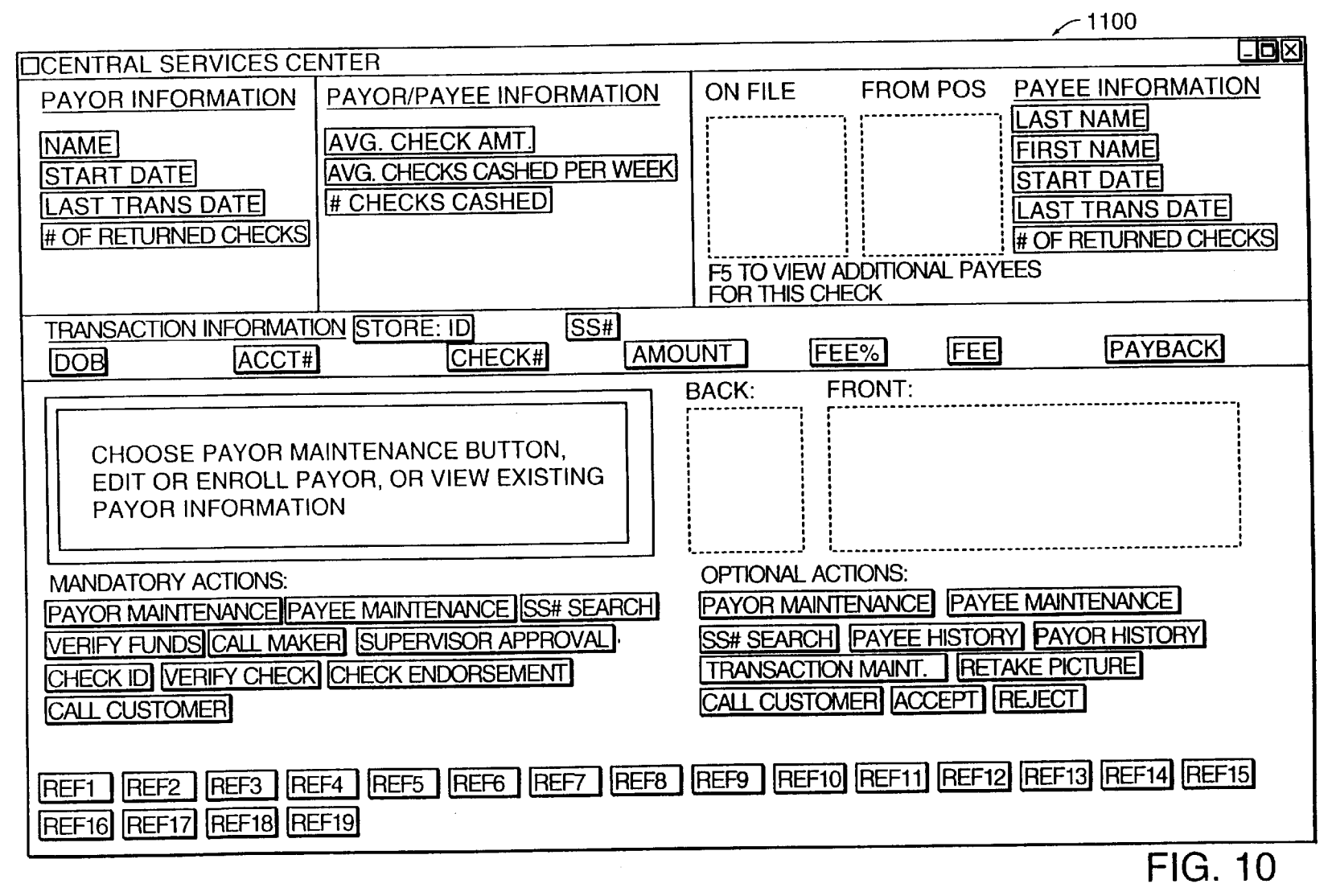
Figure 11A:
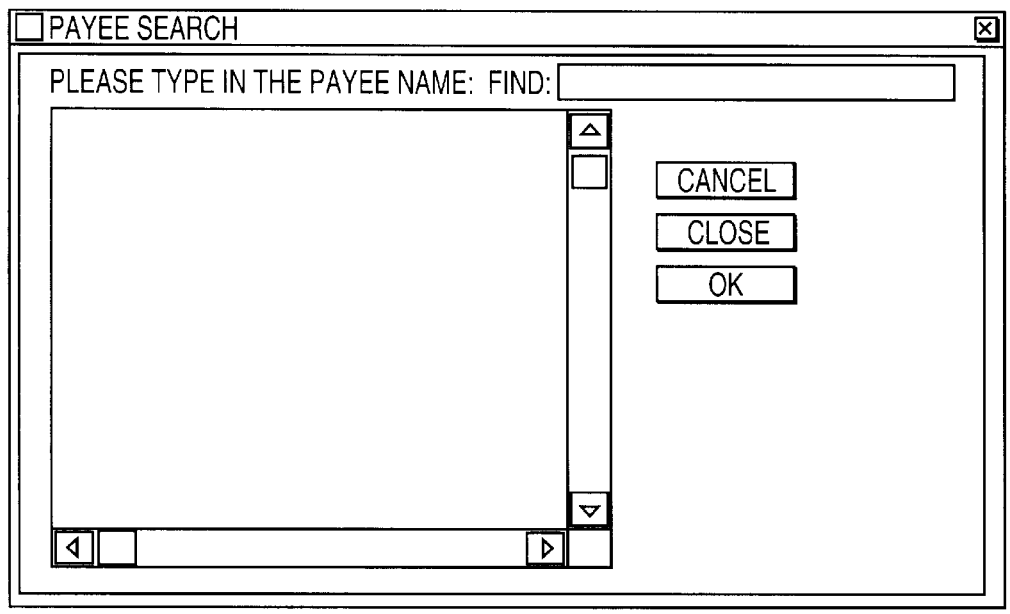
FIGS. 11A–11R are sub-screens of the screen display of FIG. 10.
Figure 11B:
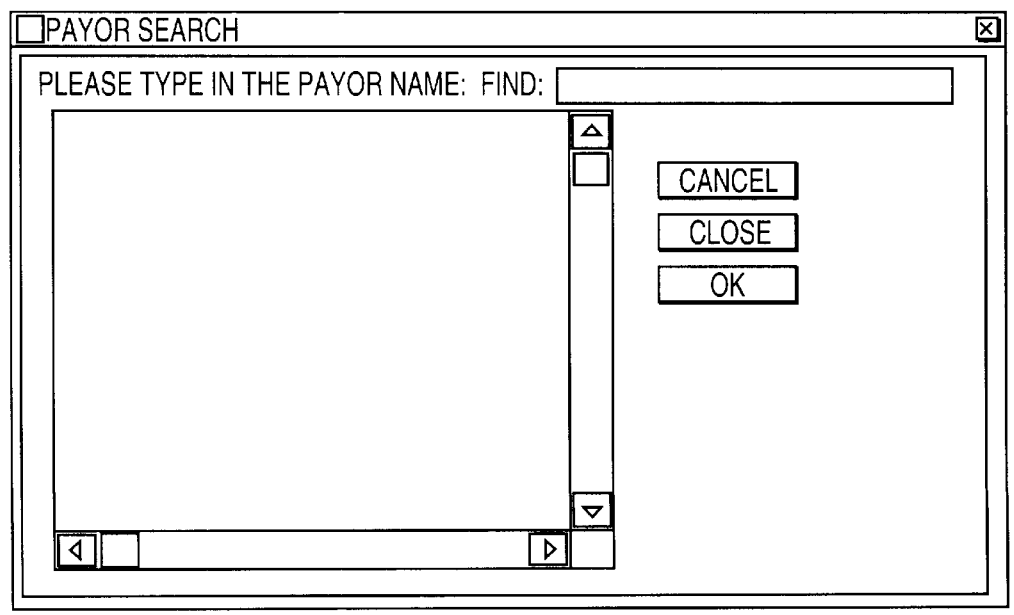
Figure 11F:
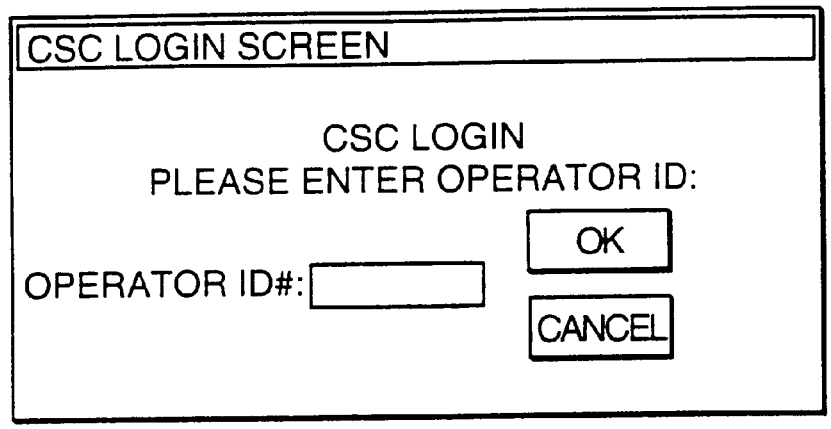
Figure 11G:
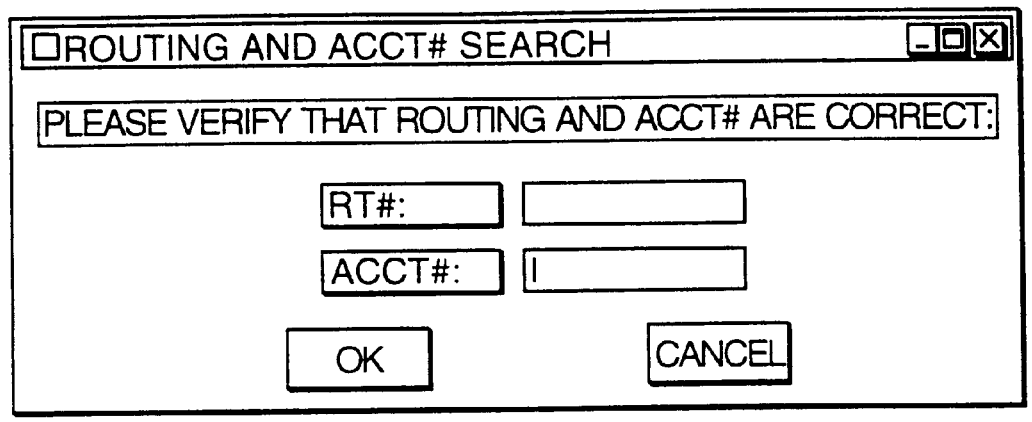
Figure 11H:
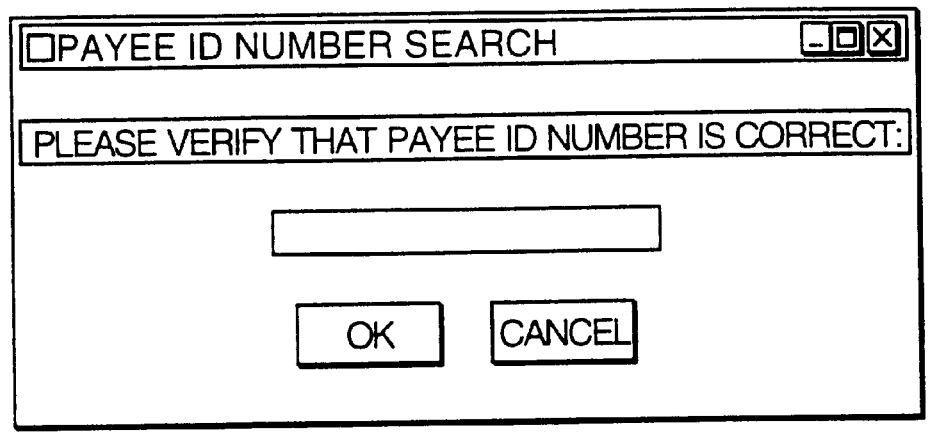
Figure 11O:
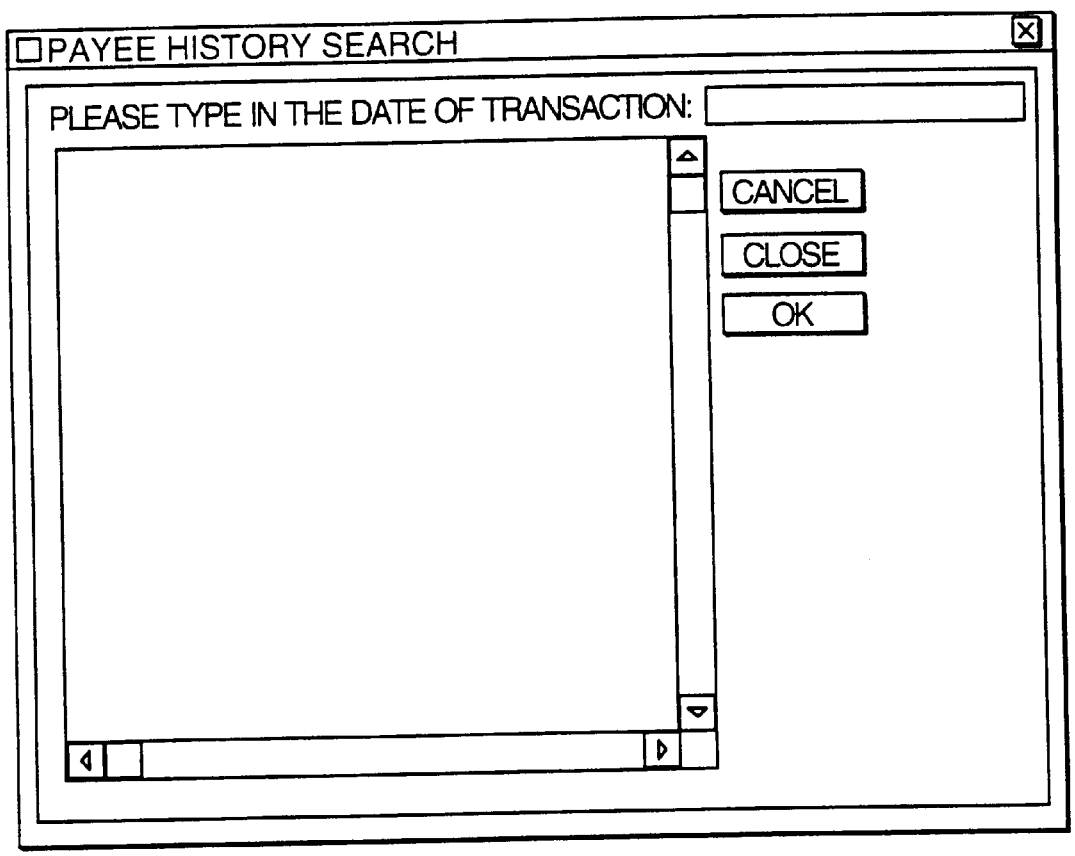
Figure 11P:
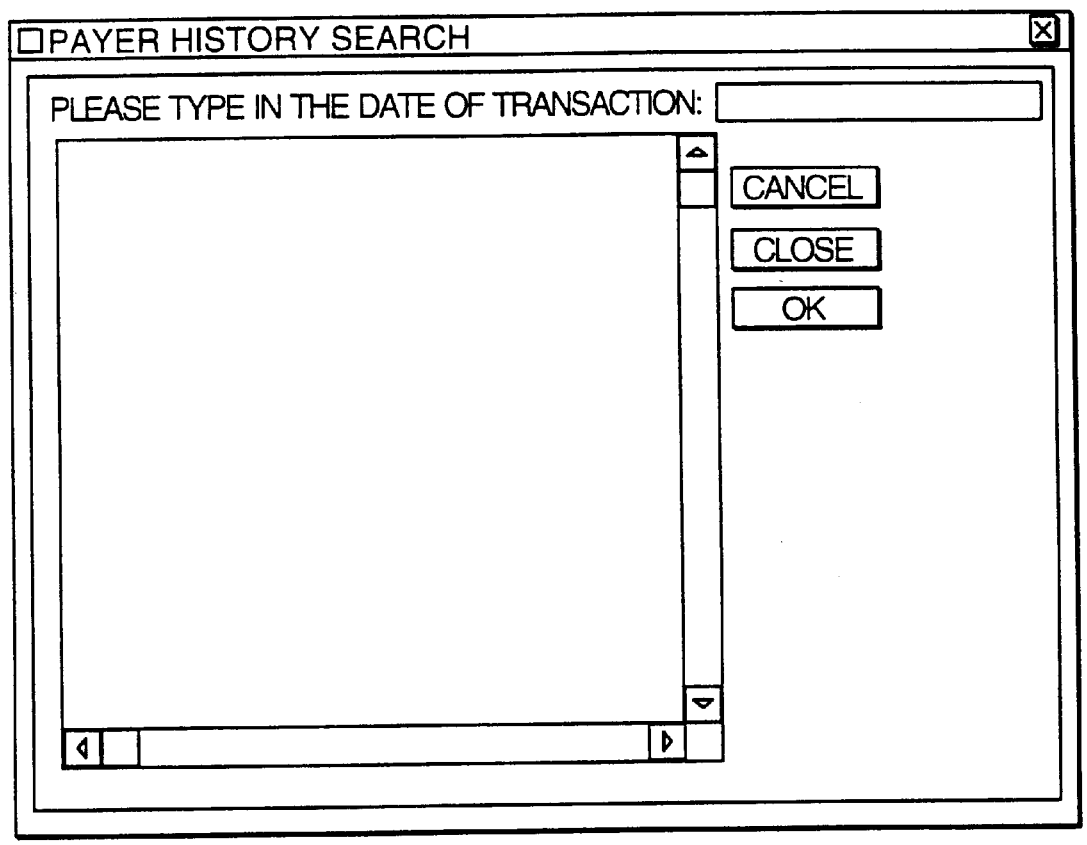
Figure 11Q:
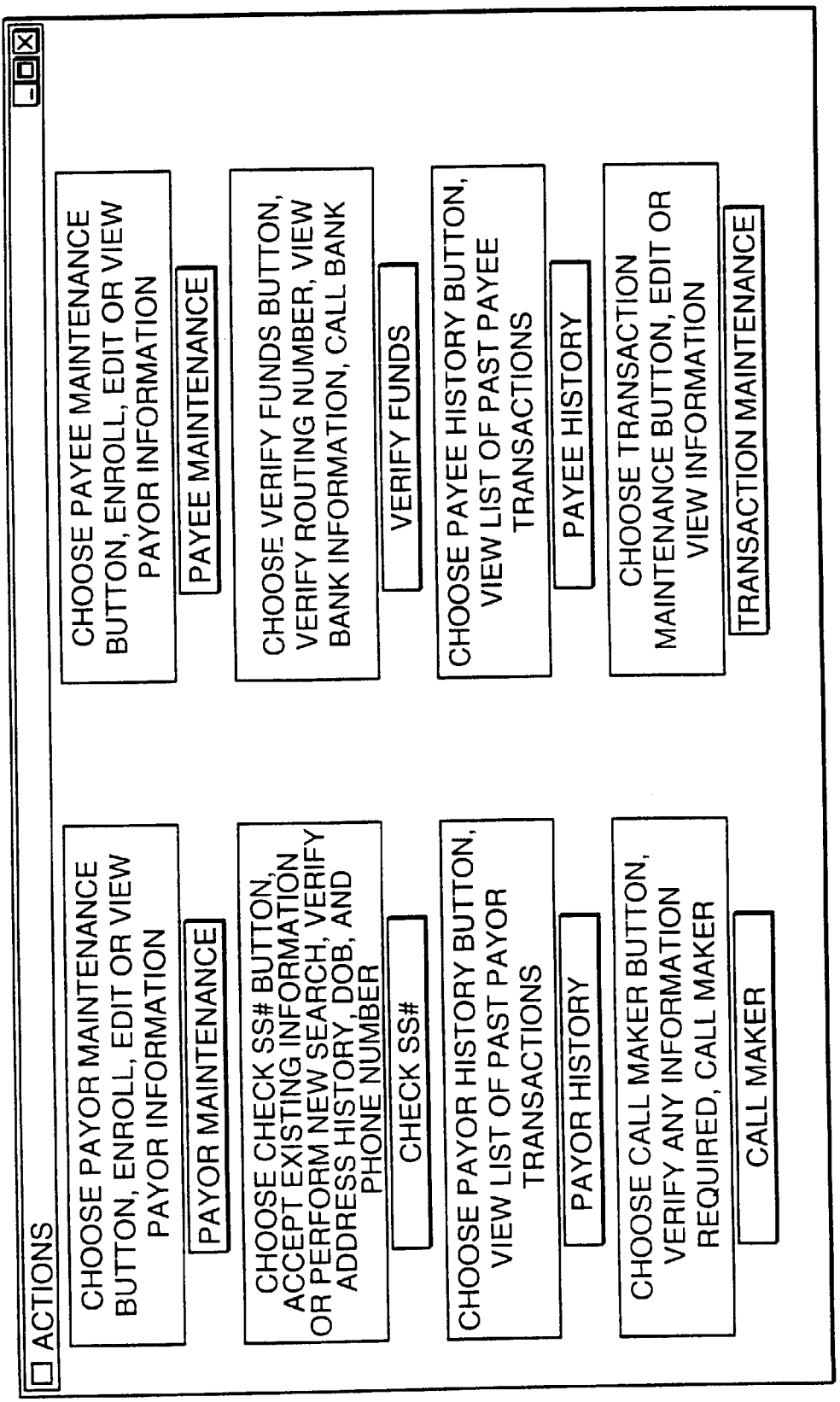
Figure 11R:
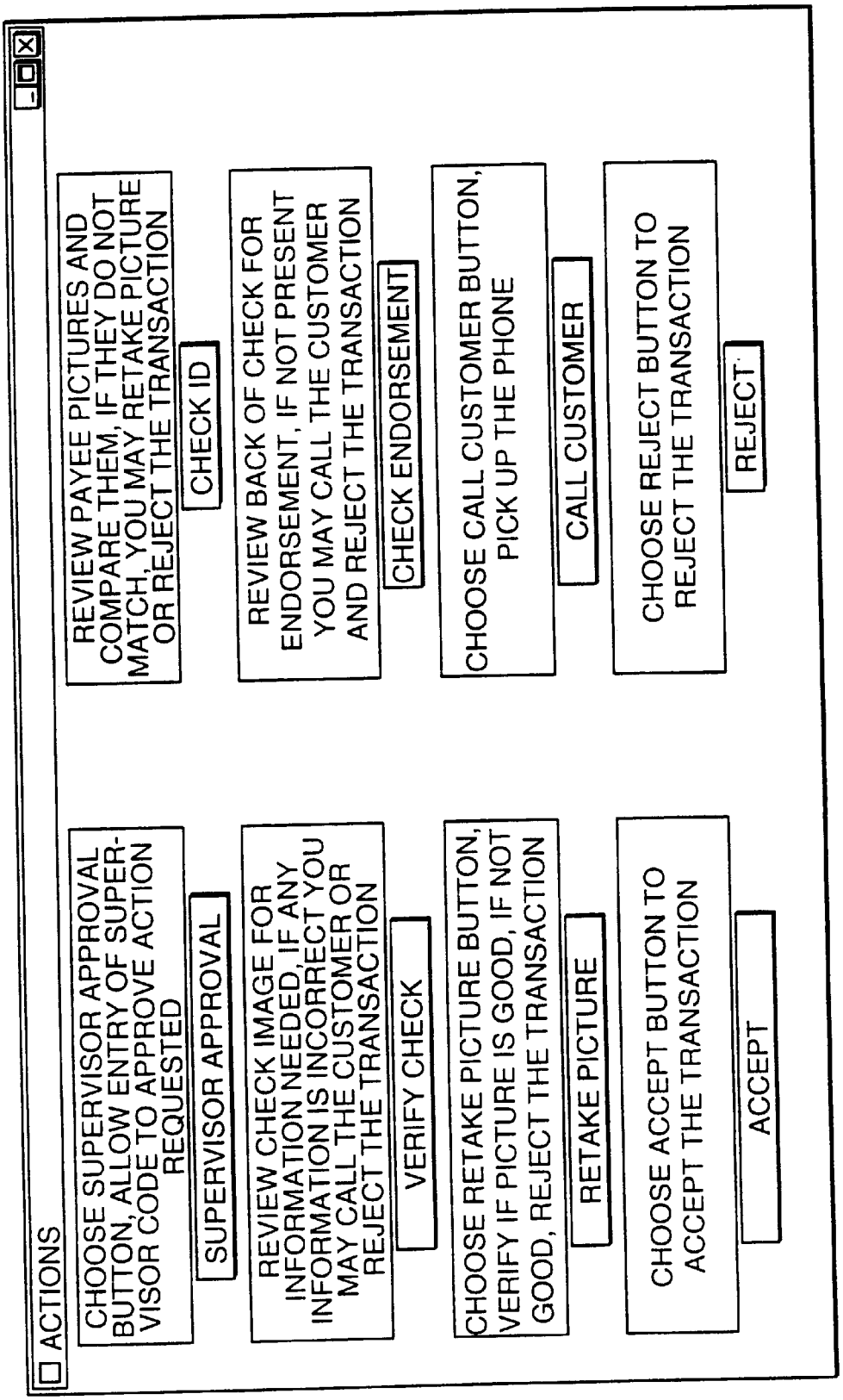

Referring to FIG. 8B, upon receiving a call from the call handler (step 849), the operator's workstation 510 provides the operator with the graphical user interface ("GUI") 1000 illustrated in FIG. 10 (step 850). The GUI 1000 provides the CSC operator with all information from the POS unit that is needed make a decision about the worthiness of the transaction. This information includes information about the payor, information about the payee, including the current and file image of the payee, an image of the check, and an indication as to why the transaction was rejected. In general, the GUI is a series of tabs with each reason that the transaction was not automatically approved being highlighted. The GUI is in an inactive state until it receives a request from a POS unit for approval. The workstation 510 responds to actions of the operator by displaying appropriate sub-screens of the GUI. These subscreens are illustrated in FIGS. 11A–11R.

Referring again to FIG. 8B, the CSC operator responds to the referrals (step 855) by taking actions (step 860) that may include, among other actions, accepting the transaction, rejecting the transaction, or requesting identification of the user. If the operator accepts the transaction, rejects the transaction, or requests identification of the user, a message is sent to the call handler (step 862).

As noted above, while the CSC operator processes the transaction, the server 500 takes advantage of any available bandwidth of the connection between the POS unit 100 and the CSC 400 to obtain from the processor 300 information about any transactions that the processor has independently processed since the last call from the processor to the CSC (step 865). After retrieving all such data, the server 500 may use any other available bandwidth to update the databases of the POS unit 100.

Figure 12B:
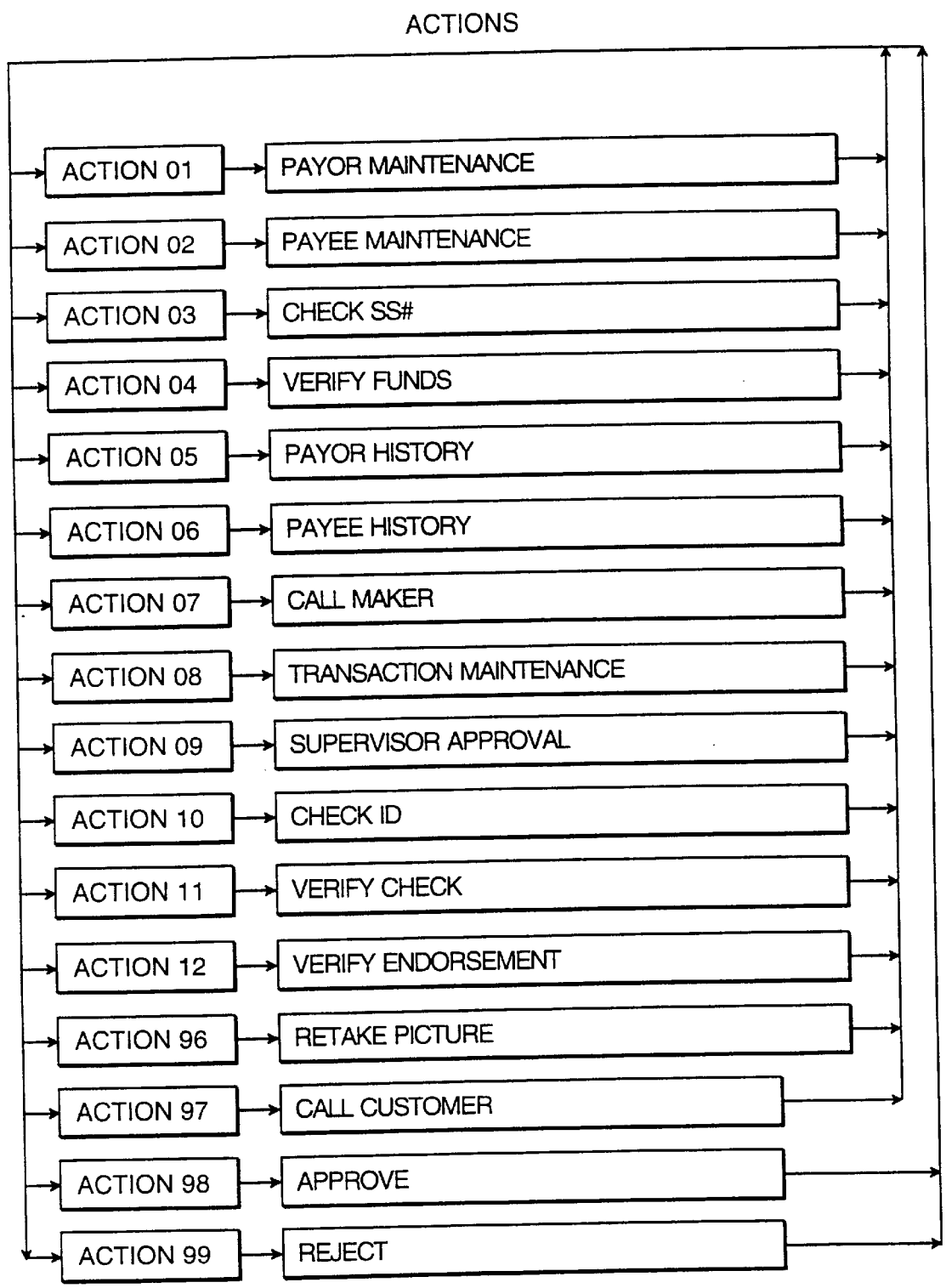
Figure 13A:
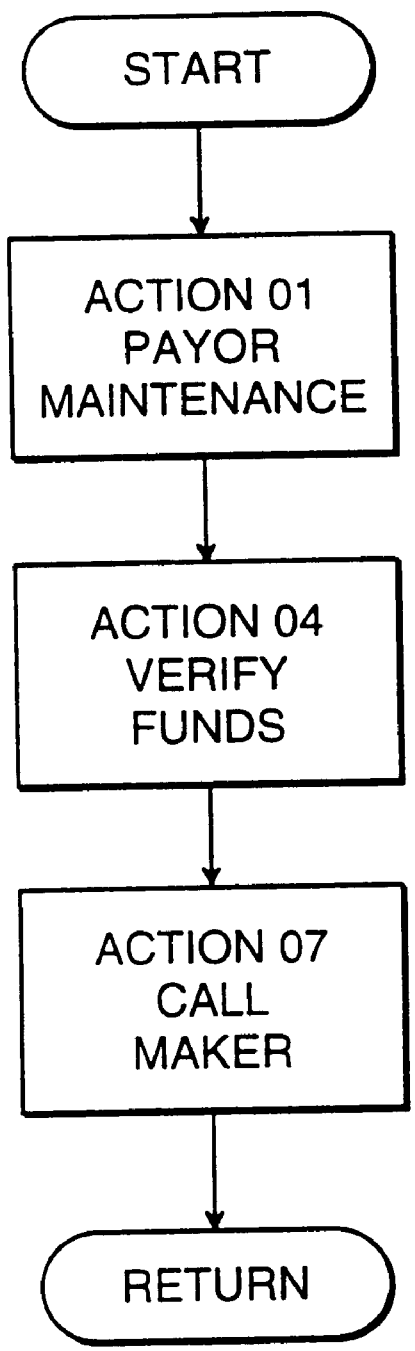
FIGS. 13A–13S are flow charts of procedures implemented by the centralized services center in responding to the referrals of FIG. 12A.
Figure 13B:
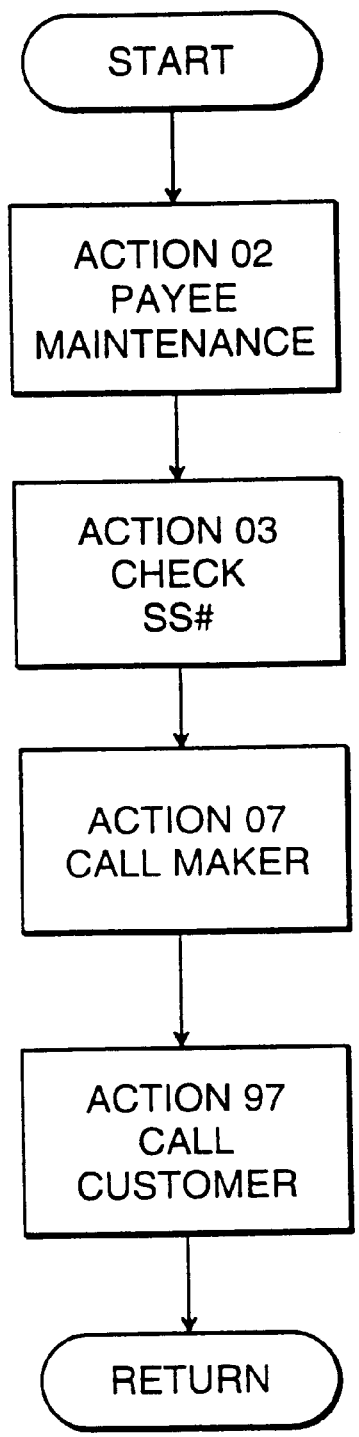
Figure 13C:
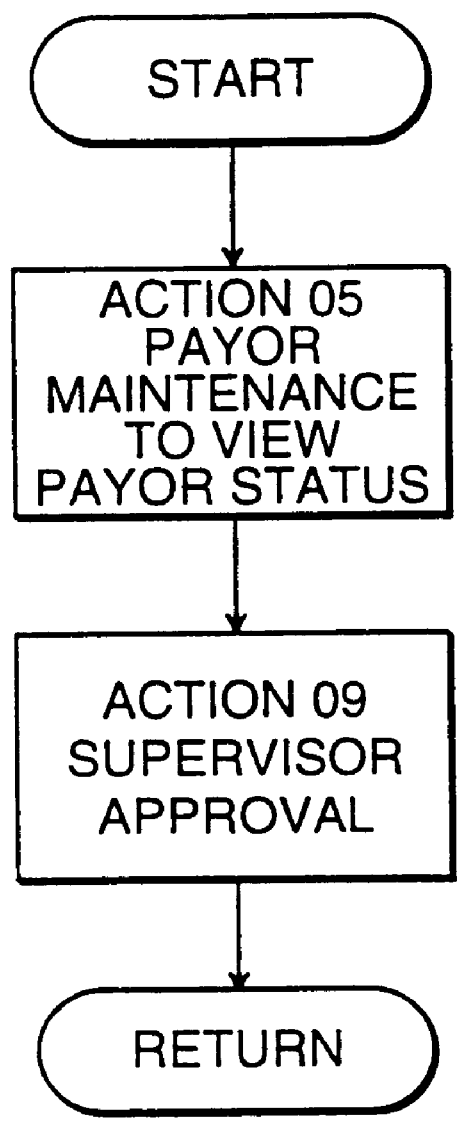
Figure 13D:
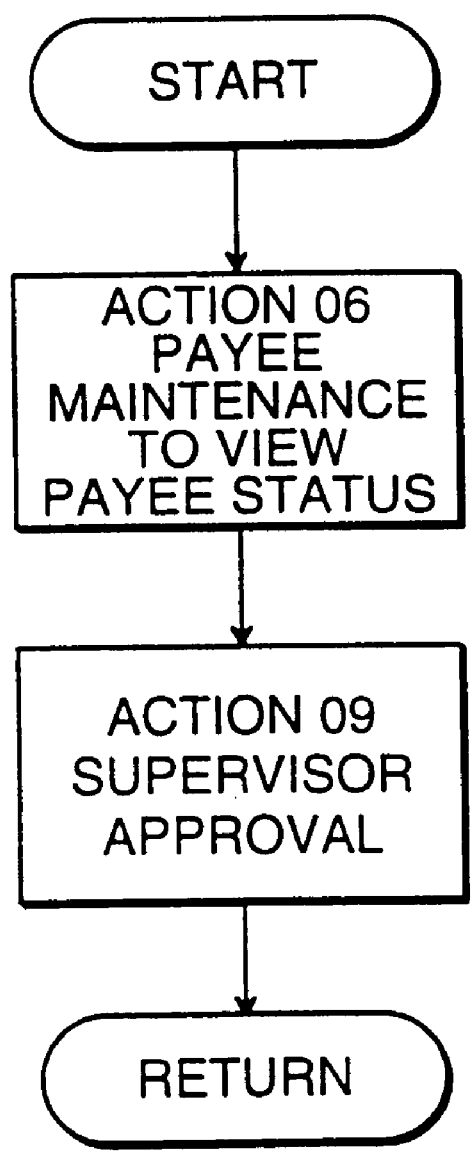
Figure 13E:
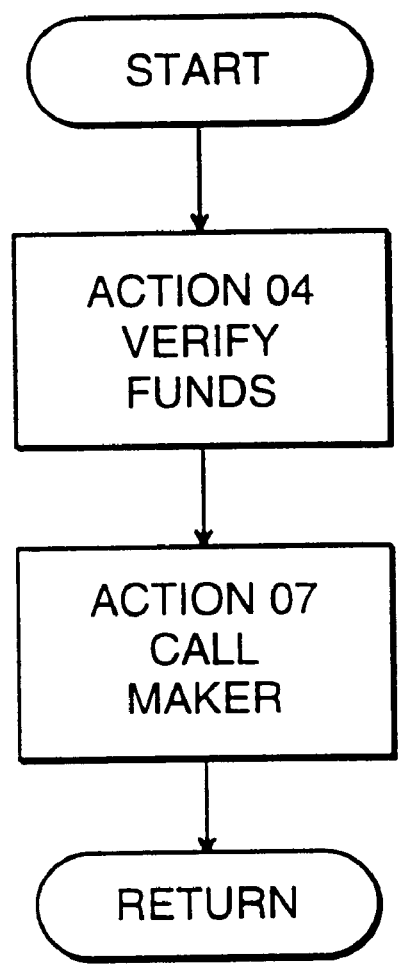
Figure 13F:
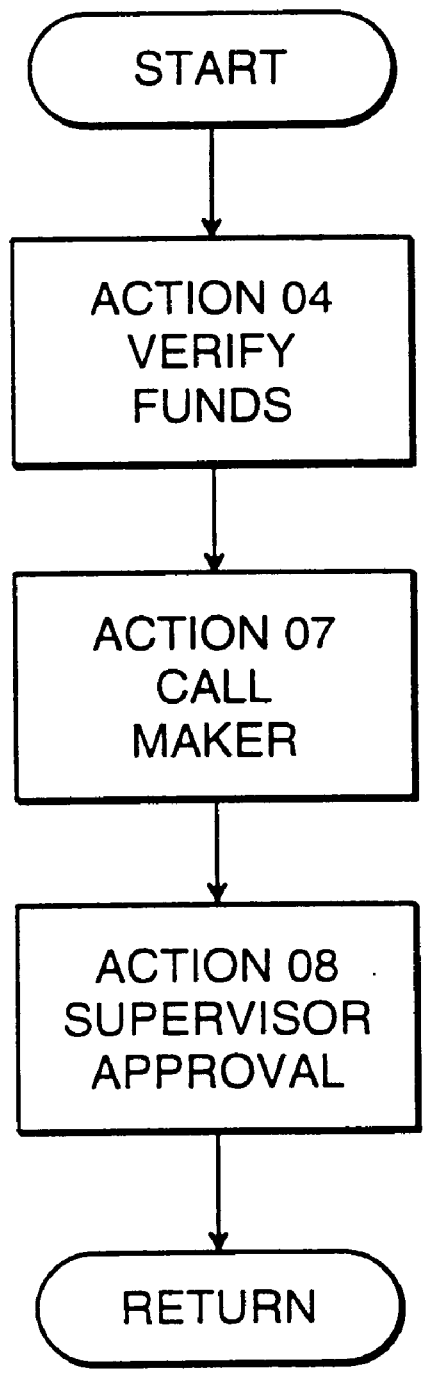
Figure 13G:
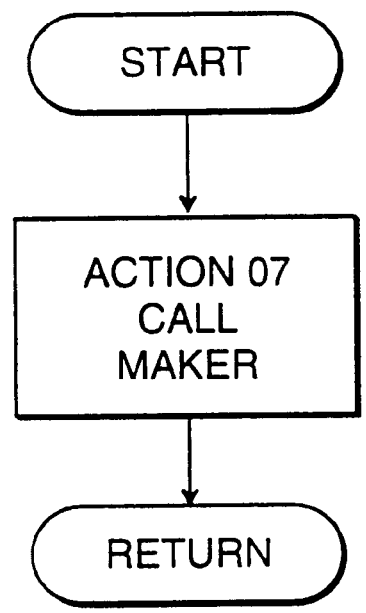
Figure 13H:
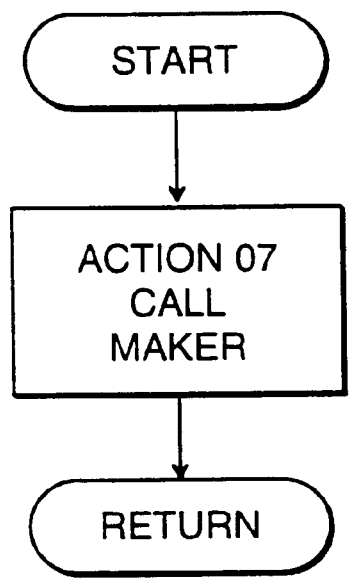
Figure 13I:
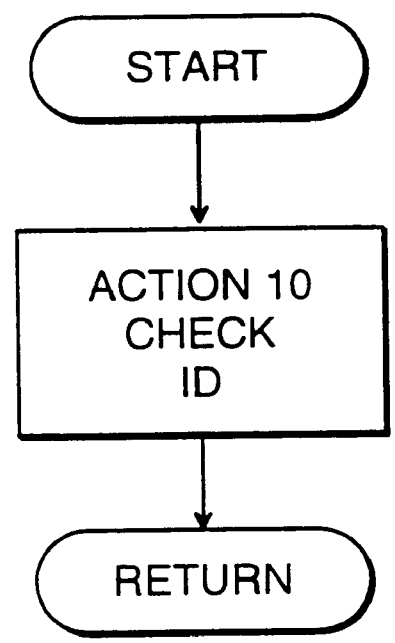
Figure 13J:
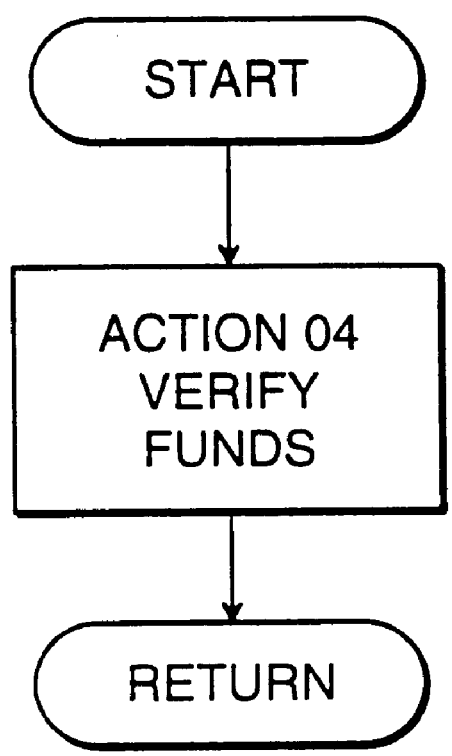
Figure 13K:
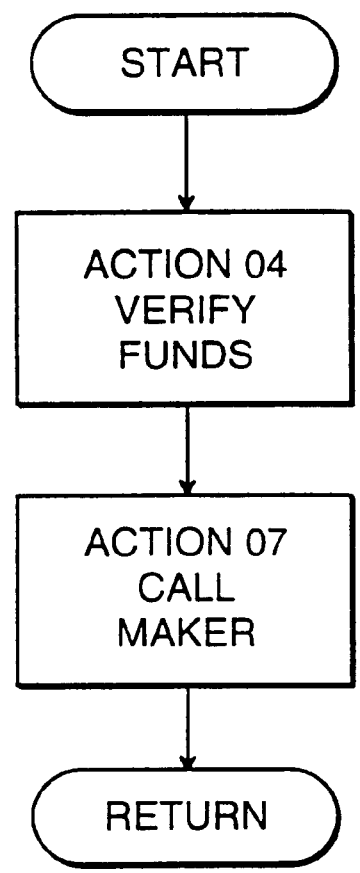
Figure 13L:
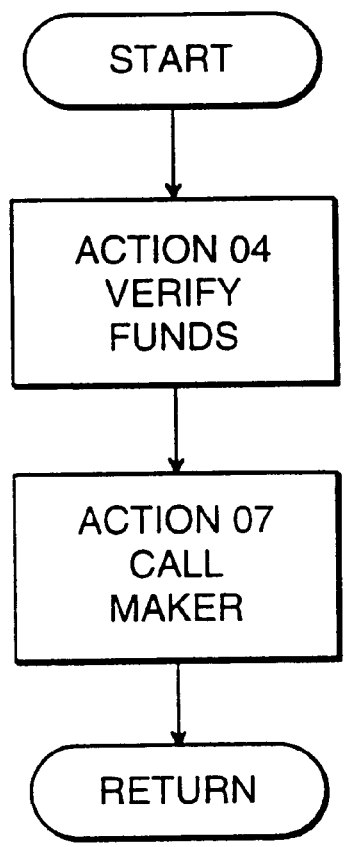
Figure 13M:
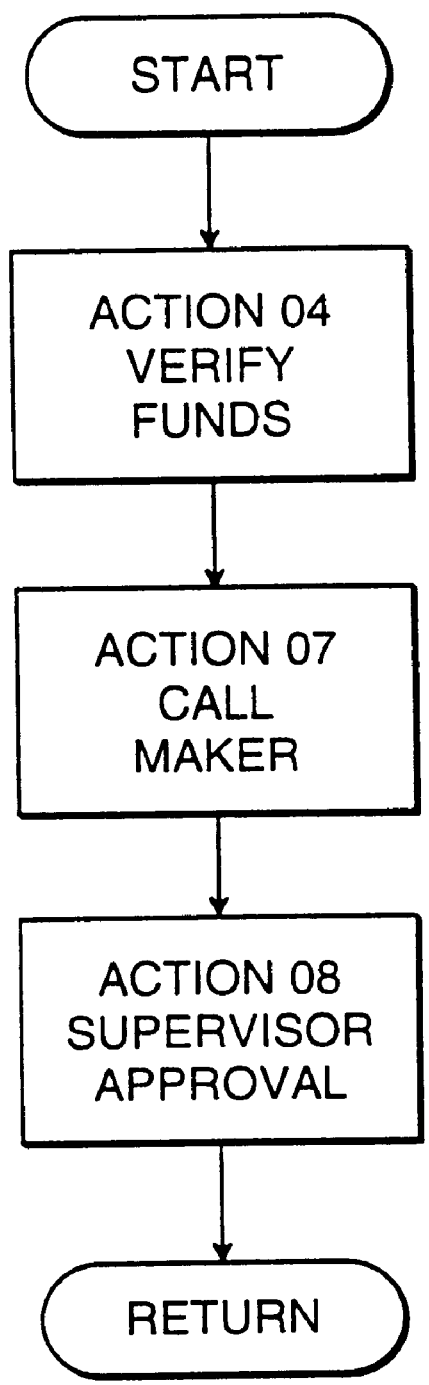
Figure 13N:
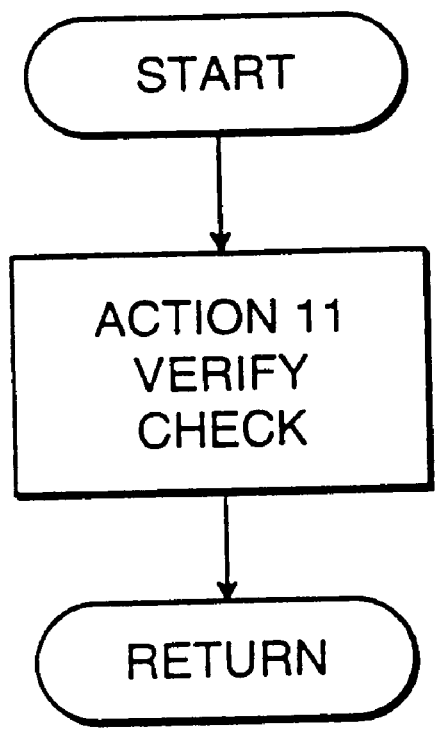
Figure 130:
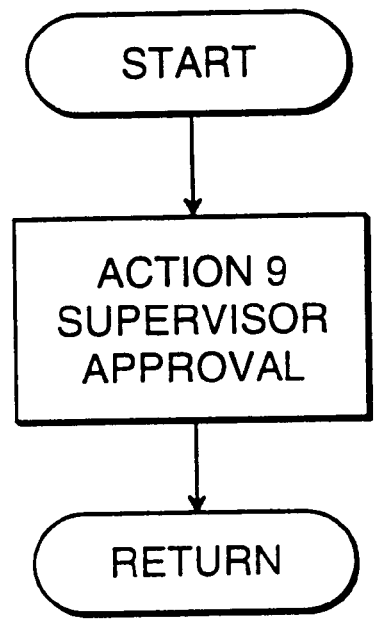
Figure 13P:
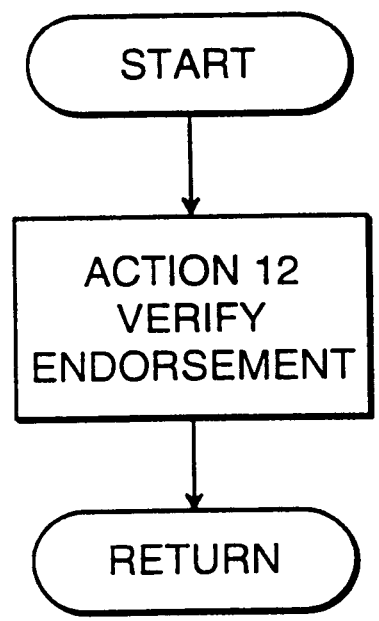
Figure 13Q:
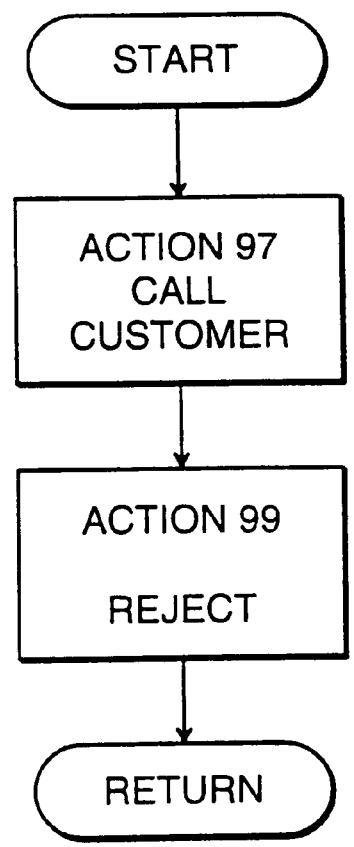
Figure 13R:
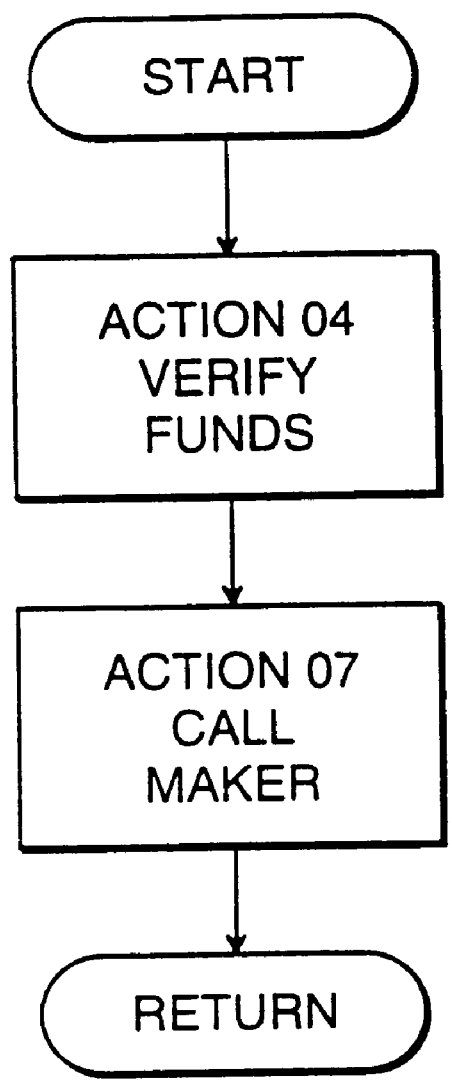
Figure 13S:
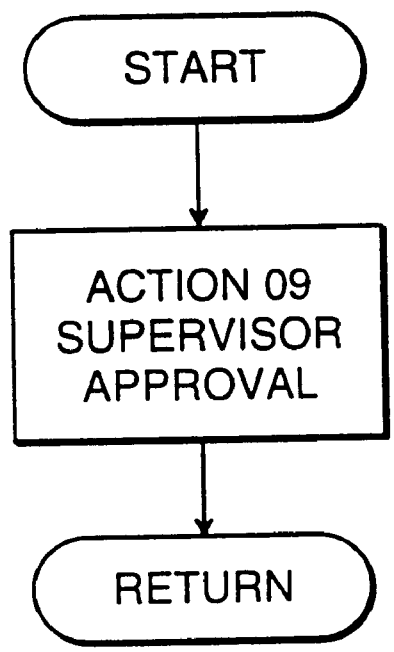
Figure 14A:
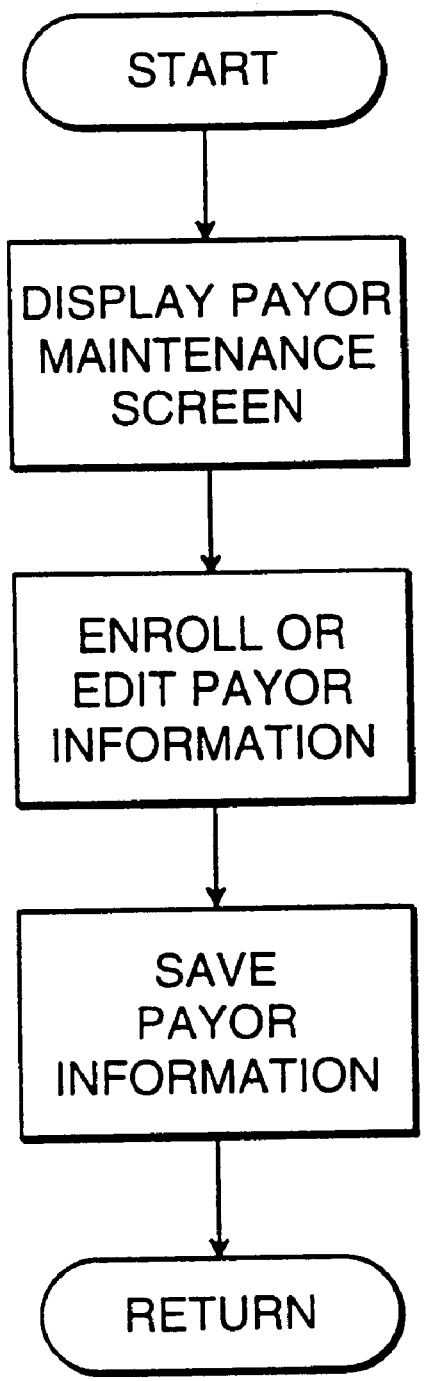
FIGS. 14A–14P are flow charts of procedures implemented by the centralized services center in performing the actions of FIG. 12B.
Figure 14B:
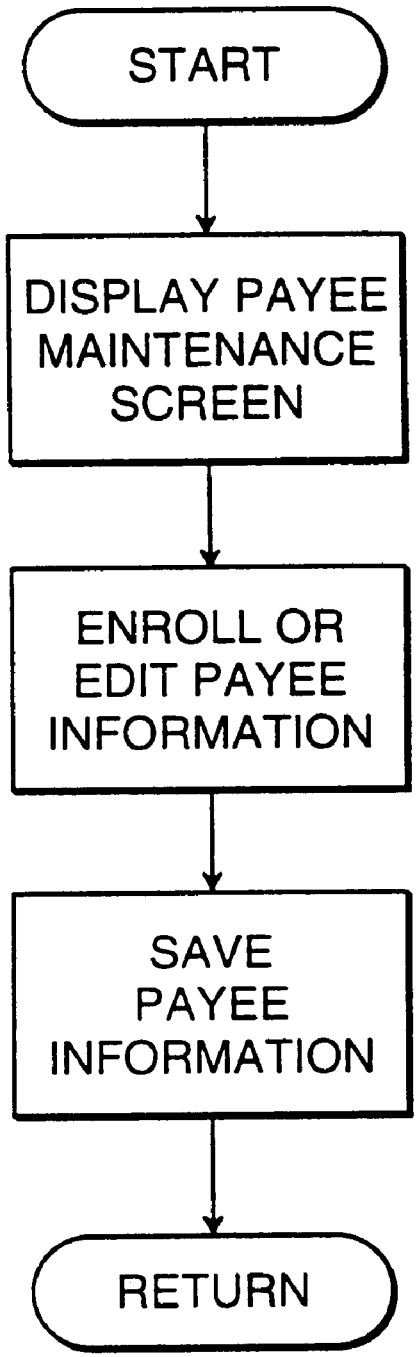
Figure 14C:
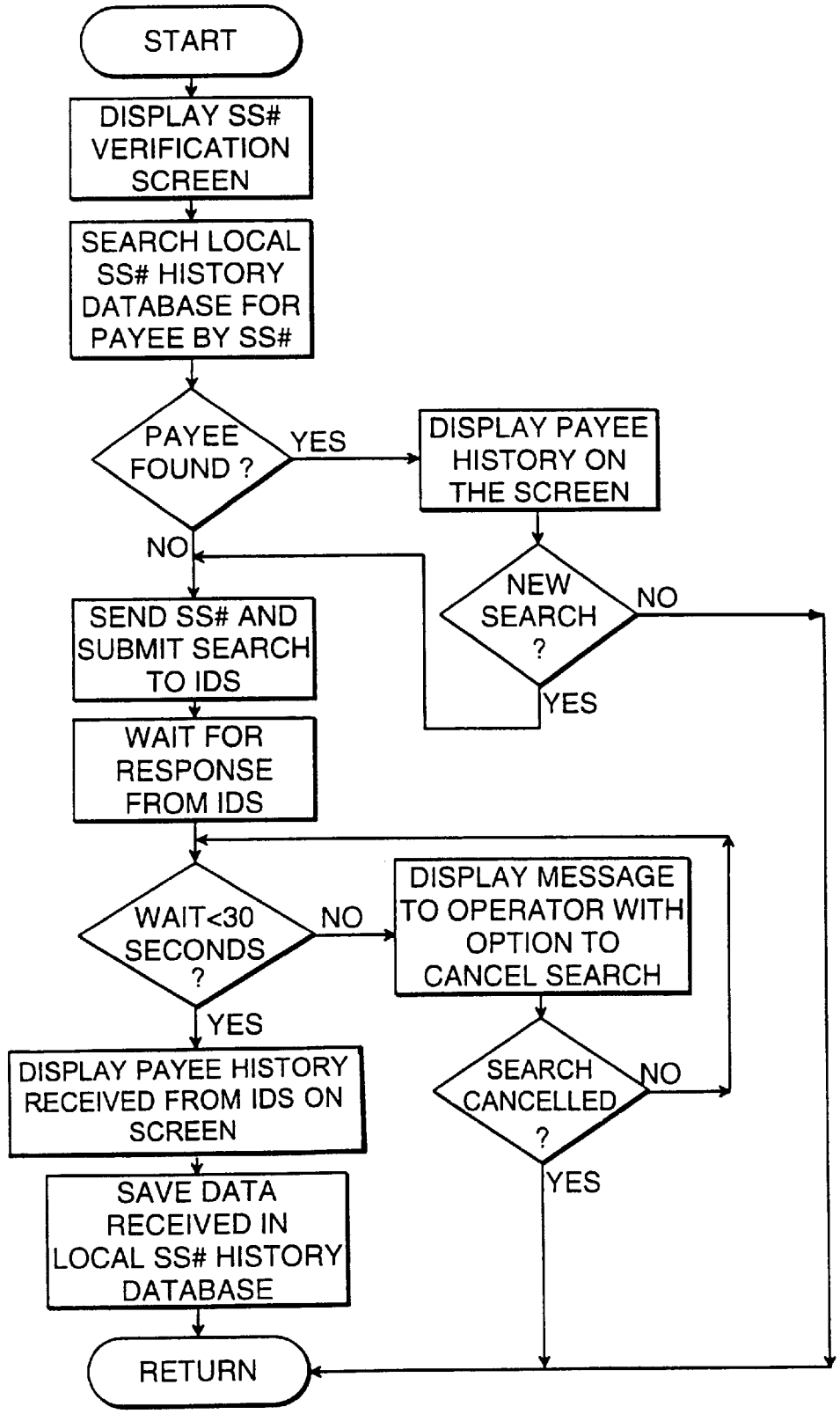
Figure 14D:
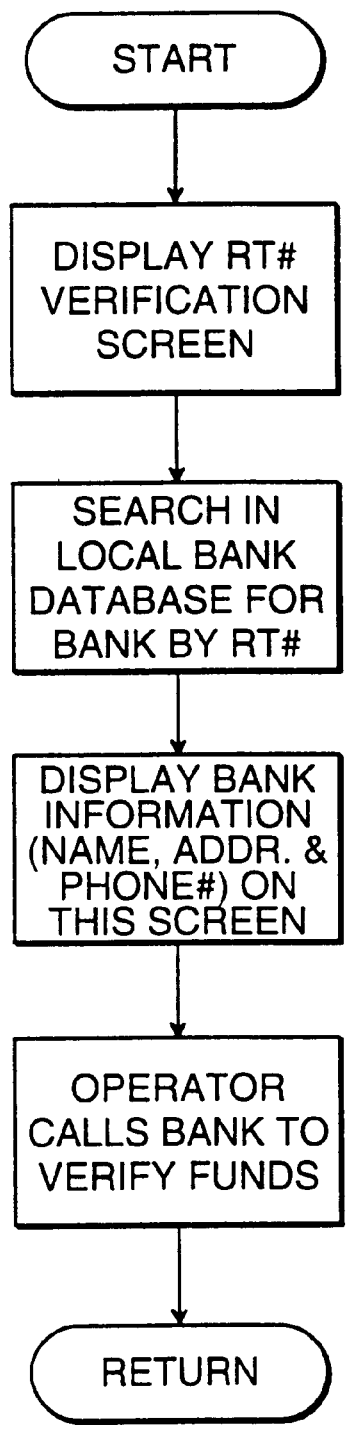
Figure 14E:
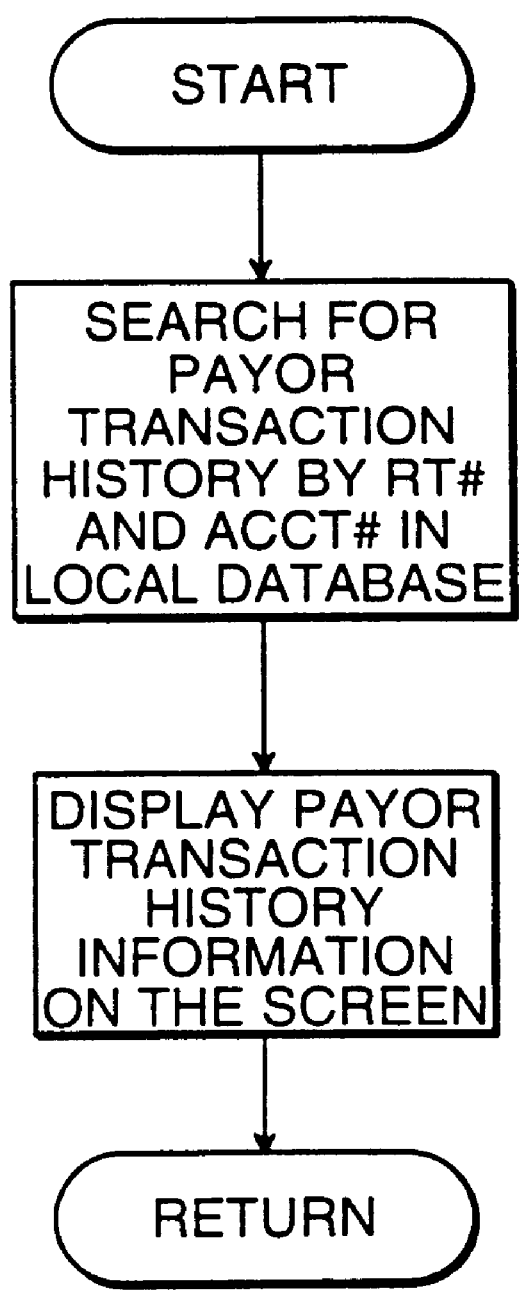
Figure 14F:
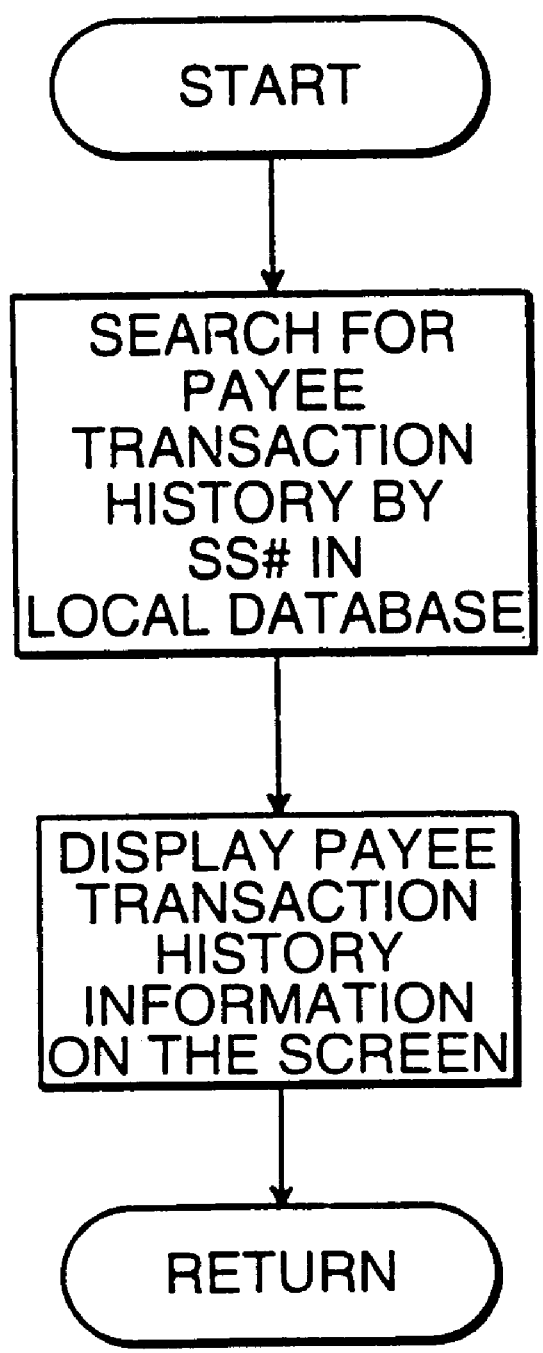
Figure 14G:
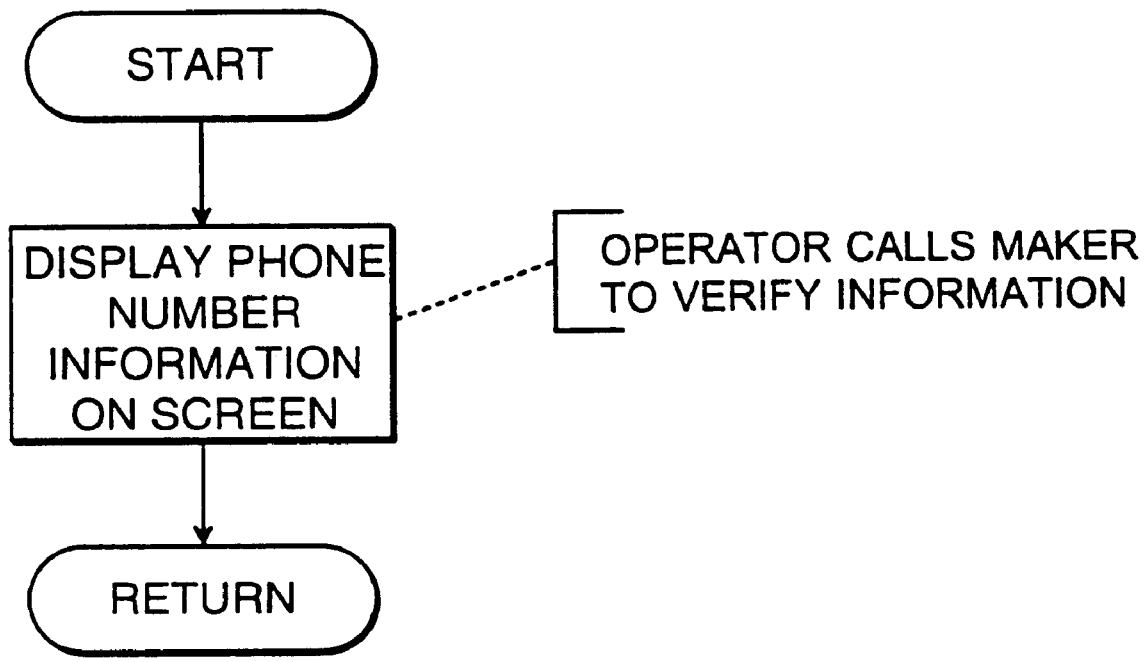
Figure 14H:
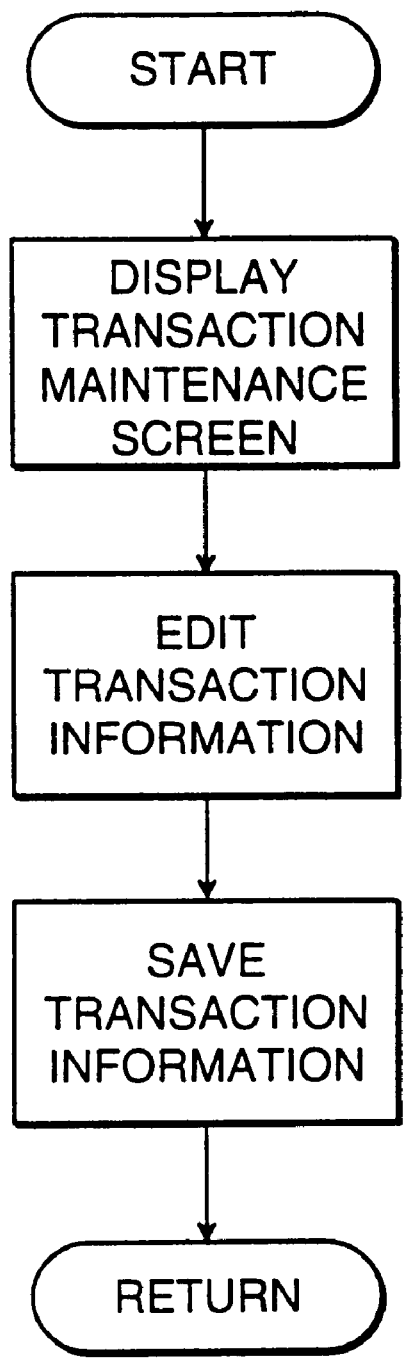
Figure 14I:
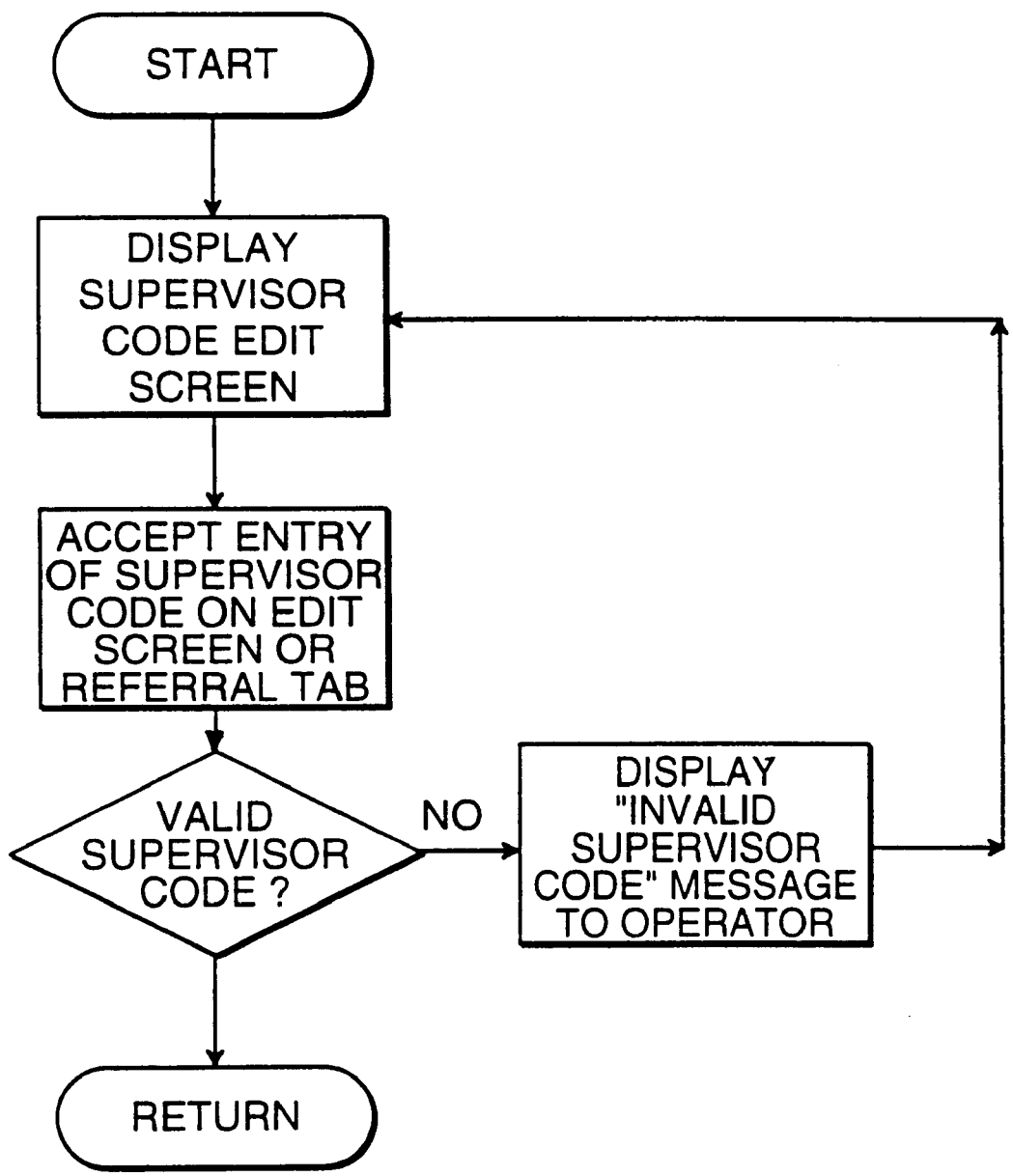
Figure 14J:
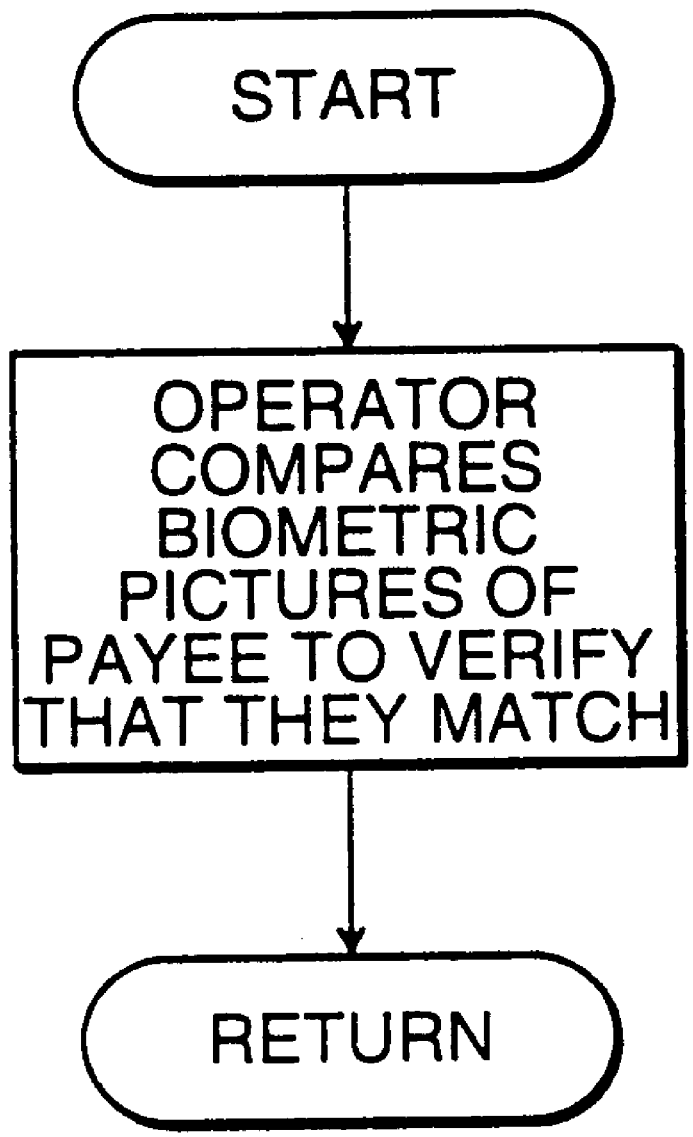
Figure 14K:
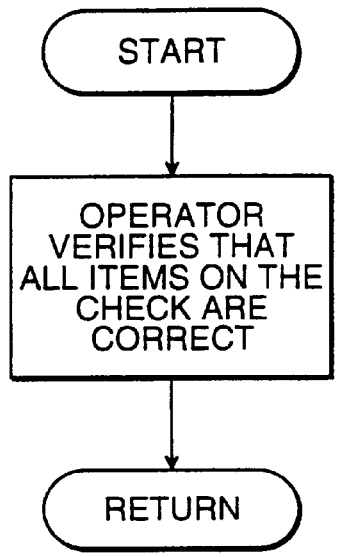
Figure 14L:
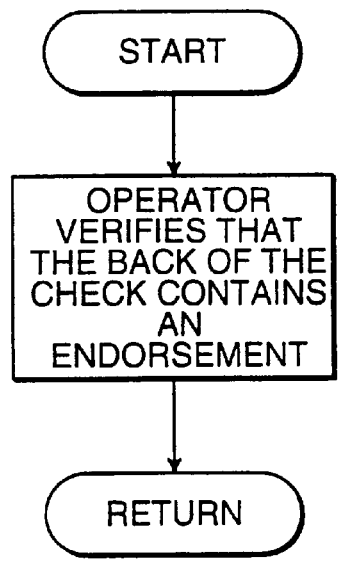
Figure 14M:
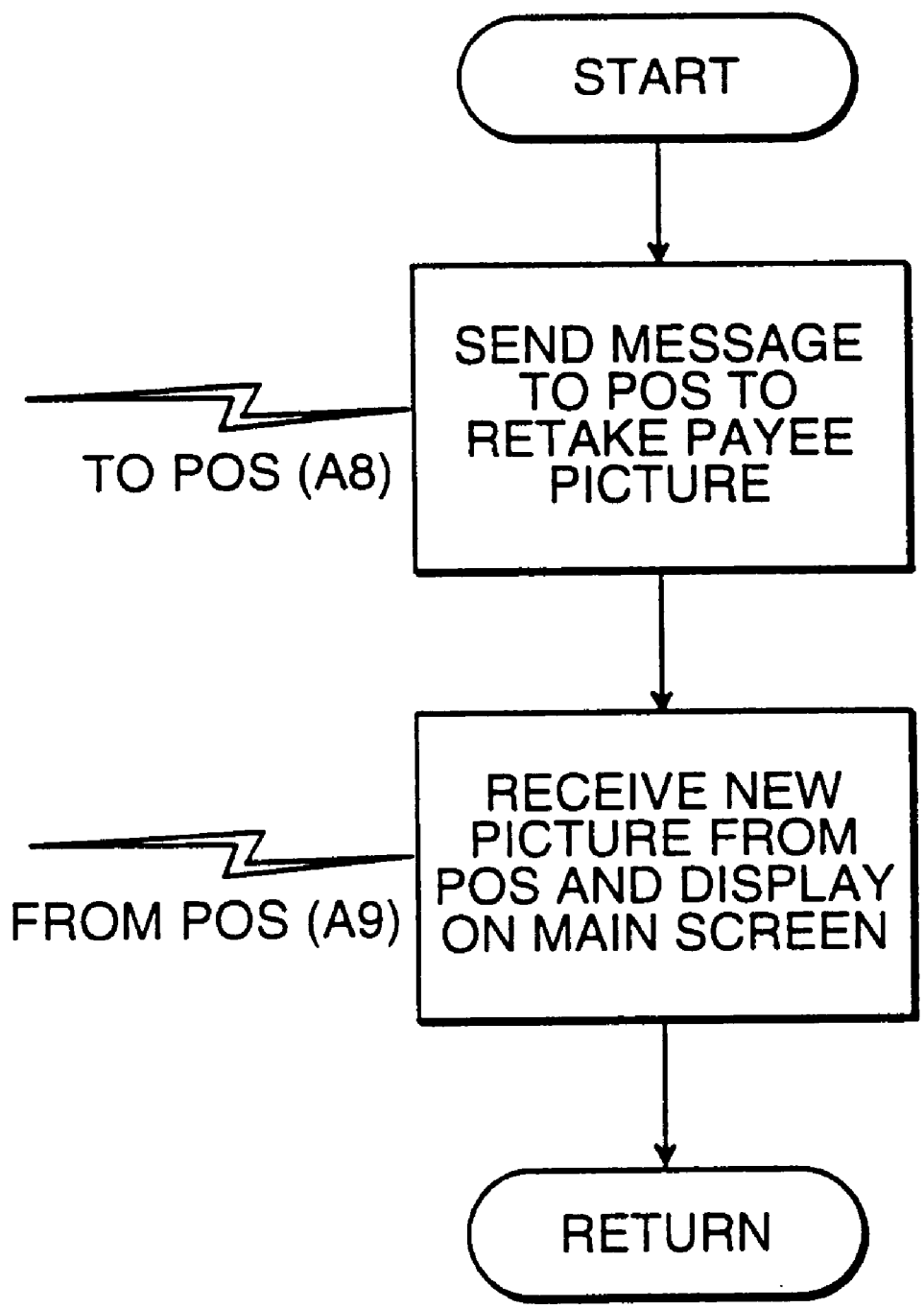
Figure 14N:
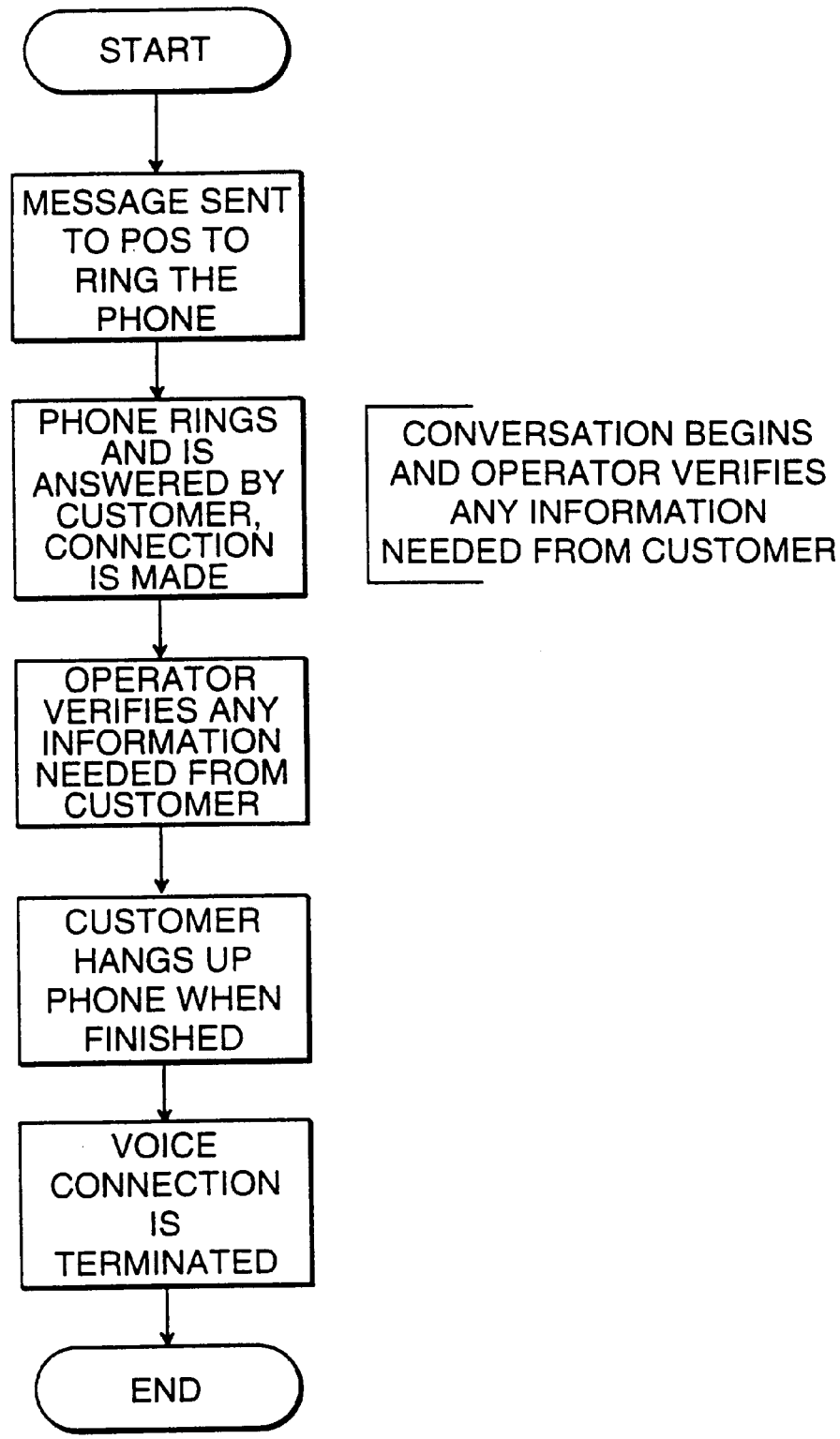
Figure 140:
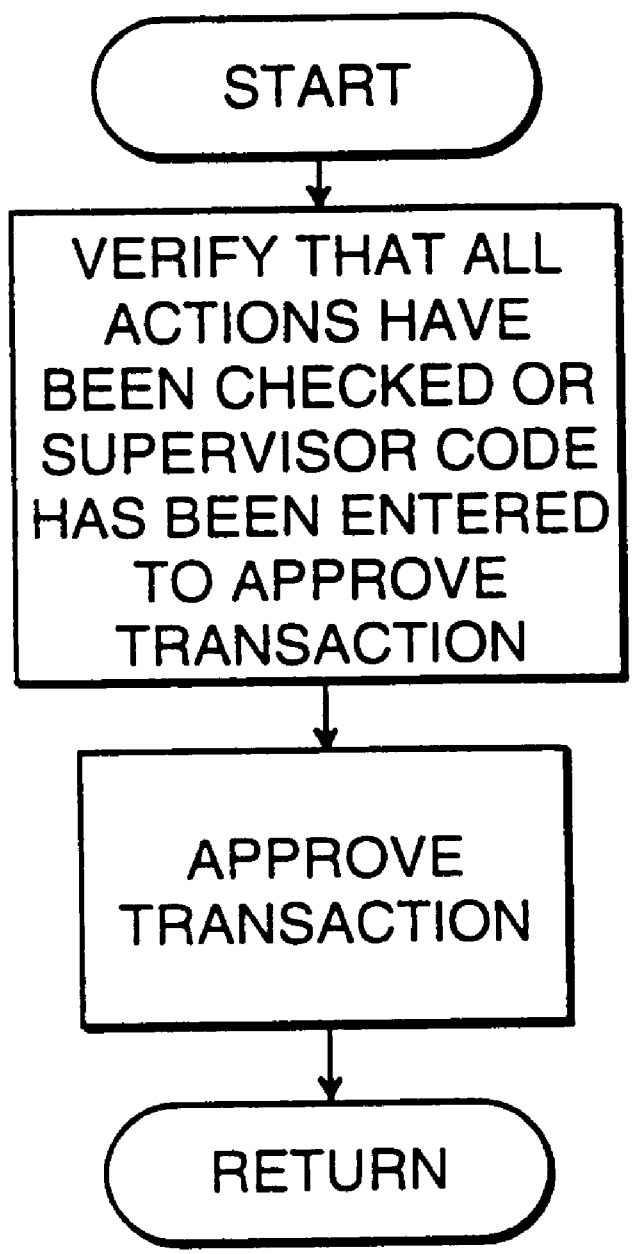
Figure 14P:
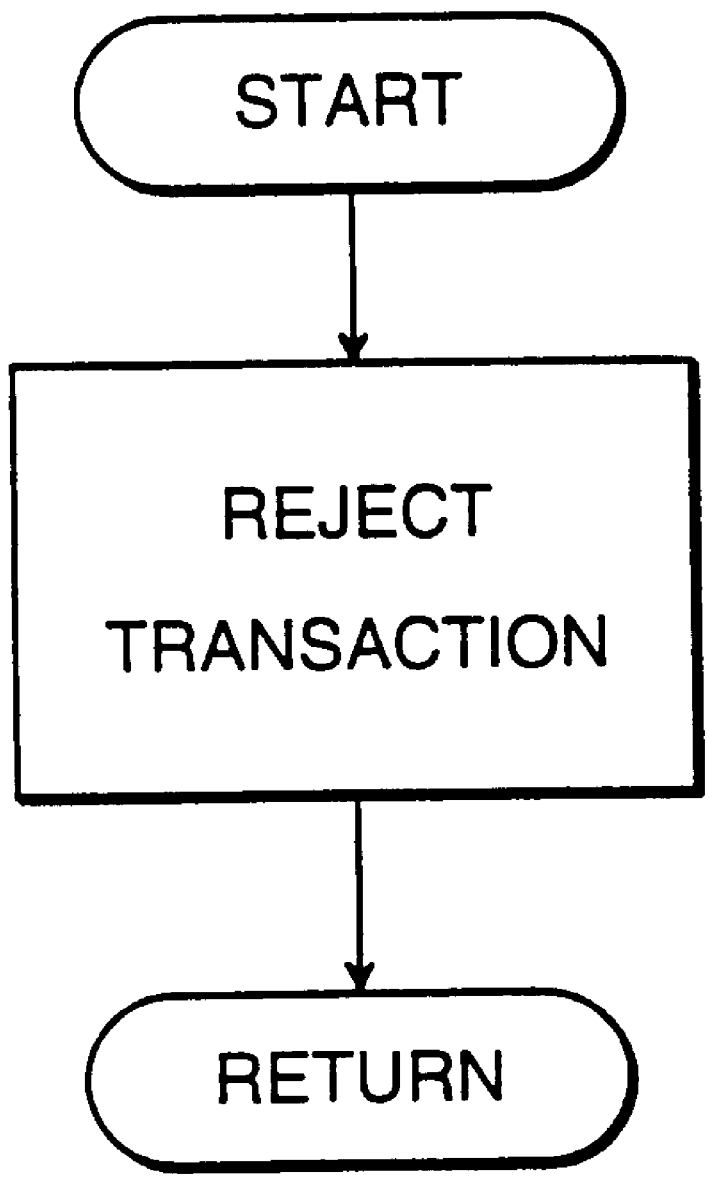
Figure 16A:
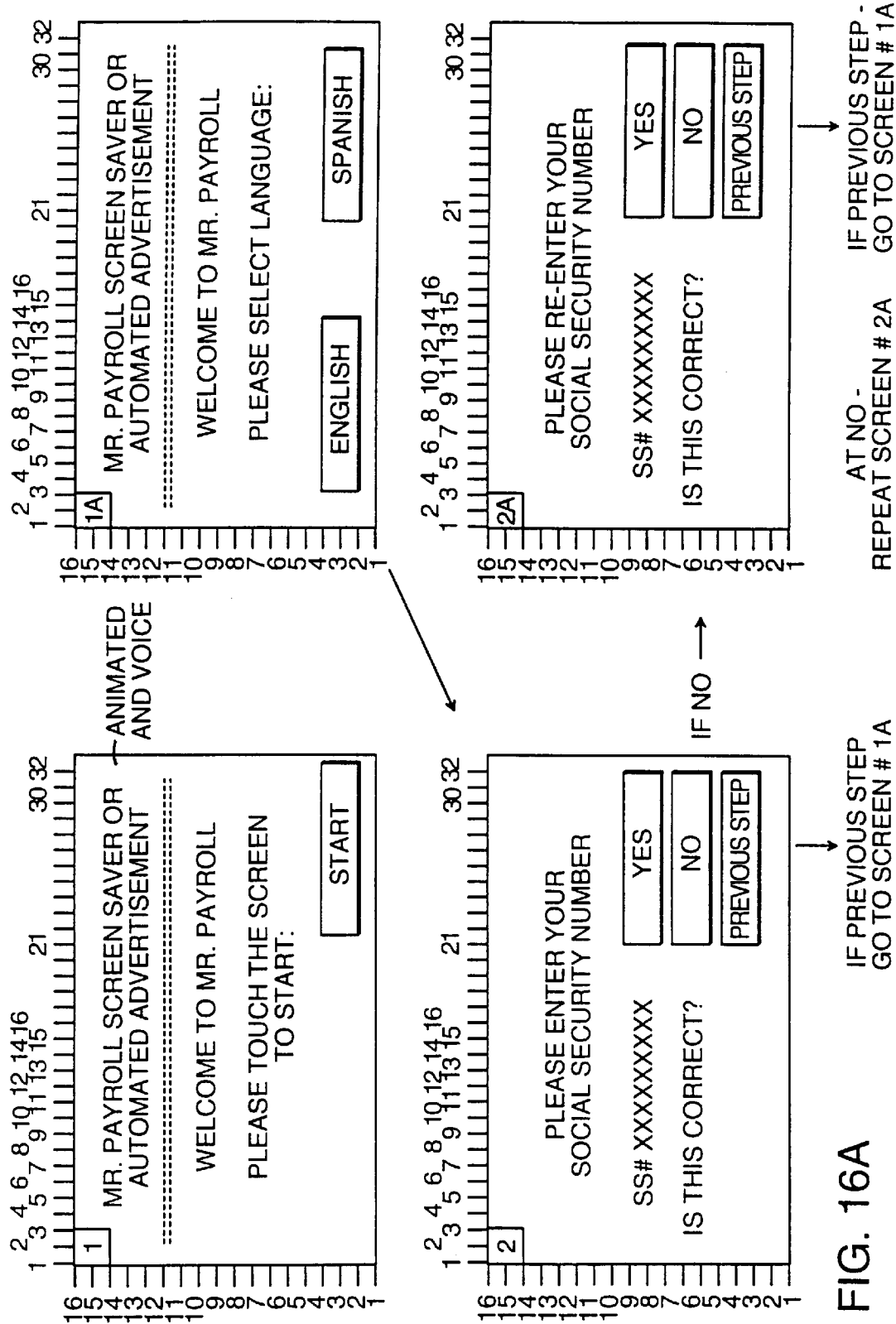
Figure 16B:
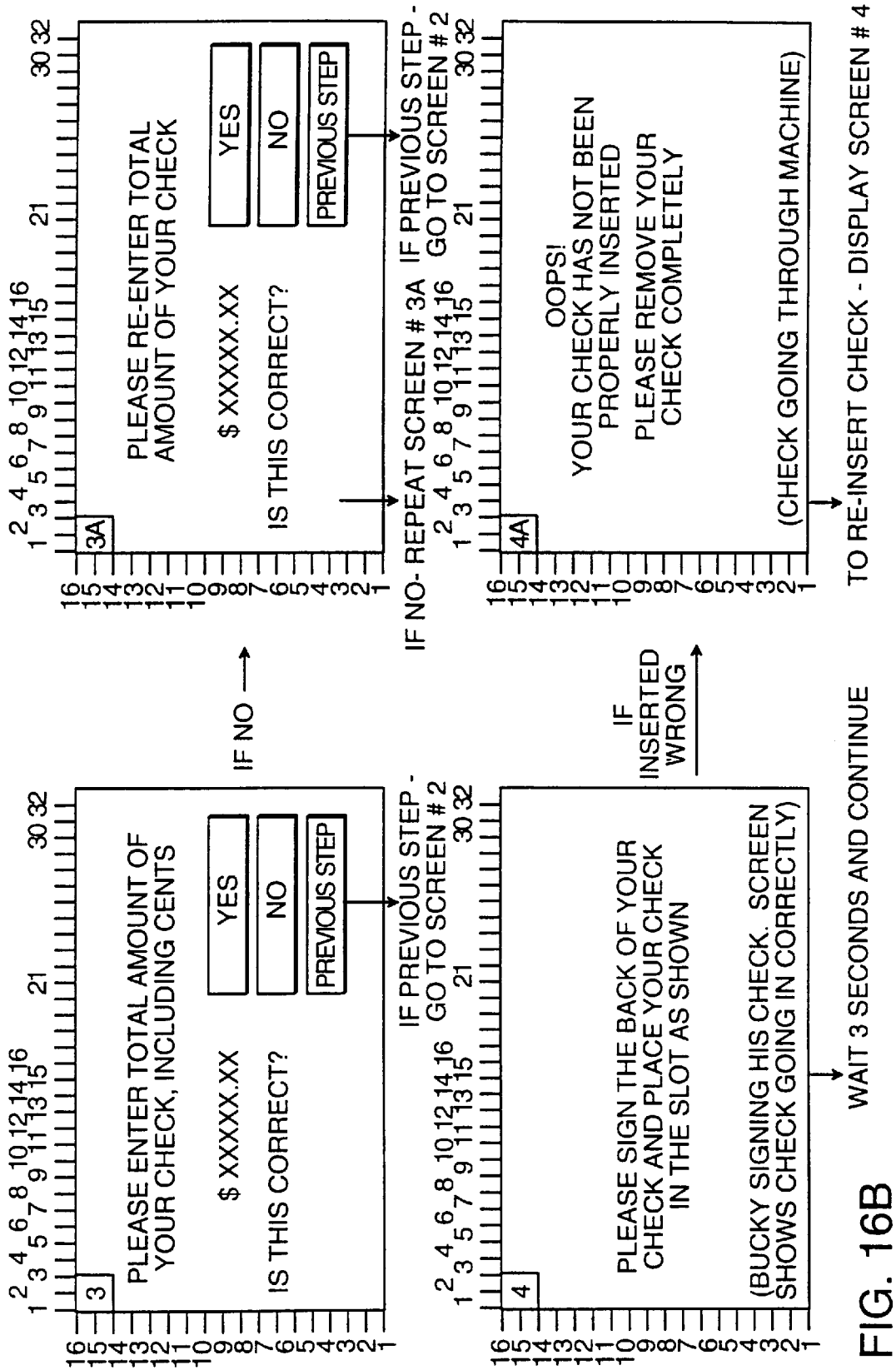
Figure 16C:
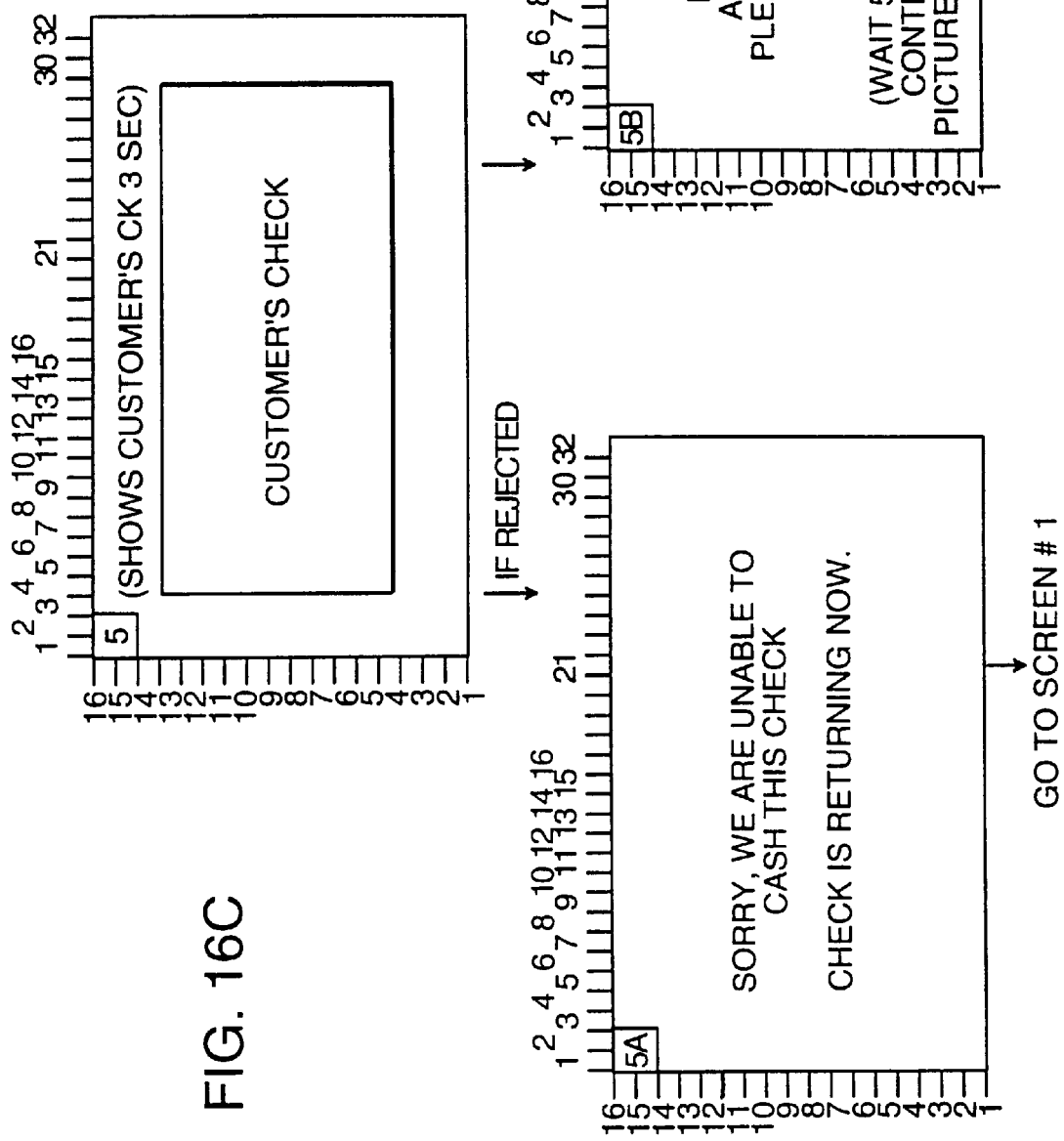
Figure 16D:
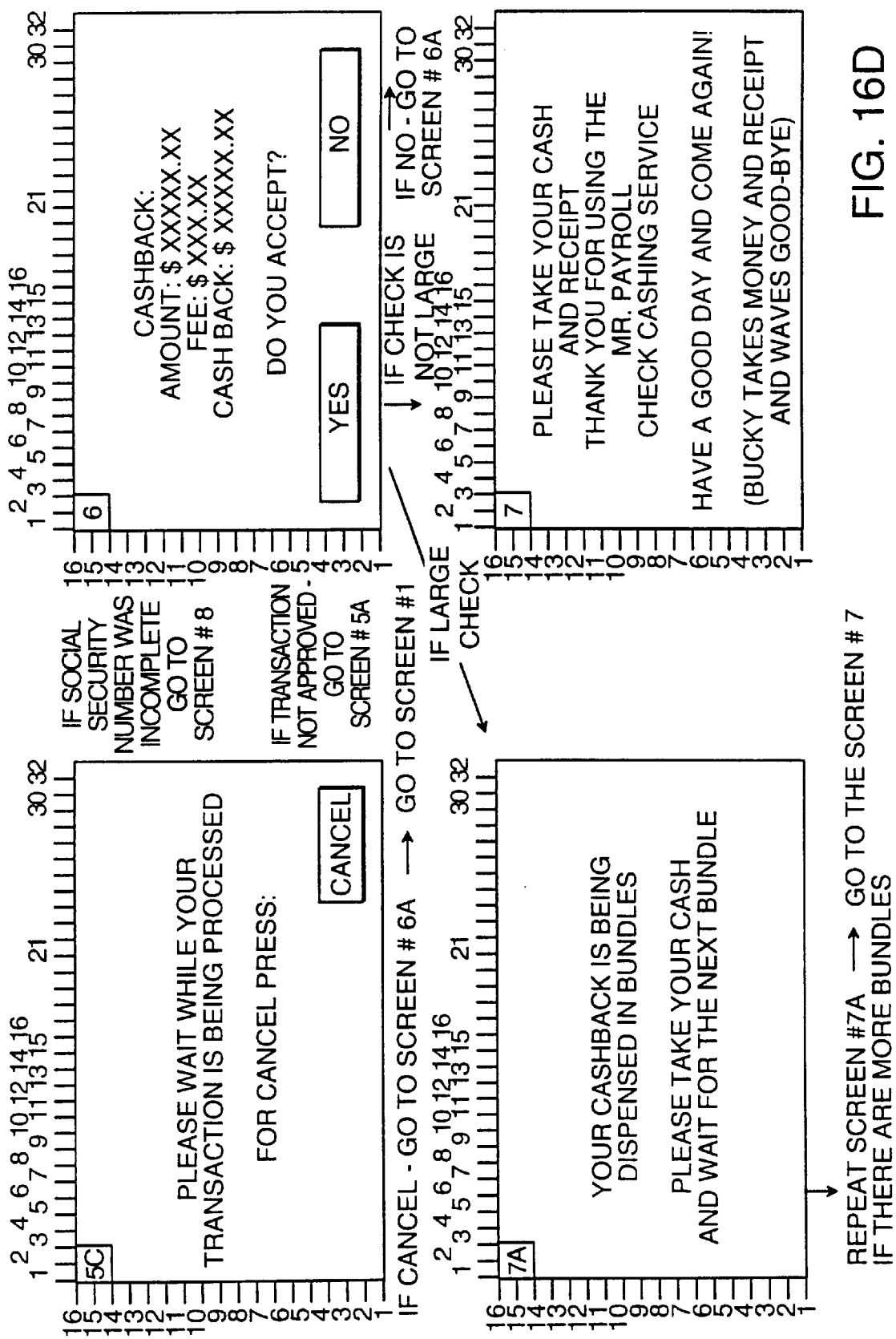

Referrals that may be provided to the CSC and the actions taken by the operator in response to those referrals are illustrated in FIG. 12A, with the actions that are identified by numbers in FIG. 12A being identified in more detail in FIG. 12B. Flow charts of referral responses are provided in FIGS. 13A–13S. Flow charts of actions are provided in FIGS. 14A–14P.

Referring again to FIG. 8A, upon receiving a message from the CSC operator (step 870), or after accepting (step 845) or rejecting (step 829 or 837) the transaction, the call handler sends an appropriate message to the POS unit 100 and waits for a response (step 872).

Referring again to FIG. 7, if the message received from the CSC is an identification request (step 767), the POS unit 100 makes a further attempt to identify the customer (step 769) and transmits a resulting BMP file to the CSC 500 (step 771). If the further attempt is unsuccessful, the server 500 may make a further attempt to identify the customer. The server 500 may be able to identify the customer even though the POS unit 100 could not because the server has access to a larger database than does the POS unit 100. For example, a customer who normally uses a different POS unit may not appear in the payee database of the current POS unit, but would appear in the payee database of the CSC. In this circumstance, the current POS unit would have no image against which to compare the customer's image, while the sever would have such an image. The server 500 then passes the BMP file and the results of the identification to the operator workstation 510 for use by the operator in taking additional actions (step 860 of FIG. 8B).

If the message received from the CSC is not an identification request (step 767), the processor 300 determines whether the transaction has been approved or rejected (step 773). If the transaction has been rejected, the processor 300 ends the call to the CSC 400 (step 775) and notifies the ATM 350 (step 779).

If the transaction has been approved (step 773), the processor 300 determines the fee to charge the customer and the payback amount (i.e., the amount of cash that the customer will receive) (step 777). The processor 300 then sends this information to the ATM 350 and waits for a reply (step 779). Because operator intervention was required, this fee may differ from the fee that would have been calculated had the processor automatically approved the transaction.

Upon receiving a transaction verification result from the ATM 350 (step 781), the processor 300 sends a transaction reply message to the ATM 350 (step 783) and waits for a transaction confirmation message from the ATM. Upon receiving a transaction confirmation message from the ATM, the processor 300 records the transaction and updates the database located on the storage device 320 (step 787). The processor 300 then sends a transaction completed or cancelled message to the CSC 400 (step 789) and ends the call to the CSC 400 (step 791).

Referring again to FIG. 8A, upon receiving a reply from the processor 300 (step 874), the server 500 records the transaction and updates the server's databases (step 876).

For tracking purposes, a check record associated with each check being handled by the CSC includes a status code, a check disposition code, and an operator code. A status code of "A" indicates that the check is waiting to be handled by an operator or a supervisor, and a status code of "C" indicates that the check has been processed by an operator or a supervisor and that the POS unit has performed the appropriate function in response. Check disposition codes of 11, 12, 21, 22, 31, 32, 41 and 42 indicate that the check was accepted ("n1") or rejected ("n2") by the POS unit ("1*n*"), CSC automatic verification ("2*n*"), a CSC Operator ("3n") or a CSC Supervisor ("4n"). The operator code is blank until the active check has been assigned to a specific operator, and thereafter identifies that operator. Other data structures used by the POS unit 100 and the CSC 400 are illustrated in FIGS. 15A–15L.

Sample screen displays produced by the ATM 350 of a POS unit 100 are illustrated in FIGS. 16A–16F. Arrows between the various screens indicate the sequence and the conditions under which the screens are displayed.

The software implemented by the CSC 400 may be described with reference to several different modules. The first module, referred to as the call handler, includes one instance per active call and receives messages from the POS unit. Functions implemented by the call handler include reformatting and/or writing a POS message to the CSC server and identifying the message type of the message. If the message is for a CSC operator, the call handled instantiates an instant check evaluator that attempts to automatically approve or reject the check associated with the message. If the message is for a CSC supervisor, the call handler places the message into a POS to CSC table.

If the message is a photo or check image, and the related check is being handled by an operator or a supervisor (i.e., the check disposition code for the related check is "30" or "40"), the call handler updates an image display window for the operator or supervisor. The call handler also sends CSC mailbox items that are addressed to the POS unit, and terminates the call when a live call is completed by the CSC operator and all mail for the POS unit is sent.

As noted above, the instant check evaluator attempts to automatically approve or reject a check. The evaluator receives a store number and transaction number from the call handler and evaluates the business rules to determine if the check should be automatically accepted or rejected, and changes the check disposition code to show the results of the evaluation (i.e., "21" indicates automatic approval, "22" indicates automatic rejection, and "30" indicates that operator intervention is required).

An operator transaction manager module routes messages between the other modules. When one or more checks need to be processed by an operator (i.e., there are checks with disposition codes of "30"), and one or more operators are available, the operation transaction manager reads from the oldest check to be processed to the newest check to be processed, and determines for each check whether a qualified operator (e.g., an operator who speaks the appropriate language) is available. If a qualified operator is available, the operation transaction manager places the operator's number into the operator code for the check and passes information about the check to the operator.

A CSC operator module provides information about a check to the operator.

The CSC operator module also provides the operator with any other information needed to evaluate the check. Once the operator makes a decision about the check, the CSC operator module changes the disposition code for the check to an appropriate value (i.e., "31" is approved, "32" if rejected, and "40" if referred to a supervisor) and takes an appropriate action.

A CSC supervisor module carries out functions similar to those of the operator transaction manager and the CSC operator module, but does so for the supervisor(s) rather than the operator.

The various software modules communicate with each other with messages passed between and among the modules. The messages may be formatted as: module from, module to, date, time, type, priority, store number, transaction number, and text, where the module from and module to entries may equal: ATM (the automated teller machine), POS (the point of sale unit), CAM (the camera) and CSC (the central service center), and where "text" is one or more comma delimited fields.

Figure 17:
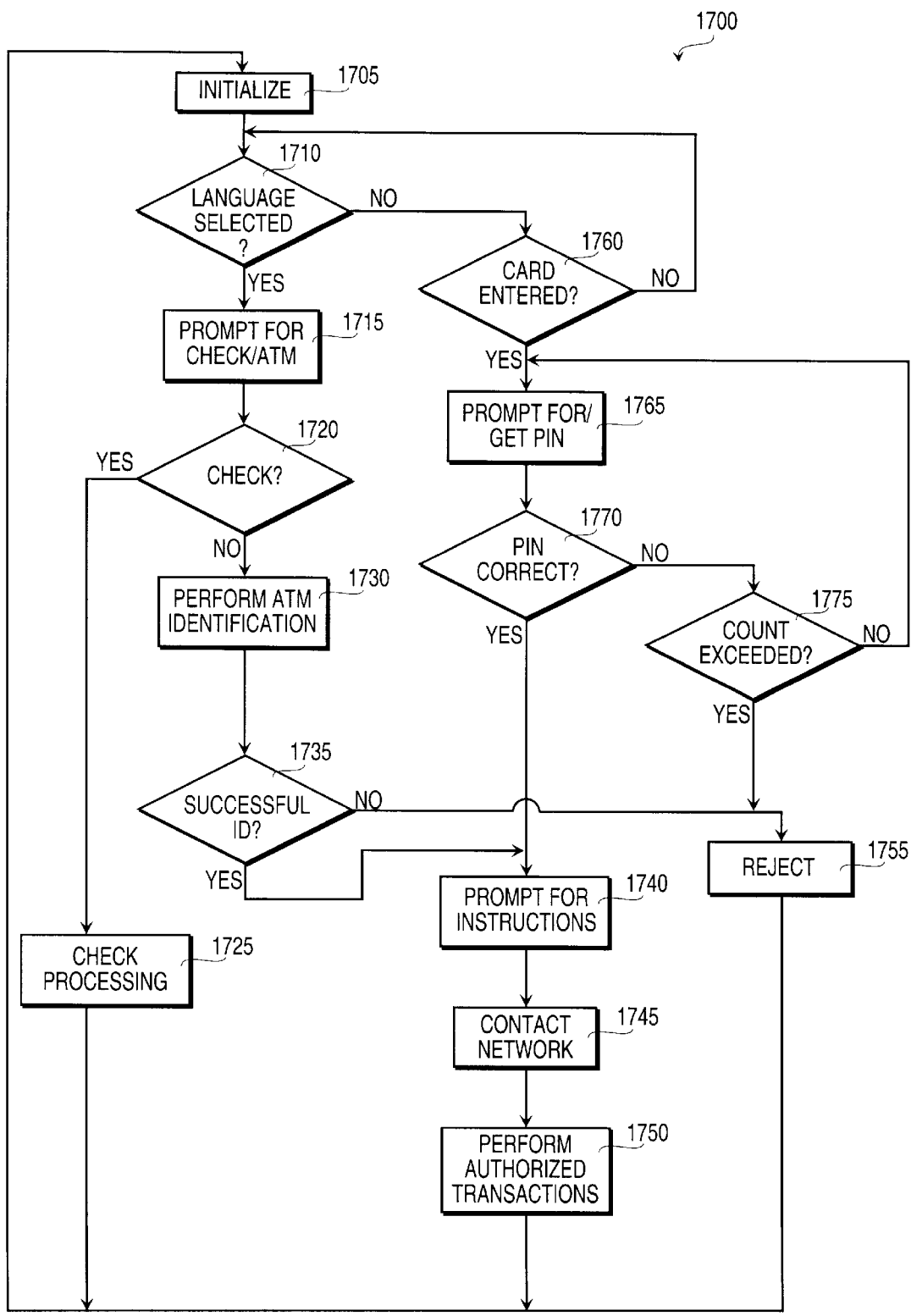
FIGS. 17–19 are flow charts of procedures implemented in providing ATM transactions.

FIG. 17 illustrates a procedure 1700 that may be implemented by an ATM of a POS unit that is configured to provide, in addition to the check-cashing functions described above, cardless ATM transactions and traditional ATM transactions. Initially, as in the procedure 600, the ATM displays a screen that permits the customer to select an appropriate language (e.g., English or Spanish) and waits for the selection from the customer (step 1705). When the customer selects the language (step 1710), the ATM asks the customer whether a check-cashing transaction or an ATM transaction is desired (step 1715). If the customer selects a check-cashing transaction (step 1720), the ATM prompts the customer to enter the customer's social security number or other identification number and proceeds with check processing as discussed above with reference to FIGS. 6A, 6B, 7, 8A and 8B (step 1725).

In another variation, the ATM prompts the customer for an identification number instead of asking the customer whether a check-cashing transaction or an ATM transaction is desired. The processor of the POS unit then determines whether the customer is a check cashing customer or an ATM customer based on information stored in association with the customer's identification number. When the associated information indicates that the customer performs both check cashing and ATM transactions, the processor instructs the ATM to ask the customer whether a check-cashing transaction or an ATM transaction is desired.

If the customer selects an ATM transaction instead of a check-cashing transaction (step 1720), the ATM performs an ATM identification procedure to confirm the customer's identity (step 1730). If the identification is successful (step 1735), the ATM prompts the customer for instructions as to the ATM transactions to be performed (step 1740). The ATM then contacts a network provider (step 1745) to determine whether the requested transaction is authorized. For example, the ATM may contact the network provider to determine whether the customer's bank account includes sufficient finds to cover a withdrawal requested by the customer. Finally, the ATM performs any authorized transactions, such as dispensing a withdrawal or accepting a deposit (step 1750).

If the identification is unsuccessful (step 1735), the ATM issues a rejection message to the customer (step 1755). After processing a check (step 1725), performing authorized ATM transactions (step 1750), or rejecting an ATM customer (step 1755), the ATM waits for the next customer to arrive (step 1705).

As noted above, the system also may be used to provide traditional ATM transactions. If, instead of selecting a language, the customer inserts an ATM card in the optional card reader (step 1760), the ATM prompts the customer to enter a personal identification number (PIN) (step 1765). If the customer enters the correct PIN for the inserted card (step 1770), the ATM prompts the customer for instructions (step 1740) and proceeds as discussed above.

If the customer enters an incorrect PIN for the inserted card (step 1770), the ATM determines whether the customer has exceeded a permitted number of incorrect entries (step 1775). For example, the system may permit the customer to make three attempts at entering the correct PIN. If the customer has not exceeded the permitted number of entries, the ATM prompts the customer to enter the PIN (step 1765). If the customer has exceeded the permitted number of entries, the ATM issues a rejection message to the customer (step 1755). The ATM may be configured to either return or keep the customer's card upon issuing a rejection message.

Figure 18:
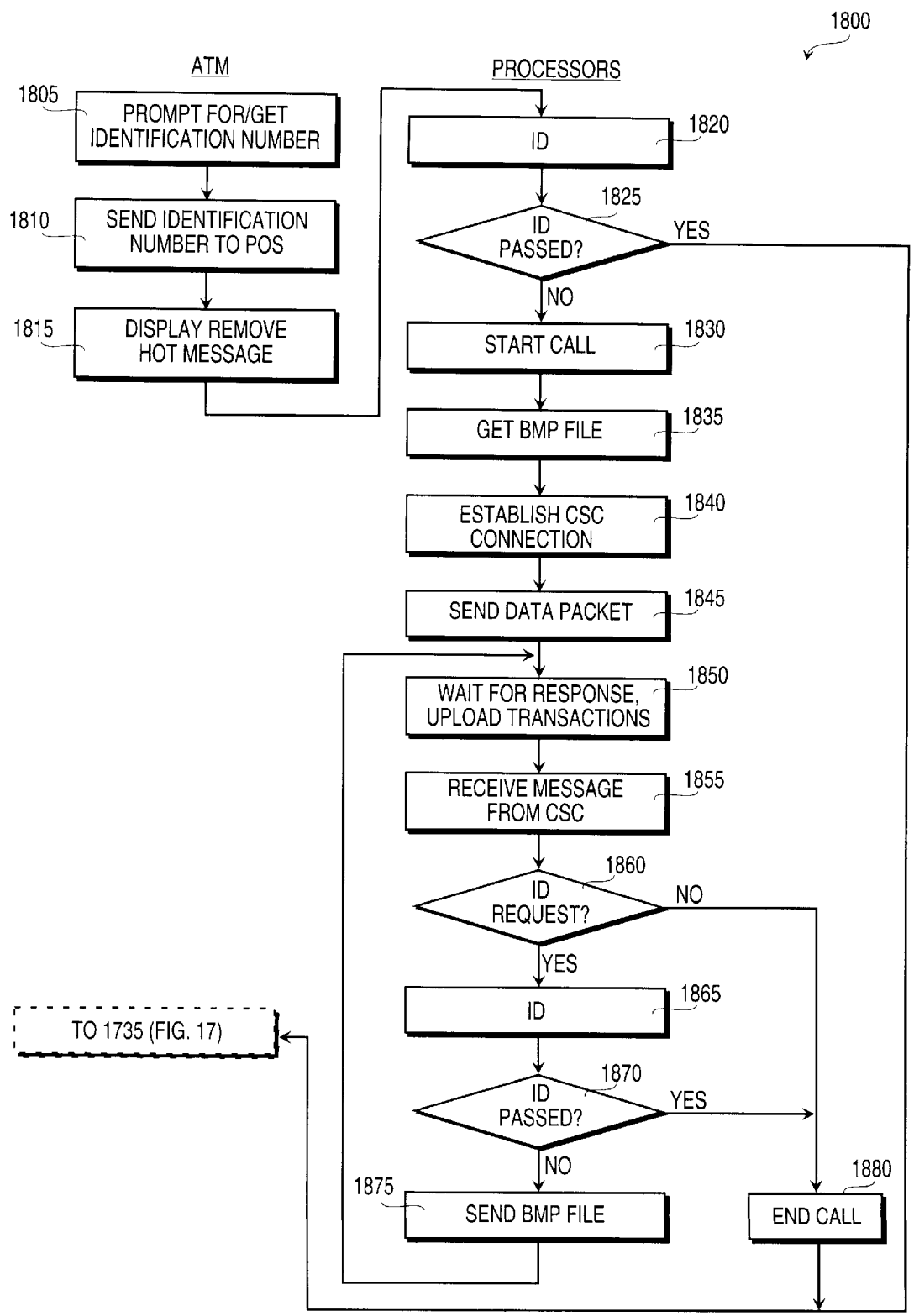

ATM identification (step 1730) is performed according to the procedure 1800 illustrated in FIG. 18. Initially, the ATM prompts the customer to enter the customer's identification number (e.g., account number or social security number) (step 1805). Next, the ATM sends the identification number to the processor of the POS unit (step 1810). The ATM then prompts the customer to remove any hat, sunglasses, or other items that would obscure the customer's face (step 1815) and waits for a response from the processor.

Upon receiving the identification number from the ATM, the processor attempts to identify the customer (step 1820). To this end, the processor uses the identification software described above that identifies a person based on an image of the person's face. As noted above, the identification software compares an image of the customer produced by a camera 125 with an image stored in conjunction with the customer's identification number in a database stored on the storage device 320. As also noted above, other types of biometric identification software could be used. For example, the identification software could identify the customer using a fingerprint or palmprint, DNA analysis, a retinal scan, or an analysis of the customer's voice.

If the identification software approves the customer (i.e., if the customer's image matches the image stored with the customer's identification number) (step 1825), the processor notifies the ATM of this approval and the ATM proceeds to step 1735 of FIG. 17. If the identification software does not approve the customer (i.e., if the customer's image does not match the stored image, or if there is no stored image for the customer's identification number), the processor initiates a call to the CSC (step 1830). The processor then gets a bitmap ("BMP") file of the customer's image (step 1835) for transmission to the CSC.

After initiating a call, the processor establishes a connection to the CSC using an ISDN line (step 1840). The processor uses one channel of the line to transmit a data packet about the customer to the CSC (step 1845). The data packet includes the identification number, the BMP file including an image of the customer, and an indication that the transaction is being sent to the CSC based on the results of the identification procedure. The processor uses the other channel of the line to establish a video conferencing connection between the POS unit and the CSC.

The processor then waits for a response from the CSC (step 1850). While waiting for the response, the processor uses any available bandwidth of the connection between the POS unit and the CSC to provide the CSC with information about any transactions that the processor has independently processed since the last call from the processor to the CSC.

Figure 19:
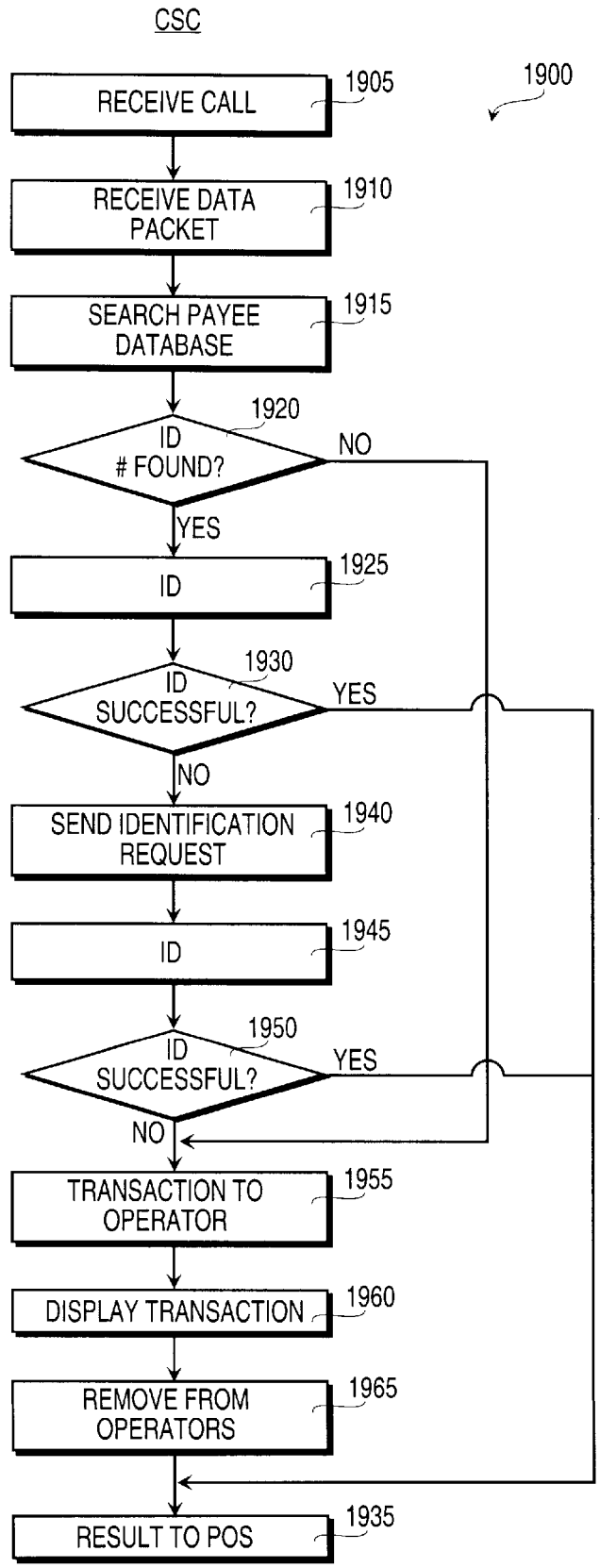

Referring to FIG. 19, the CSC processes the call from the POS unit according to the procedure 1900. Upon receiving a call (step 1905), the server of the CSC validates a security code associated with the call, as described above. After validating the security code, the server receives the data packet for the transaction from the POS unit (step 1910). The server 500 searches the payee database or a similar database for ATM transactions according to the customer's identification number (1915). If the server 500 finds the customer (step 1920), the server attempts to identify the customer using the identification software to compare the BMP file sent with the data packet to an image of the customer stored in the database (step 1925).

If the identification is successful (step 1930), the server sends the results to the processor at the POS unit (step 1935). If identification is unsuccessful, the server sends an identification request to the processor at the POS unit and waits for a reply (step 1940).

Referring again to FIG. 18, upon receiving a message from the CSC (step 1855), the processor of the POS unit determines whether the message is an identification request (step 1860). If the message is an identification request, the processor makes a further attempt to identify the customer (step 1865). If the attempt is unsuccessful (step 1870), the processor transmits the resulting BMP file to the CSC (step 1875) and waits for a response from the CSC (step 1850).

If the message received from the CSC is not an identification request (step 1860), or if the new identification was successful (step 1870), the processor ends the call (step 1880) and notifies the ATM of the contents of the message. The ATM then proceeds to step 1735 of FIG. 17.

Referring again to FIG. 19, upon receiving a BMP file in response to an identification request, the server at the CSC makes a further attempt to identify the customer (step 1945). The server may be able to identify the customer even though the POS unit could not because the server has access to a larger database than does the POS unit. For example, a customer who normally uses a different POS unit may not appear in the payee database of the current POS unit, but would appear in the payee database of the CSC. In this circumstance, the current POS unit would have no image against which to compare the customer's image, while the sever would have such an image. If the identification is successful (step 1950), the server sends the results to the processor at the POS unit (step 1935).

If identification is unsuccessful (step 1950), the server sends the transaction to the workstation of the next available operator (step 1955) and waits to receive a message from the operator. The server also sends the transaction to the workstation when the customer's identification number is not found in the server's payee database (step 1920).

The operator's workstation displays information about the transaction to the operator (step 1960). When the identification is unsuccessful, this information may include the image stored for the customer along with the image generated by the POS unit. The operator may compare these images and make a determination about whether the customer actually is who the customer purports to be. The workstation also may provide the operator with other information about the customer to permit the operator to query the customer about the customer's identity. When the server has no record of the customer's identification number, the operator may communicate with the customer to determine whether the customer has entered the correct number. In either case, the operator responds to the displayed information by sending an approval or rejection message to the server (step 1965), or by passing the transaction along to a supervisor as described above. The server then sends the response to the processor at the POS unit (step 1935).

Other uses to which the system may be put include, but are not limited to: paying bills, extending loans, producing rent-to-own contracts, filing tax returns, or dispensing social security or other government benefits. For payment of bills, a cash acceptor or a similar device may be incorporated into the POS unit. Similarly, the system could be configured to perform wire transfers or to dispense money orders or telephone cards.

Other embodiments are within the scope of the following claims. For example, in another embodiment, the check processing module may be eliminated from the POS unit to form a checkless POS unit. The checkless POS unit may be located on the premises of, for example, a large factory or refinery, and may be used to distribute employee pay without requiring the distribution of employee paychecks. For such a use, an employer transfers funds corresponding to the payroll to an account associated with the CSC and notifies system administrators at the CSC of payroll amounts for different employees. The system administrators then enter these payroll amounts into records for the employees and download the records to appropriate POS units. An employee may use a checkless POS unit located on the employer's premises or any other POS unit to receive pay.

When an employee uses the system to collect pay, the POS unit and, where necessary, the CSC confirm the employee's identity as discussed above. The POS unit then distributes the payroll amount to the employee. In some implementations, the system may be configured to permit the employee to request less than the payroll amount to the employee and to hold the remainder of the payroll amount until a later request is made.

Cardless automated financial transactions and/or cardless automated payroll distribution may be provided by a retrofitted automated teller machine. Traditional automated teller machines include an input device, a card reader, and a cash dispenser. Such a machine may be retrofitted to provide cardless transactions by connecting a retrofit module to the machine. In general, the retrofit module includes an input/output port, a biometric device, a storage device, and an electronic processor. The input/output port is configured to receive an input signal from the input device of the automated teller machine. The input signal corresponds to a customer identifier and is generated in response to actuation of the input device by the customer. The biometric device (e.g., a camera) is configured to receive biometric information about the customer (e.g., an image of the customer's face). The storage device includes a database of customer information, including stored biometric information for the customer. The electronic processor is connected to the input/output port, the biometric device, and the storage device, and is configured to receive the input signal from the input/output port and the biometric information from the biometric device. The processor then accesses the database of customer information in response to the input signal to obtain data about the customer identified by the customer identifier, including stored biometric information for the customer. The processor compares the received biometric information to the stored biometric information, and transmits a notification message to the input/output port. The notification message indicates that the customer's identity has been established when the received biometric information matches the stored biometric information.

All of the components of the retrofit module may be positioned in a single housing suitable for mounting on top of the automated teller machine or in a wall above the automated teller machine. Alternatively, the input/output port, storage device and processor may be configured to be positioned within the automated teller machine while the camera or other biometric device is positioned in a convenient location near the automated teller machine. When an automated teller machine includes an internal video camera for surveillance purposes, this camera may be used to obtain an image of the customer. In this instance, the biometric device of the retrofit module would constitute a connection between the camera and the electronic processor of the module.

The techniques described are not limited to any particular hardware or software configuration; they may find applicability in any computing or processing environment that may be used for cashing checks or performing similar transactions. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and two or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. An apparatus for providing automated financial transactions without requiring the use of a card, comprising:

an input device configured to generate an input signal corresponding to a customer identifier in response to actuation of the input device by a customer;

a biometric device configured to receive biometric information about the customer;

a storage device including a database of customer information, the customer information including stored biometric information; and an electronic processor configured to:

receive the input signals from the input device, receive biometric information from the biometric device, access the database of customer information to obtain data about the customer, the data including stored biometric information for the customer, compare the received biometric information to the stored biometric information, provide a message to a banking network provider confirming a customer's identity when the received biometric information matches the stored biometric information, and when the received biometric information does not match the stored biometric information, transmit the received biometric information to a remotely-located service center for comparison with biometric information stored at the remotely-located service center.

2. The apparatus of claim 1, further comprising a cash dispenser, wherein the electronic processor is configured to receive messages from the banking network provider through the connection and to signal the cash dispenser to dispense cash to the customer in response to a message from the banking network provider.

3. The apparatus of claim 1, wherein the biometric device comprises a camera configured to obtain an image of the customer's face, the biometric information comprises the image of the customer's face, and the stored biometric information comprises images of customers' faces.

4. The apparatus of claim 3, wherein the camera is configured to obtain the image of the customer's face in response to actuation of the input device by the customer.

5. The apparatus of claim 3, wherein the camera comprises a digital video camera.

6. The apparatus of claim 3, further comprising a second camera configured to obtain a second image of the customer's face, wherein the processor is configured to compare the first and second images when confirming the identity of the customer.

7. The apparatus of claim 3, further comprising lights positioned to illuminate the customer's face to improve an image obtained by the camera.

8. The apparatus of claim 1, wherein the biometric information comprises the customer's fingerprint.

9. The apparatus of claim 1, wherein the customer identifier comprises an identification number.

10. The apparatus of claim 1, further comprising an output device for providing information to the customer.

11. The apparatus of claim 10, wherein the input device and the output device comprise a touch screen display.

12. The apparatus of claim 10, wherein the output device comprises a speaker, the apparatus further comprising a voice synthesizer connected to the speaker and configured to provide spoken information to the customer through the speaker.

13. The apparatus of claim 1, wherein the input device comprises a numeric keypad.

14. The apparatus of claim 1, further comprising a card reader, wherein the electronic processor is configured to perform card-based automated financial transactions by contacting the connection to the banking network provider in response to insertion of a card into the card reader and entry of a personal identification number using the input device.

15. The apparatus of claim 1, further comprising a check reader configured to receive and read a check to be processed, and a cash dispenser, wherein the electronic processor is configured to perform check-cashing transactions by:

receiving the input signals from the input device, receiving information about the check to be processed from the check reader, accessing the database of customer information to obtain data about the customer, determining automatically whether to accept or reject the check based on the input signals, the received information about the check, and the data about the customer, and upon accepting the check, signalling the cash dispenser to dispense cash to the customer.

16. The apparatus of claim 15, wherein, after confirming the identity of the customer, the processor is configured to determine automatically whether to accept or reject the check by applying a set of rules.

17. The apparatus of claim 16, wherein the rules are defined generally to permit the processor to accept the check if the customer has used the apparatus previously to cash a previous check for a similar amount from a payor associated with the check to be processed.

18. The apparatus of claim 15, wherein the processor is configured to accept the check when the database of customer information includes a record for the customer and other criteria are met.

19. The apparatus of claim 18, wherein the processor is configured to accept the check when criteria stored in the record for the customer are met.

20. The apparatus of claim 19, wherein the processor is configured to reject the check when a criterion stored in the record for the customer is not met.

21. The apparatus of claim 19, wherein the storage device also includes a database of payor information, wherein the processor is configured to accept the check when the database of customer information includes a record for the customer, criteria stored in the record for the customer are met, the database of payor information includes a record for a payor of the check, and criteria stored in the record for the payor are met.

22. The apparatus of claim 21, wherein the processor is configured to reject the check when a criterion stored in the record for the payor is not met.

23. The apparatus of claim 21, wherein the processor is further configured to confirm the identity of the customer based on biometric information about the customer, and to accept the check when the database of customer information includes a record for the customer, criteria stored in the record for the customer are met, the database of payor information includes a record for a payor of the check, criteria stored in the record for the payor are met, and the identity of the customer is confirmed.

24. The apparatus of claim 15, further comprising a card reader, wherein the electronic processor is configured to perform card-based automated financial transactions by contacting the connection to the banking network provider in response to insertion of a card into the card reader and entry of a personal identification number using the input device.

25. An apparatus for providing automated payroll distribution without the requirement of a card, comprising:

an input device, the input device being configured to generate an input signal corresponding to a customer identifier in response to actuation of the input device by a customer;

a biometric device configured to receive biometric information about the customer;

a storage device including a database of customer information, the customer information including stored biometric information and a stored payroll amount for the customer;

a cash dispenser, and an electronic processor configured to:
receive the input signals from the input device,
receive biometric information from the biometric device, access the database of customer information in response to the input signals to obtain data about the customer identified by the customer identifier, the data including stored biometric information for the customer, compare the received biometric information to the stored biometric information, cause the cash dispenser to dispense an amount of cash that equals or is less than the payroll amount when the received biometric information matches the stored biometric information, and when the received biometric information does not match the stored biometric information, transmit the received biometric information to a remotely-located service center for comparison with biometric information stored at the remotely-located service center.

26. The apparatus of claim 25, wherein the biometric device comprises a camera configured to obtain an image of the customer's face, and the biometric information comprises the image of the customer's face.

27. The apparatus of claim 25, further comprising:

a first communications device connected to the processor, a second communications device co-located with the remotely-located service center and configured to communicate with the first communications device, a storage device including a central database of customer information co-located with the remotely-located service center, the customer information including stored biometric information and a stored payroll amount for a customer; and an electronic processor connected to the second communications device and the storage device, and configured to:

receive information about the customer from the second communications device, the information including received biometric information for the customer, access the central database of customer information to obtain data about the customer identified by the customer identifier, the data including biometric information stored in the central database for the customer, compare the received biometric information to the biometric information stored in the central database for the customer, and transmit from the second communications device to the first communications device an indication of whether the received biometric information matches the biometric information stored in the central database for the customer, wherein the electronic processor of the service center is further configured to enter the payroll amount into the central database of customer information and to transmit the payroll amount to the database of customer information using the second communications device.

28. A retrofit module for configuring an automated teller machine having an input device, a card reader, and a cash dispenser to provide automated transactions without requiring the use of a card, the retrofit module being configured to be connected to the automated teller machine and comprising:

an input/output port configured to receive an input signal from the input device of the automated teller machine, the input signal corresponding to a customer identifier and being generated in response to actuation of the input device by the customer;

a biometric device configured to receive biometric information about the customer;

a storage device including a database of customer information, the customer information including stored biometric information for the customer; and an electronic processor connected to the input/output port, the biometric device, and the storage device, the processor being configured to:

receive the input signal from the input/output port, receive biometric information from the biometric device, access the database of customer information in response to the input signal to obtain data about the customer identified by the customer identifier, the data including stored biometric information for the customer, compare the received biometric information to the stored biometric information, and transmit a notification message to the input/output port, the notification message indicating that the customer's identity has been established when the received biometric information matches the stored biometric information, when the received biometric information does not match the stored biometric information, transmit the received biometric information to a remotely-located service center via the input/output port for comparison with biometric information stored at the remotely-located service center.

29. The apparatus of claim 28, wherein the biometric device comprises a camera configured to obtain an image of the customer's face, and the biometric information comprises the image of the customer's face.

30. A method for providing automated financial transactions without requiring the use of a card, comprising the steps of:

in response to user-entered identification information, collecting biometric data about the user, comparing the biometric data to data in a local database to verify an identity of the user, if the comparison succeeds, connecting to a banking network provider for completion of the financial transaction, if the comparison fails, connecting to a remote service center, transmitting the biometric data to the remote service center for comparison with data in a larger, remote database, and if the comparison with data in the larger, remote database fails, contacting a human operator for a determination of whether the financial transaction may be completed.

31. The method of claim 30, further comprising the step of, during connection to the remote service center, transmitting information regarding past financial transactions to the larger, remote database.

32. The method of claim 31, further comprising the steps of:

if the comparison with the data in the larger, remote database fails, transmitting a request for a second collection of biometric data from the remote service center, in response to the request, collecting second biometric data, comparing the second biometric data with data in the local database, and if the comparison with data in the local database fails, transmitting the second biometric data to the remote service center for comparison with data in a larger, remote database.

33. The method of claim 32, further comprising the step of, if the comparison with data in the larger, remote database fails, issuing a rejection message to the user.

34. The method of claim 30, wherein the biometric information is an image of the user's face.

35. The method of claim 30, wherein the biometric information is a user's fingerprint.

36. A method for performing an automatic cardless financial transaction without requiring the use of a card, comprising the steps of:

receiving user-entered identification information, in response to the identification information, searching a local database for local information about a user associated with the identification information, including biometric information, causing biometric data about the user to be collected, comparing the collected biometric information with the local information about the user, if the collected biometric information matches the local information, completing a financial transaction requested by the user, wherein completing the financial transaction includes making a connection to a banking network provider, else, making a connection to a remote service center and transmitting the user-entered identification information and the received biometric information to the remote servicing center for comparison with information in a larger, remote database, and if the transmitted information matches the information stored in the larger, remote database, receiving a transaction authorization from the remote servicing center authorizing completion of the financial transaction.

37. The method of claim 36, further comprising the step of, during the connection to the remote service center, transmitting data regarding previous transactions to the remote service center for storage in the remote data base.

38. A system for providing automated financial transactions without requiring the use of a card, comprising:

input means for receiving a user-entered user identifier;

biometric means for collecting biometric data about a user;

local storage means for storing information about users;

local processing means for:

receiving the user-entered identifier;

accessing information about the user in the storage means using the user identifier;

comparing the collected biometric data with the stored information about the user to attempt to determine a user identity;

if the attempt to determine the user identity is not successful, connecting to a remoter server means; and transmitting the collected biometric data and the user identifier to the remote server means; and a remote server means connectable to the local processor means, the remote server means comprising a remote storage means for storing information about users, the remote storage means being larger than the local storage means, the remote server means for:
receiving the transmitted collected biometric data and user identifier;
accessing information about the user in the remote storage means using the user identifier;
comparing the collected biometric data with the stored information about the user to attempt to determine a user identity; and
if the attempt to determine the user identity is successful, transmitting a transaction authorization to the local processing means.

39. The system of claim 38, wherein the biometric means includes a camera means for capturing an image of the user and means for converting the image to a storable format.

40. The system of claim 38, wherein the stored information about the user comprises an amount of funds available to the user.

41. The system of claim 38, wherein the local processing means is further for, during connection to the remote server, transmitting data regarding past transactions involving a plurality of users to the remote storage means.

* * * * *